United States Patent
Wu et al.

(10) Patent No.: US 9,324,015 B2
(45) Date of Patent: Apr. 26, 2016

(54) SOLID HOUSING TAG

(71) Applicant: Checkpoint Systems, Inc., Thorofare, NJ (US)

(72) Inventors: Wei Wu, Shanghai (CN); Yong Qiao, Shanghai (CN); Gary T. Mazoki, Sewell, NJ (US)

(73) Assignee: CHECKPOINT SYSTEMS, INC.

( * ) Notice: Subject to any disclaimer, the term of this patent is extended or adjusted under 35 U.S.C. 154(b) by 215 days.

(21) Appl. No.: 13/804,237

(22) Filed: Mar. 14, 2013

(65) Prior Publication Data

US 2013/0313327 A1 Nov. 28, 2013

Related U.S. Application Data

(60) Provisional application No. 61/650,123, filed on May 22, 2012.

(51) Int. Cl.
*G08B 13/24* (2006.01)
*E05B 73/00* (2006.01)
*G06K 19/06* (2006.01)

(52) U.S. Cl.
CPC ............ *G06K 19/06* (2013.01); *E05B 73/0017* (2013.01); *G08B 13/244* (2013.01); *G08B 13/2434* (2013.01); *Y10T 29/49002* (2015.01); *Y10T 29/49169* (2015.01); *Y10T 70/5004* (2015.04)

(58) Field of Classification Search
CPC ............ E05B 73/0017; G08B 13/2408; G08B 13/2414; G08B 13/2422; G08B 13/2434; G08B 13/244; G08B 13/2442; G08B 13/2402; G08B 13/2405; G08B 13/2448; G08B 13/2471; G08B 13/2474; H01Q 7/08; H01Q 13/24; Y10T 29/49073; Y10T 70/5004

USPC ............... 235/492; 340/572.1, 572.8, 572.9, 340/573.1, 573.2, 568.1; 70/57.1; 24/204.1, 24/204.2

See application file for complete search history.

(56) References Cited

U.S. PATENT DOCUMENTS

| | | | | |
|---|---|---|---|---|
| 4,187,509 A | * | 2/1980 | Weiner | G08B 13/24 340/572.1 |
| 4,334,089 A | * | 6/1982 | Krass et al. | 562/463 |
| 4,334,227 A | * | 6/1982 | Marks | H01Q 1/04 29/600 |
| 4,502,717 A | * | 3/1985 | Close | 70/57.1 |
| 4,590,461 A | * | 5/1986 | Cooper | E05B 73/0017 139/119 |
| 4,751,500 A | * | 6/1988 | Minasy | G08B 13/2414 340/572.8 |
| 4,940,968 A | * | 7/1990 | De Nood | 340/572.5 |
| 5,482,008 A | * | 1/1996 | Stafford et al. | 119/174 |
| 5,891,156 A | * | 4/1999 | Gessner et al. | 606/117 |
| 6,133,738 A | * | 10/2000 | Minarovic | 324/326 |
| 6,191,692 B1 | | 2/2001 | Stoltz et al. | |

(Continued)

FOREIGN PATENT DOCUMENTS

CN 201188254 1/2009

*Primary Examiner* — Michael G Lee
*Assistant Examiner* — Suezu Ellis
(74) *Attorney, Agent, or Firm* — The Belles Group, P.C.

(57) ABSTRACT

A solid housing tag and method to form the solid housing tag, the method including for example, an injection molding process. The solid housing tag has a single, continuous housing of which at least partially surrounds one or more various tag components arranged about a frame. The tag components may include a lock component and/or security component. The security component may include EAS elements, such as AM, EM, and/or RF technology elements; RFID elements; and/or benefit denial type elements.

18 Claims, 72 Drawing Sheets

(56) References Cited

U.S. PATENT DOCUMENTS

| | | | |
|---|---|---|---|
| 6,380,857 B1 | 4/2002 | Galloway et al. | |
| 6,396,401 B1 | 5/2002 | Matsuo | |
| 6,400,338 B1* | 6/2002 | Mejia et al. | 343/873 |
| 6,401,802 B2 | 6/2002 | Cottingham | |
| 6,682,681 B1 | 1/2004 | Clark et al. | |
| 6,778,089 B2* | 8/2004 | Yoakum | 340/572.8 |
| 6,875,391 B2 | 4/2005 | Modha et al. | |
| 6,920,769 B2* | 7/2005 | Huehner | E05B 73/0017 206/1.5 |
| 6,940,405 B2 | 9/2005 | Script et al. | |
| 7,498,945 B2 | 3/2009 | Marsilio et al. | |
| 7,564,360 B2 | 7/2009 | Cote et al. | |
| 7,837,917 B2 | 11/2010 | Polk, Jr. | |
| 7,844,326 B2 | 11/2010 | Dent et al. | |
| 7,893,583 B2 | 2/2011 | Du et al. | |
| 7,985,148 B2 | 7/2011 | Gans | |
| 8,344,891 B2 | 1/2013 | Appalucci et al. | |
| 2004/0233042 A1* | 11/2004 | Piccoli | E05B 73/0017 340/10.1 |
| 2005/0156807 A1* | 7/2005 | Clarke | 343/873 |
| 2005/0263549 A1* | 12/2005 | Scheiner | 224/182 |
| 2007/0024448 A1* | 2/2007 | Sayegh | 340/572.1 |
| 2007/0096925 A1* | 5/2007 | Yang | E05B 73/0017 340/572.9 |
| 2009/0273476 A1* | 11/2009 | Siegel | E05B 73/0017 340/572.9 |
| 2010/0242552 A1* | 9/2010 | Sayegh et al. | 70/58 |

* cited by examiner

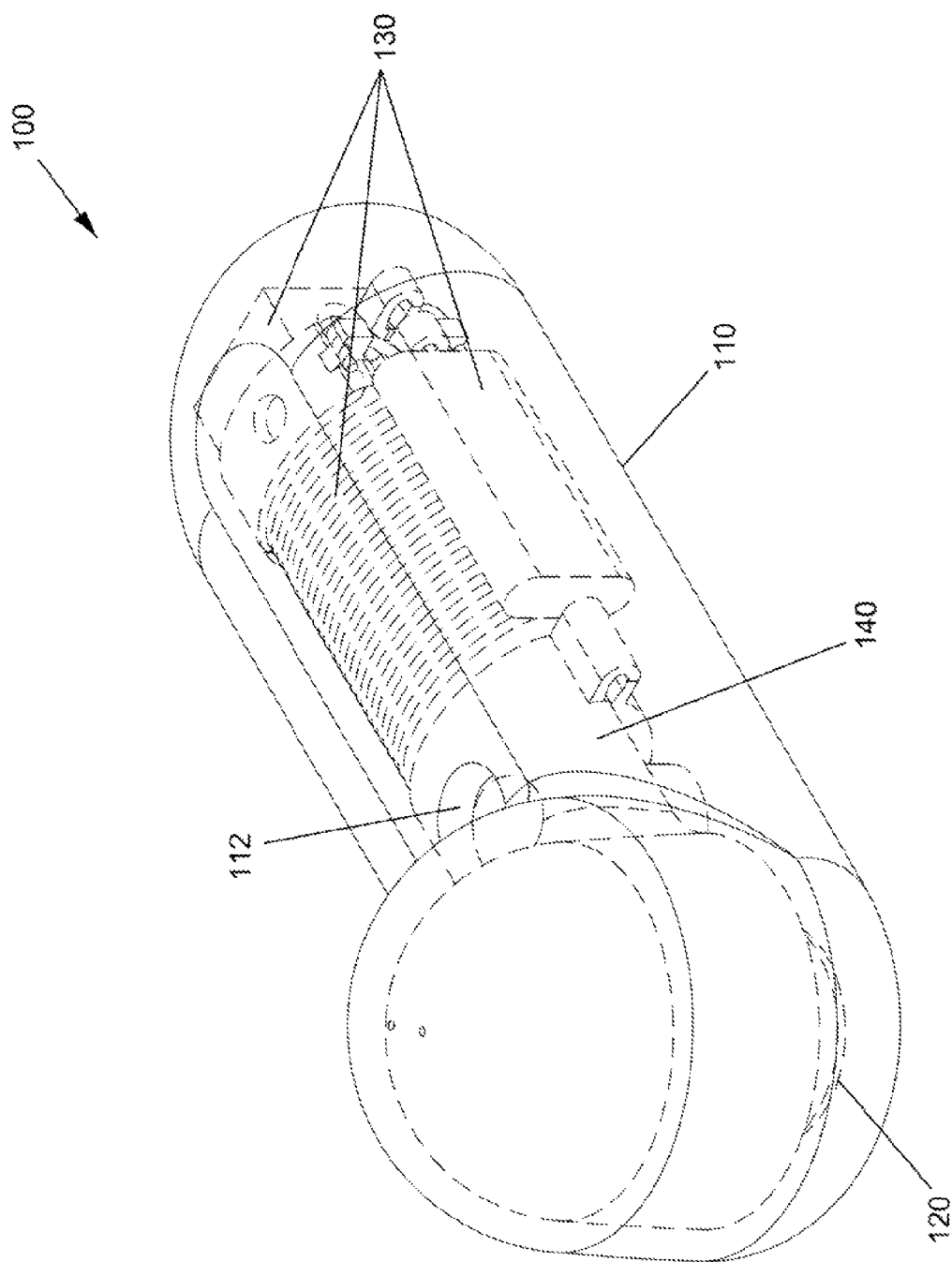

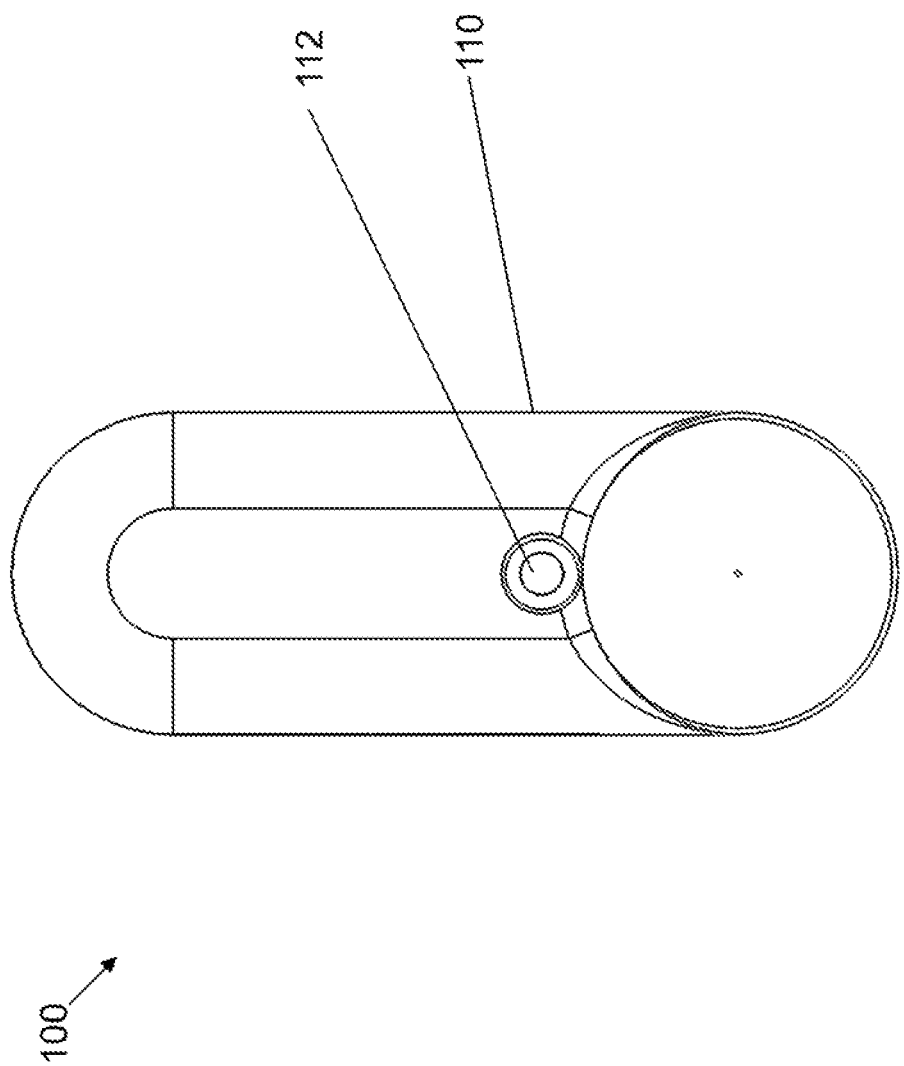

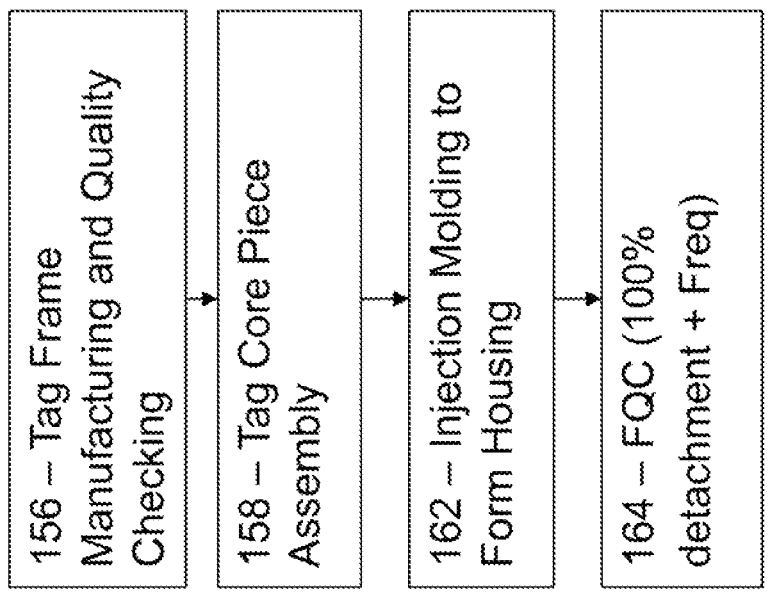
FIG. 4A

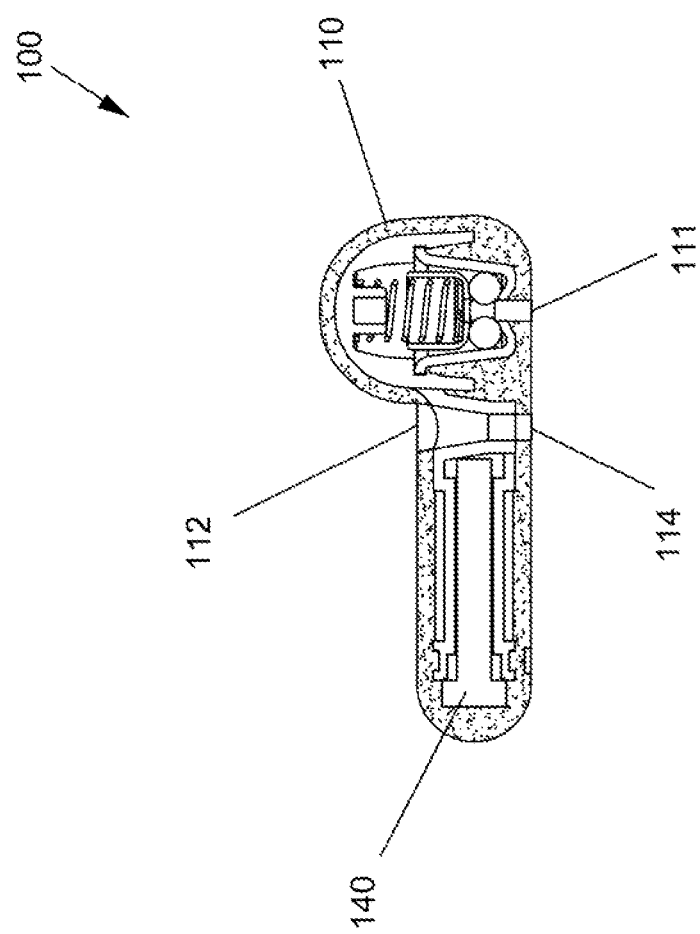

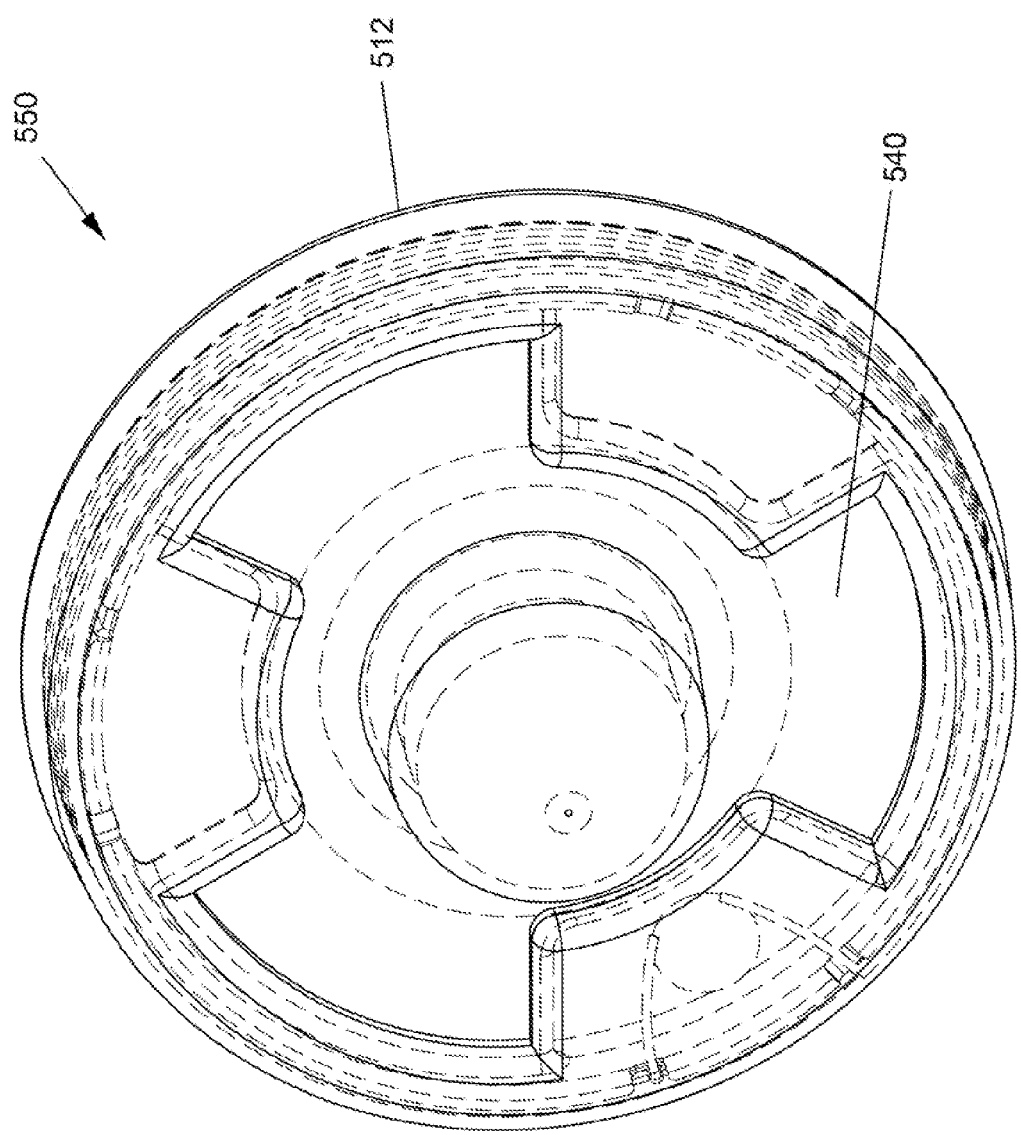

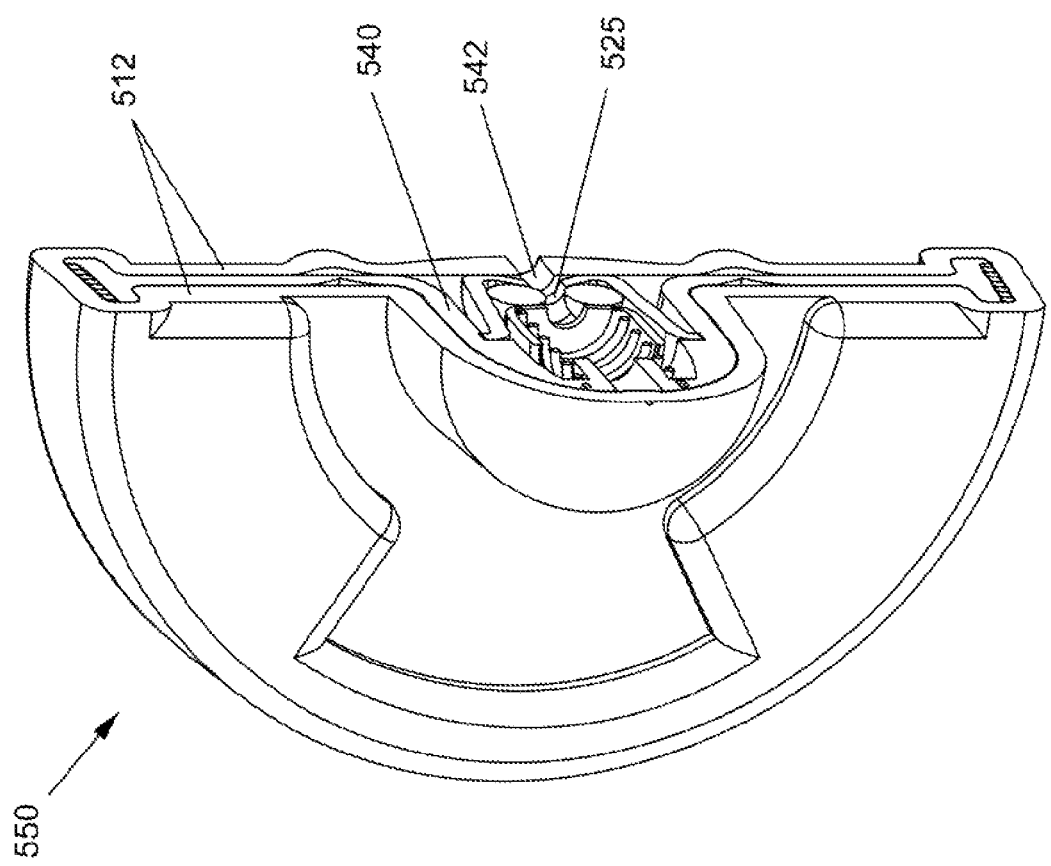

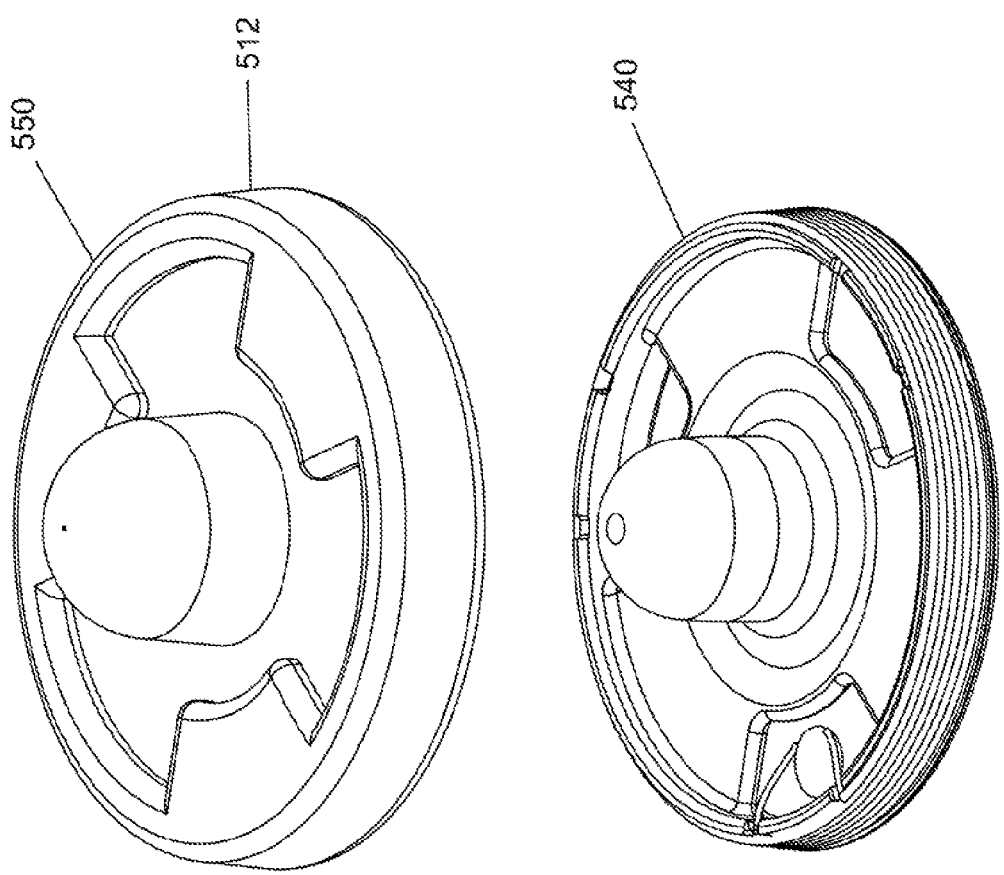

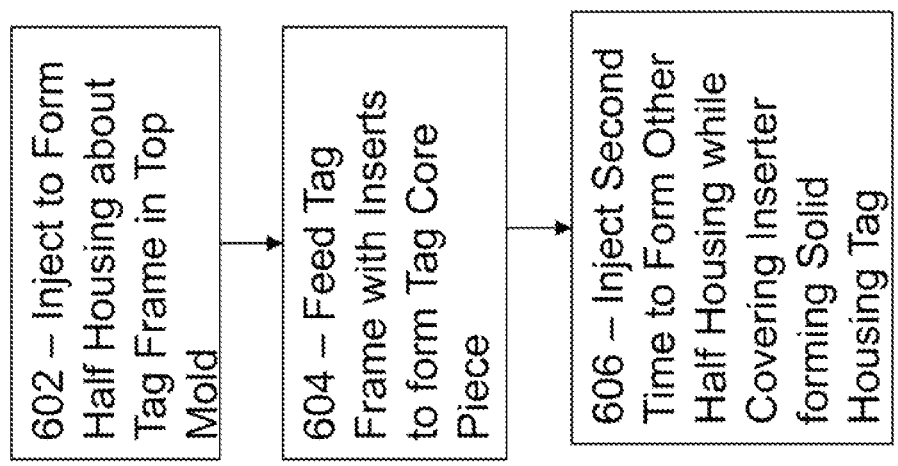
FIG. 40

SOLID HOUSING TAG

CROSS-REFERENCE TO RELATED APPLICATION

This application claims the benefit under 35 U.S.C. §119 (e) of the earlier filing date of U.S. Provisional Application Ser. No. 61/650,123 filed on May 22, 2012, the entire disclosure of which is hereby incorporated by reference herein as if being set forth in its entirety.

TECHNOLOGY FIELD

The present disclosure relates to a solid housing tag and method, including an injection molding process, to form the solid housing tag. The solid housing tag is formed by arranging one or more tag components, selected from various types of lock and/or security components, into a frame and creating a single housing at least partially around the frame and the tag components. Security components may include AM, RF, RFID, and/or benefit denial elements.

BACKGROUND

Hard tags are utilized by retail stores to prevent shoplifting for electronic article surveillance. Tags are affixed to various merchandise throughout the store and removed or deactivated by a store clerk when merchandise product is checked out. The tags may contain mechanisms to affix the tag to the merchandise, as for example with a locking portion, and to sound alarms when the tag is active, as for example with an alarm portion. Other tags may be benefit denial type tags, wherein for example, the tag includes vials of ink which can break if one attempts to break the tag instead of properly being removed from the merchandise by a retailer.

Typically, the locking portion of a hard tag includes a ball chamber assembly with spring used to retain a pin into the body of the tag such that material may be contained between a head of the pin and the body portion of the tag.

The alarming portion of hard tags may include various electronic elements for alerting a retailer of merchandise theft. Hard tags typically are constructed to contain these electronic elements, forming electronic article surveillance (EAS) tags, which may be for example an acousto-magnetic (AM) tag, a radio frequency (RF) tag, or electro-magnetic (EM) tag. Hard tags are also constructed as radio frequency identification (RFID) tags, which may respond at low, high, or ultra high frequencies.

In an EAS tag, electronic elements include a resonant circuit of coil coupled to a capacitor. The circuit is tuned to a predetermined frequency and if one attempts to remove the hard tag containing these elements from a store, an alarm triggers as the tag passes through a surveillance field created by a transmitter and receiver located between pedestals at the store exit, tuned to the same frequency. The alarm goes off as the EAS tag resonates, providing an output signal detected by a receiver, also located in the pedestals. An AM tag is magnetized or affixed with particular circuitry such that when the tag meets an emitted tonal burst from a tag detector, the tag resonates to activate the tag to set off an alarm at the detector. A RF tag is affixed with an inductor/capacitor (LC) circuit which alarms at a detector sweeping for the resonant frequency of the tag. The same principal may apply to AM tags affixed with an LC circuit.

An RFID tag typically includes the electronic elements of an integrated circuit (IC) and an RF LC circuit (resonant circuit) and/or antenna (e.g. a dipole antenna), tuned to a predetermined RF frequency. Often, the integrated circuit IC comprises a memory that has been programmed with information associated with the article (e.g., product ID information such as a serial number, unique identification number, price, etc.). When a transmitter emits a signal at the predetermined RF frequency and threshold value which is received by the tuned antenna, the RFID element emits a signal containing the stored information which is then received by a receiver and the information demodulated from the element-emitted signal. This information can then be used for, among other things, determining whether to set off an alarm or not. The RFID tag may also be used for merchandise visibility, inventory control, and to identify where a tag and associated product are located or where they have moved to or from within the store.

In alternative to an EAS tag, a portion of a hard tag may include a benefit denial device. A benefit denial tag typically includes ink releasing elements, such that when an attempt to break the tag from a product is performed, glass vials of ink shatter within the tag, ultimately leaking about the product which devalues the product and likewise to provide notification to the retailer that that particular merchandise was tampered with.

The alarming and locking portions of benefit denial type tags, EAS tags, and or RFID tags are often housed in a multiple enclosure pieces, with elements of the various portions connected to the enclosure pieces. For example in an EAS tag, the locking portion and alarm portion are placed in a first enclosure piece and then second enclosure piece is placed over top the first enclosure piece, as a cover, with the locking and alarm portions placed therein. The enclosure pieces are then typically ultrasonically welded together.

Having to ultrasonically weld enclosure pieces together prevents the formation of smaller sized hard tags. Smaller sized benefit denial, RFID, and EAS type hard tags are desired in the retail industry so as to hide the tag from customers so as not to disrupt the aesthetics of the item for sale. Retailers would rather avoid the visual hindrance of a hard tag by attaching even smaller tag models. Retailers may also prefer to hide smaller sized hard tags in or around the merchandise so that potential shoplifters cannot find the tag to therefore remove the tag from an item before stealing it. Using numerous enclosure pieces provides increased assembly steps, more welding, and more quality control processing steps.

What is needed is a hard tag having a single continuous housing, not requiring the assembly and ultrasonic welding, or any other kind of connecting process, of numerous enclosure pieces. This would allow for the manufacturing of smaller sized tags. Smaller sized tags in the industry would meet the desires of retailers so that they may better conceal a tag and/or avoid visual hindrance caused by the tag about merchandise. A tag with a single housing would require less material, less assembly processes, and less quality control steps. In another benefit, the solid housing tag may be overall lighter in weight resulting in less impact and less risk of damage to fabric of which the solid housing tag is attached or hanging from, due to the smaller size of the tag.

SUMMARY

Embodiments of the present disclosure provide a solid housing tag and methods to create the solid housing tag. The solid housing tag is formed by arranging one or more tag components, including lock and/or security components, about a frame and creating housing around the frame and the tag components on or within the frame.

Embodiments of this disclosure are directed to a tag. The tag includes a core piece, which includes a security component and a frame. The security component is arranged about the frame. The tag also includes a housing formed at least partially around the core piece.

According to one embodiment the frame is a single skeleton piece. According to another embodiment, the housing is a single piece and is formed in the general shape of the core piece.

According to another embodiment, the security component is selected from at least one of or combination of an acousto-magnetic element, a radio frequency element, an electro-magnetic element, a radio frequency identification element, and a benefit denial type element.

According to one aspect of one embodiment, the acousto-magnetic element, as the security component, includes a wire wrapped around a closed encasing portion of the frame. The acousto-magnetic element also includes a capacitor connected to opposite ends of the wire, wherein the capacitor is located about the closed encasing portion. The acousto-magnetic element also includes a ferrite rod located inside the closed encasing portion inside the wrapped wire. The ferrite rod is positioned in an open end of the closed encasing portion at a particular length inside the closed encasing portion to attain a proper frequency for detection of the acousto-magnetic element by a detector.

According to one aspect of one embodiment, the radio frequency element, as the security component, includes a wire wrapped around a perimeter piece of the frame. The perimeter piece encircles a remainder of the frame and connects to the remainder of the frame by one or more bridge portions of the frame. The radio frequency element also includes a capacitor connected to opposite ends of the wire. The capacitor is located about the perimeter piece of the frame.

According to another embodiment, the core piece further comprises a lock component arranged about the frame.

According to one aspect of one embodiment, the frame includes a lock component cavity formed within a lock component compartment and a lock component compartment dome. The lock component compartment is a wall extending around the circumference of the lock component cavity. The bottom edge of a dome wall of the lock component compartment dome connects to the top edge of the lock component compartment. The dome wall extends up from the connection with the top edge of the lock component compartment and reduces in circumference further from the connection with the top edge of the lock component compartment to form the lock component compartment dome. The lock component is partially located in the lock component cavity. The lock component compartment and the lock component compartment dome form a portion of the frame.

According to one aspect of one embodiment, the lock component includes a spring. The lock component also includes a pusher having a closed end and an open end opposite the closed end. A first end of the spring is positioned through the open end of the pusher and against the internal side of the closed end of the pusher. The lock component also includes two or more balls located against the external side of the closed end of the pusher. The lock component also includes a lock component chamber having an open end and a floor end opposite the open end of the lock component chamber. The two or more balls are located internally in the lock component chamber on the internal side of the floor end. The floor end includes an opening through the floor end. A second end of the spring is located against the lock component dome inside the lock component cavity. A first end of a lock pin is located through the opening in the floor end of the lock component chamber and in engagement between the two or more balls to lock the lock pin to the tag and secure merchandise between a pin head located on the second end of the lock pin and the tag.

According to one aspect of one embodiment, the housing comprises an accessway over the opening in the chamber floor for the first end of the lock pin to pass through both the accessway and the opening to lock the lock pin to the tag.

Embodiments of this disclosure are directed to a tag including a core piece. The core piece includes at least one of a security component and a lock component. The core piece also includes a frame. The at least one of the security component and the lock component are arranged about the frame. The tag also includes a housing formed at least partially around the core piece.

Embodiments of this disclosure are directed to a method for forming a tag including assembling a security component about a frame to form a core piece. The method also includes forming a housing at least partially around the core piece.

According to one embodiment, assembling the security component about the frame comprises selecting the security component from at least one of or combination of an acousto-magnetic element, a radio frequency element, an electro-magnetic element, a radio frequency identification element, and a benefit denial type element.

According to one aspect of one embodiment, assembling the acousto-magnetic element about the frame includes wrapping a wire around a closed encasing portion of the frame. Assembling the acousto-magnetic element also includes connecting a capacitor to opposite ends of the wire. The capacitor is located about the closed encasing portion of the frame. Assembling the acousto-magnetic element also includes positioning a ferrite rod inside the closed encasing portion as inside the wrapped wire at a particular length inside the closed encasing portion of the frame so as to attain a proper frequency for detection of the acousto-magnetic element at a detector.

According to one aspect of one embodiment, assembling the radio frequency element about the frame includes wrapping a wire around a perimeter piece of the frame. The perimeter piece encircles the remainder of the frame and connects to the remainder of the frame by one or more bridge portions of the frame. Assembling the radio frequency element also includes connecting a capacitor to opposite ends of the wire and positioning the capacitor about the perimeter piece.

According to another embodiment, the method also includes assembling a lock component about the frame in addition to the security component about the frame to form the core piece.

According to one aspect of one embodiment, the method includes forming a lock component cavity within a lock component compartment and a lock component compartment dome. The lock component compartment is a wall extending around the circumference of the lock component cavity. The bottom edge of a dome wall of the lock component compartment dome connects to the top edge of the lock component compartment. The dome wall extends up from the connection with the top edge of the lock component compartment and reduces in circumference further from the connection with the top edge of the lock component compartment to form the lock component compartment dome. The method also includes forming the lock component partially inside the lock component cavity. The lock component compartment and the lock component compartment dome form a portion of the frame.

According to one aspect of one embodiment, forming the lock component partially inside the lock component cavity includes positioning a first end of a spring against the lock component dome inside the lock component cavity. Forming the lock component also includes positioning a second end of the spring through an open end of a pusher and against the internal side of a closed end of the pusher internal of the pusher. The pusher includes the closed end and the open end opposite of the closed end. Forming the lock component also includes positioning two or more balls against the external side of the closed end of the pusher. Forming the lock component also includes positioning the two or more balls through an open end of a lock component chamber and against the internal side of a chamber floor end of the lock component chamber. The chamber floor end includes an opening on the chamber floor end. The chamber floor end is opposite the open end of the lock component chamber. Forming the lock component also includes positioning a first end of a lock pin through the opening in the chamber floor end and into engagement between the two or more balls to lock the lock pin to the tag to secure merchandise between a pin head located on the second end of the lock pin and the tag.

According to another embodiment, forming the housing includes applying housing material over and about the core piece. Application of the housing material includes avoiding the opening in the chamber floor with the housing material to create an accessway for the first end of the lock pin to pass through both the accessway and the opening in the chamber floor.

According to one aspect of one embodiment, application of housing material further includes inserting the core piece partially into a cavity of a lower mold and partially into a cavity of an upper mold. Application of housing material also includes connecting the core piece to one or more ejection bars located in either mold. At least one ejection bar is connected at the opening in the chamber floor. Application of housing material also includes closing the upper mold and lower mold. Application of housing material also includes injecting housing material into the cavity of the upper mold and the lower mold. Application of housing material also includes removing the ejection bar connected at the opening in the chamber floor when the injection of housing material is complete.

According to another aspect of one embodiment, the application of housing material further includes removing the one or more ejection bars connected with the core piece, except for the ejection bar connected to the opening in the chamber floor, prior to completion of injection of housing material to eliminate apertures on the housing at the former ejection bar connection with the core piece.

According to another embodiment, forming the housing includes applying a housing material over a portion of the frame except at the lock component cavity prior to forming the lock component partially inside the lock component cavity. Forming the housing also includes then applying more housing material over portions of the core piece after forming the lock component partially inside the lock component cavity.

According to another embodiment, assembling the security component and the lock component about the frame includes affixing the security component and the lock component temporarily on a fixture. Assembling the security component and the lock component about the frame also includes wrapping a foam material tape around the security component and the lock component to form the core piece. According to one aspect of one embodiment, forming the housing includes positioning the core piece into a mold cavity and heating the core piece to melt the foam material tape.

According to another embodiment, forming the housing includes applying housing material over and about the core piece.

According to one aspect of one embodiment, applying housing material includes inserting the core piece into a cavity of a lower mold and a cavity of an upper mold. Applying the housing material also includes connecting the core piece to one or more ejection bars at the opening in the chamber floor. Applying the housing material also includes closing the upper mold and lower mold. Applying the housing material also includes dripping the housing material into the cavity of the upper mold and lower mold. Applying the housing material also includes solidifying the housing material. Applying the housing material also includes removing the one or more ejection bars.

According to another aspect of one embodiment forming the housing includes affixing the core piece to a fixture. Forming the housing also includes dipping the core piece into a housing material. Forming the housing also includes solidifying the housing material. Forming the housing also includes removing the fixture from the core piece.

Additional features and advantages of the disclosure will be made apparent from the following detailed description of illustrative embodiments that proceeds with reference to the accompanying drawings.

BRIEF DESCRIPTION OF THE DRAWINGS

The foregoing and other aspects of the disclosure are best understood from the following detailed description when read in connection with the accompanying drawings. For the purpose of illustrating the disclosure, there is shown in the drawings embodiments that are presently preferred, it being understood, however, that the disclosure is not limited to the specific instrumentalities disclosed. Included in the drawings are the following Figures:

FIG. 2B illustrates a perspective view of the AM solid molded housing tag of FIG. 2A with a transparent housing according to one embodiment;

FIG. 2C illustrates a top-down view of the AM solid molded housing tag of FIG. 2A according to one embodiment;

FIG. 4A illustrates the solid molded housing tag manufacturing process according to one embodiment;

FIG. 29A illustrates a cross-sectional side view of the AM solid molded housing tag removed from lower mold according to one embodiment;

FIG. 37C illustrates a top side perspective view of the RF solid molded housing tag with the housing shown transparent according to one embodiment;

FIG. 38A illustrates a cross-sectional view of the RF solid molded housing tag of FIG. 37A showing one half of the RF solid molded housing tag according to one embodiment;

FIG. 39 illustrates perspective view of the RF tag core piece with open air coil element compared with the RF solid molded housing tag with the same element within;

FIG. 40 illustrates a two-injection step molding process according to another embodiment;

DETAILED DESCRIPTION OF ILLUSTRATIVE EMBODIMENTS

This document describes a solid housing tag and a method to manufacture a solid housing tag including solid housing tag assembly and at least partially surrounding the tag with housing, as in for example an injection molding process. In the embodiments where the solid housing tag is formed by injection molding, the resultant solid housing tag is described as a solid molded housing tag. The solid housing tag may include a single, continuous housing of which is at least partially formed around one or more various tag components that are arranged about a frame. The housing may totally encase the frame piece and various components. The tag components of the solid housing tag may include lock components and/or security components. The security components may include EAS elements for alarming, such as AM, EM and/or RF technology elements; include RFID elements; and/or include benefit denial type elements. The security components may be a combination of any of the elements listed above. Elements such as an RFID element or benefit denial type element may or may not be used solely for alarming, but may have other application. For example, the RFID element may be used for merchandise visibility for determination of where the solid housing tag is located and the benefit denial type element may be used to damage merchandise, with for example ink, so as to reduce the market value of potentially stolen merchandise.

Figure 1A:
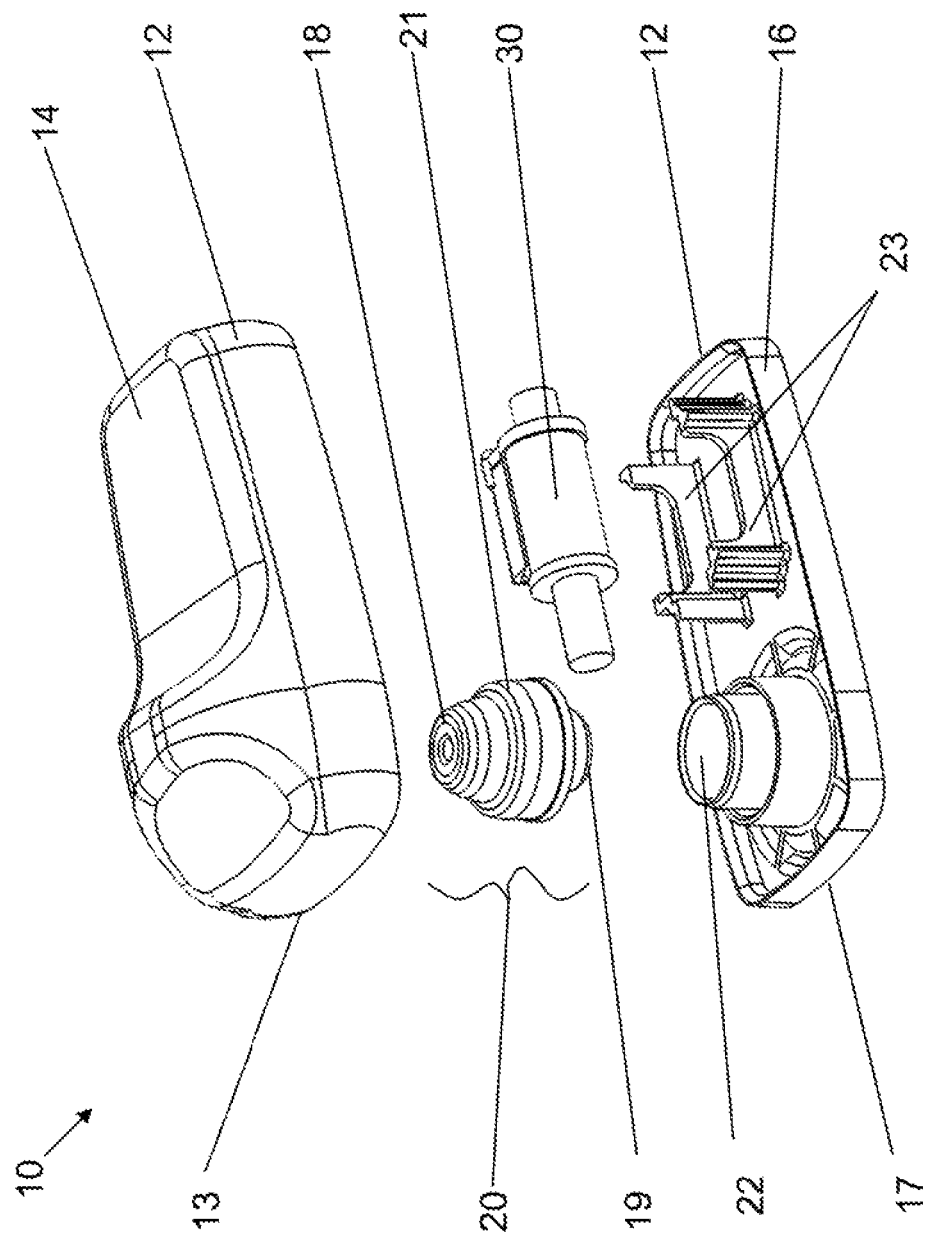
FIG. 1A illustrates a perspective view of an exemplary open AM hard tag and the components within known in the prior art.
Figure 1B:
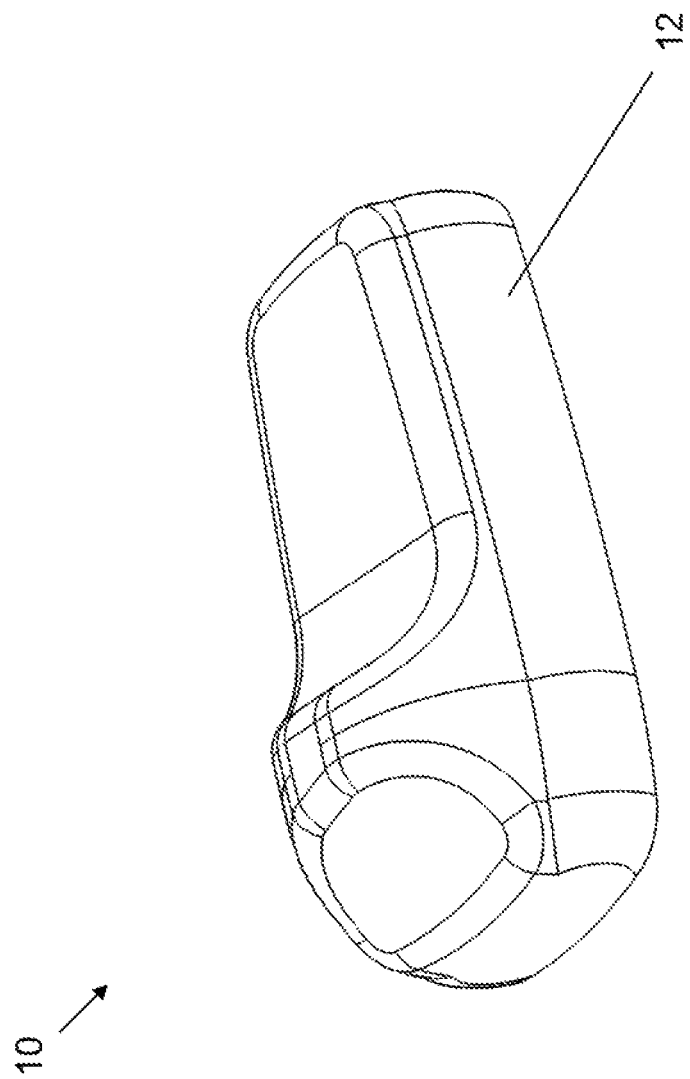
FIG. 1B illustrates a perspective view of the AM hard tag of FIG. 1A with the top and bottom encasing pieces connected as known in the prior art.
Figure 1C:
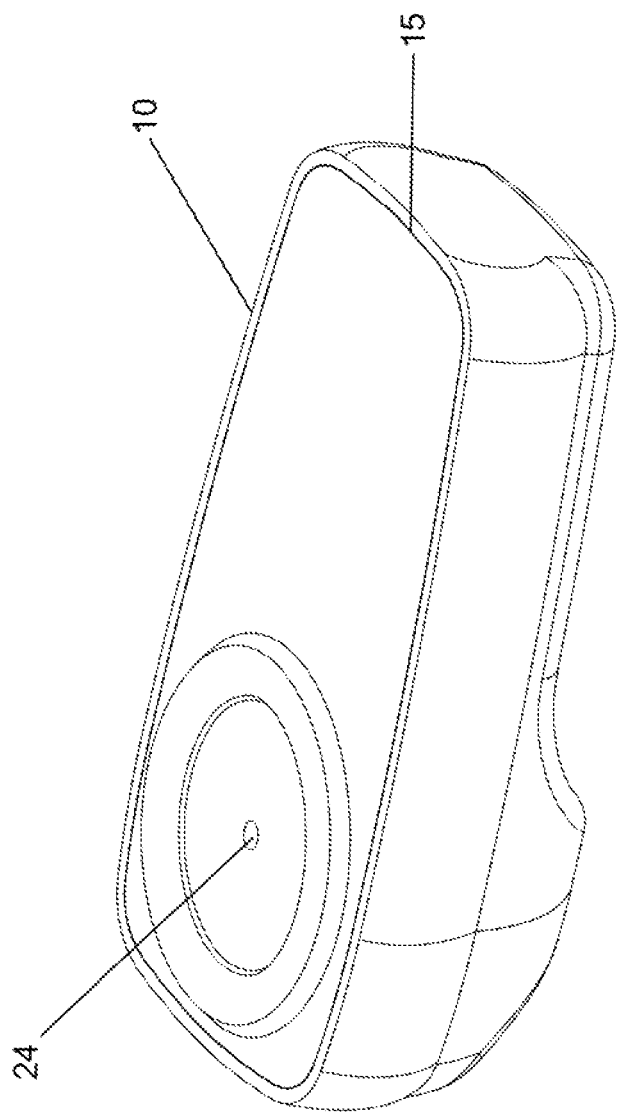
FIG. 1C illustrates a bottom-side perspective view of the AM hard tag of FIG. 1A known in the prior art.

FIG. 1A illustrates a perspective view of an exemplary open AM hard tag 10 and the components within, as known in the prior art. FIG. 1B illustrates a perspective view of the AM hard tag of FIG. 1A with the top and bottom encasing pieces 14, 16 connected, as known in the prior art. FIG. 1C illustrates a bottom-side perspective view of the AM hard tag 10 of FIG. 1A, known in the prior art.

As shown in FIG. 1A, this exemplary AM hard tag 10 has two encasing pieces, the top encasing piece 14 and bottom encasing piece 16 that together form a tag encasing piece 12, when connected together and ultrasonically welded together. For this example, the bottom encasing piece 16, of AM hard tag 10, includes a lock component compartment 22 and a security component compartment 23.

To assemble the AM hard tag 10, the lock component 20, including the known elements of a spring, pusher, and balls, not shown and all of which are located inside the lock component chamber 21, are placed inside the lock component compartment 22. The lock component chamber 21 typically includes a cap 18 and base 19 so as to enclose the spring, pusher, and balls (not shown). Security component 30 is separately placed into the security component compartment 23 of the bottom encasing piece 16. The security component 20 includes a ferrite rod wrapped by wire, as connected to a capacitor, to form an LC tank circuit. The ferrite rod transforms the signal of the LC tank circuit to emit periodic tonal bursts of the resonance frequency of the LC tank circuit. Typically, the periodic tonal bursts occur at about 58 kHz for EAS AM tags. The only connection between the security component 30 and lock component 20 is by way of the bottom encasing piece 16 after both components are each individually inserted into the bottom encasing piece 16. Once inserted, the top encasing piece 14 is then placed over both the lock component 20 and security component 30 and connected to the bottom encasing piece 16. The connection between the top encasing piece 14 and bottom encasing piece 16 is formed where the top encasing piece bottom edge 13 meets with the bottom encasing piece bottom edge 17, which is ultrasonically welded together to form the welded seam 15 (see FIG. 1C) at the connection of the top encasing piece bottom edge 13 and bottom encasing piece bottom edge 17.

The top encasing piece 14 and bottom encasing piece 16 are formed separately by injection molding. The top encasing piece 14 and bottom encasing piece 16 are constructed to mate together at the location of the welded seam 15 (see FIG. 1C) so as to securely hold the lock and security components placed within.

As shown in FIG. 1C, a lock pin cavity 24 is shown on and extending through the external surface of the bottom encasing piece 16. The lock pin cavity 24 is positioned directly opposite the center location of the lock component compartment 22 that holds lock component 20. As known in the art, one end of a pin (not shown) is placed into the lock pin cavity 24 to lock a garment between the AM hard tag 10 and the head of the pin (not shown), located on the other end of the pin, to secure the AM hard tag 10 about the garment.

Figure 1D:
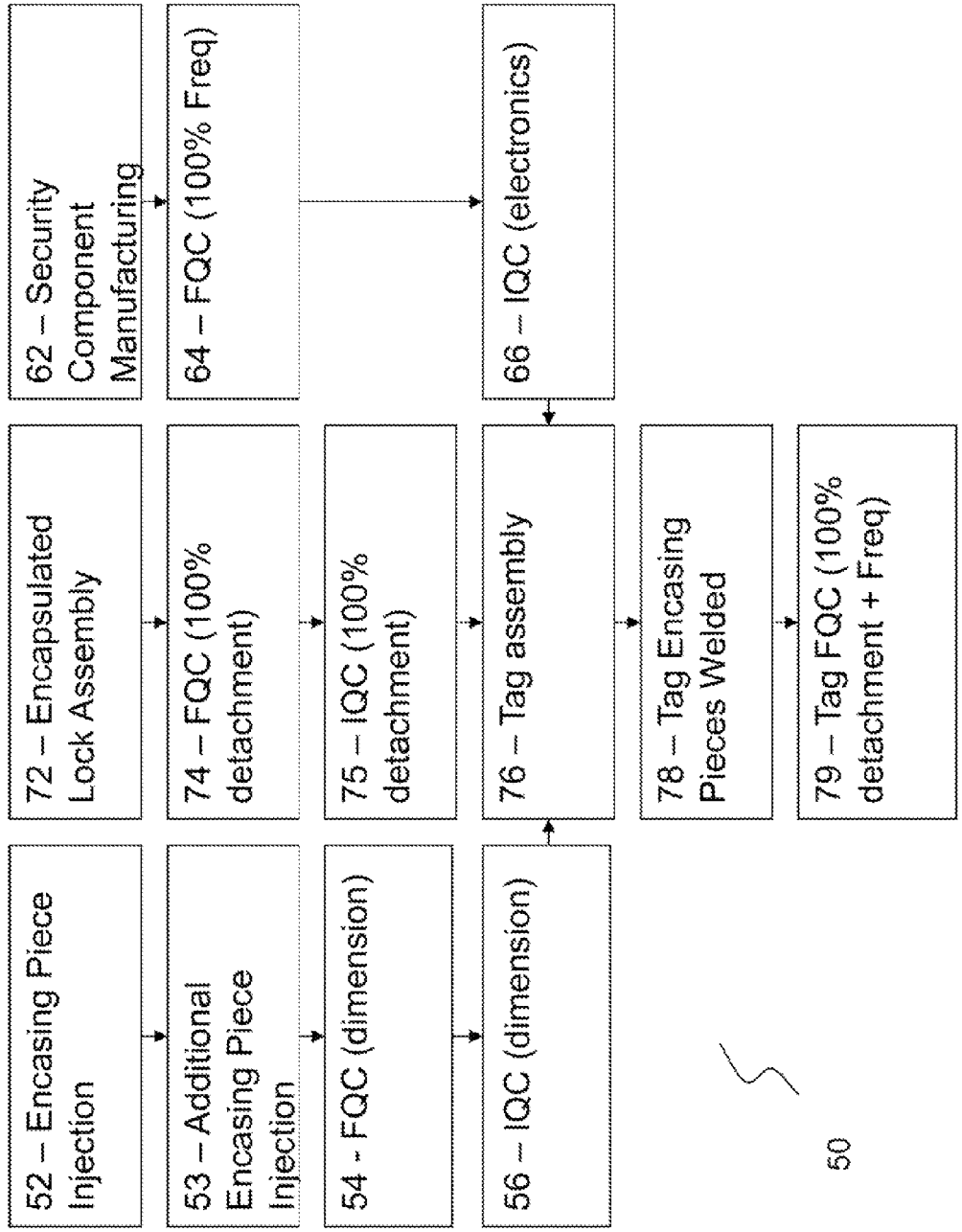
FIG. 1D illustrates a typical AM hard tag manufacturing process for the AM hard tag shown in FIG. 1A through 1C known in the prior art.

FIG. 1D illustrates a typical AM hard tag manufacturing process 50, as for example for the AM hard tag shown in FIG. 1A through 1C, as known in the prior art. To form the AM hard tag 10, several manufacturing process steps are taken along separate step paths prior to AM hard tag 10 assembly at step 76. Steps 52 to 56 take place before tag assembly at step 76. Separate from steps 52 to 56, steps 72 to 75 take place before tag assembly at step 76. Separate from steps 52 to 56 and steps 72 to 75, steps 62 to 66 also take place before tag assembly at step 76.

At step 52, an encasing piece, as for example the top encasing piece 14, is formed by injection molding. At step 53, another encasing piece, as for example the bottom encasing piece 16, is formed by injection molding. Additional steps of injection molding may be needed if more than two encasing pieces need to be constructed. Each encasing piece is separately formed. At step 54, the encasing pieces are examined by the encasing piece supplier under finish quality control (FQC). At step 56, the dimensions of the encasing pieces are examined for spacing and fitting of the security and/or lock components within by the hard tag assembly factory under incoming quality control (IQC).

At step 62, the security component 30 of the AM hard tag 10 is manufactured. A frequency analysis to attain 100% matched frequency of the ferrite in the manufactured security component 30 with the detector for sensing the AM hard tag 10 is conducted at step 64 by the security component supplier under FQC. Electronic component integration with the ferrite in the security component 30 is then conducted by the hard tag assembly factory under IQC at step 66.

At step 72, encapsulated lock assembly occurs to enclose the elements of the lock component 20 into the cap 18 and base 19, as shown in FIG. 1A. At step 74, the lock component 20 is tested sc as to attain 100% detachment between the pin and lock component 20 under FQC. At step 75, 100% detachment is tested again by the hard tag assembly factory under IQC.

At step 76, the AM hard tag 10 is assembled as previously described in reference to FIG. 1A. At step 78 the tag encasing pieces are welded, as previously described in reference to FIG. 1A through 1C. At step 79, testing of the hard tag to achieve 100% detachment and 100% frequency matching is again performed on the assembled AM hard tag 10. This AM hard tag manufacturing process 50 includes thirteen total steps.

Figure 2A:
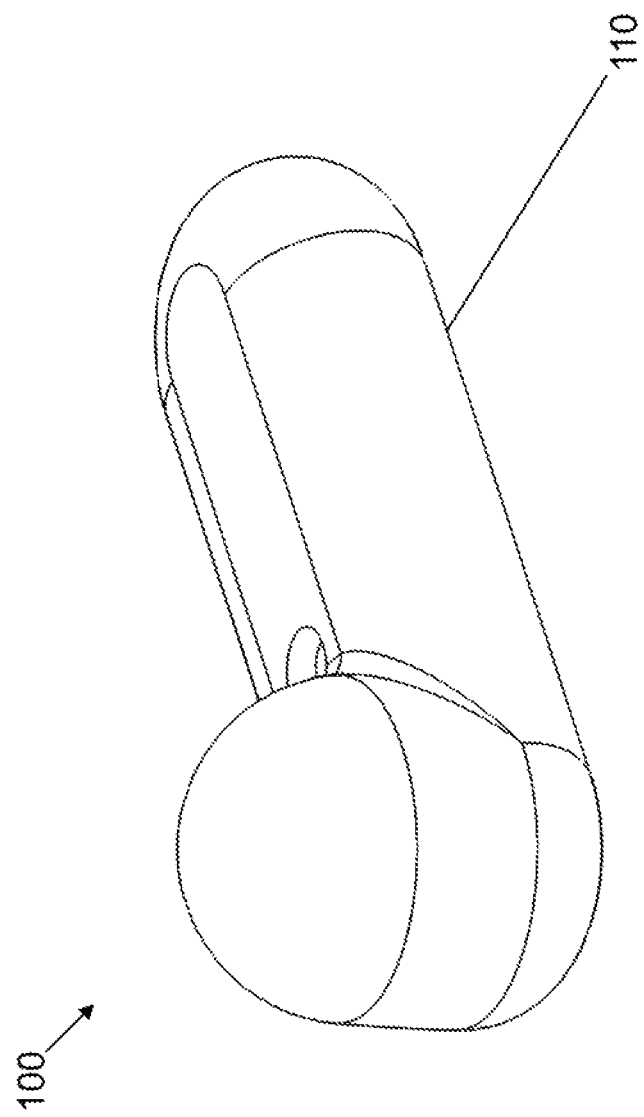
FIG. 2A illustrates a perspective view of an AM solid molded housing tag according to one embodiment.

FIG. 2A illustrates a perspective view of an AM solid molded housing tag 100 according to the preferred embodiment. The AM solid molded housing tag 100 includes a single continuous housing 110, which is not formed by separate encasing pieces ultrasonically welded together.

FIG. 2B illustrates a perspective view of the AM solid molded housing tag 100 of FIG. 2A with a transparent housing 110 to show the AM tag core piece 140 and components 120, 130 within. The housing is shown transparent in FIG. 2B, however the housing may be constructed so as to be transparent or opaque. Housing 110 covers AM tag core piece 140. The housing 110 may be formed in the general shape of the AM tag core piece 140. The AM tag core piece 140 contains both the lock component 120 and AM security component 130. A housing upper mold connection cavity 112, open on and through the surface of housing 110 is also shown. The housing upper mold connection cavity 112 is further described in reference to the housing injection mold process 300, described in FIG. 16.

Figure 2D:
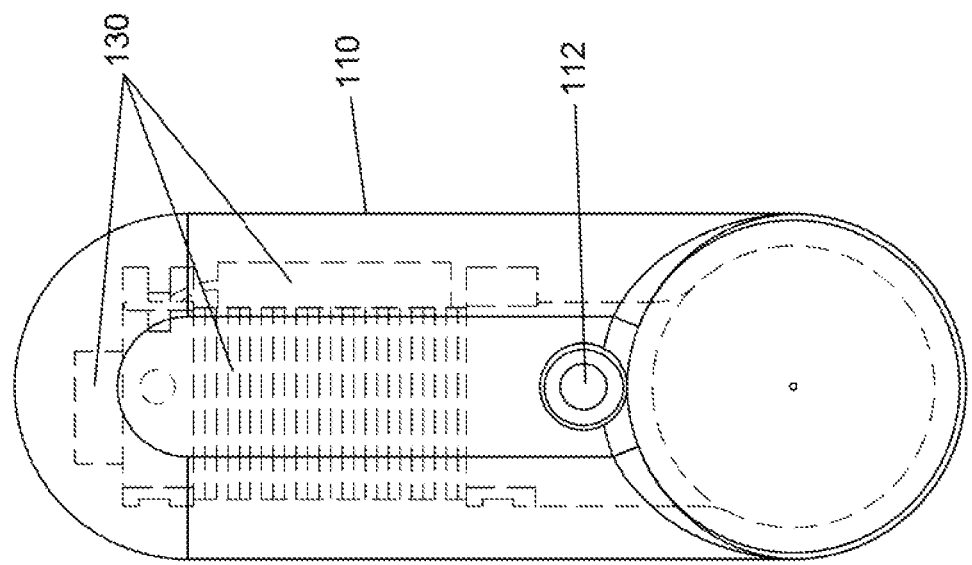
FIG. 2D illustrates a top-down of the AM solid molded housing tag of FIG. 2B according to one embodiment.

FIG. 2C illustrates a top-down view of the AM solid molded housing tag 100 of FIG. 2A. FIG. 2D illustrates a top-down of the AM solid molded housing tag 100 of FIG. 2B.

Figure 3A:
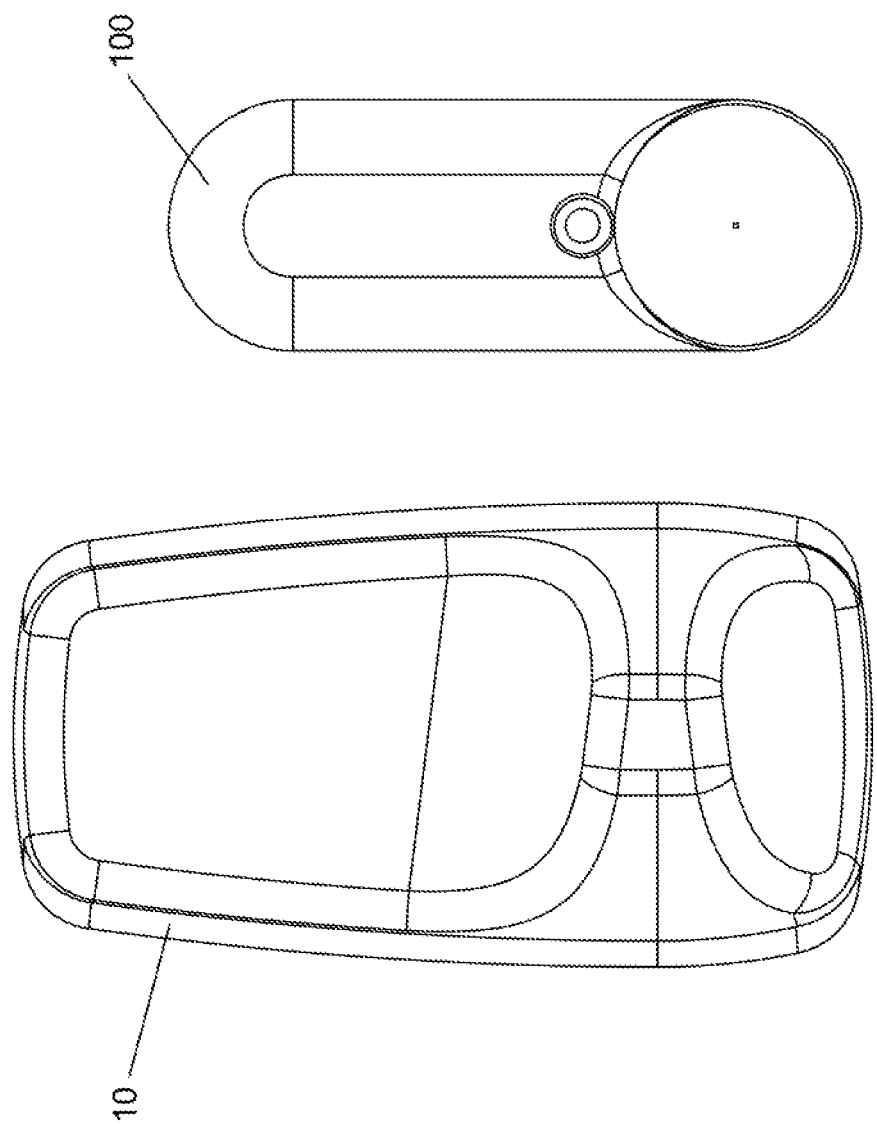
FIG. 3A illustrates a top-down comparison view of the prior art AM hard tag of FIG. 1B with the preferred embodiment AM solid molded housing tag of FIG. 2C.
Figure 3B:
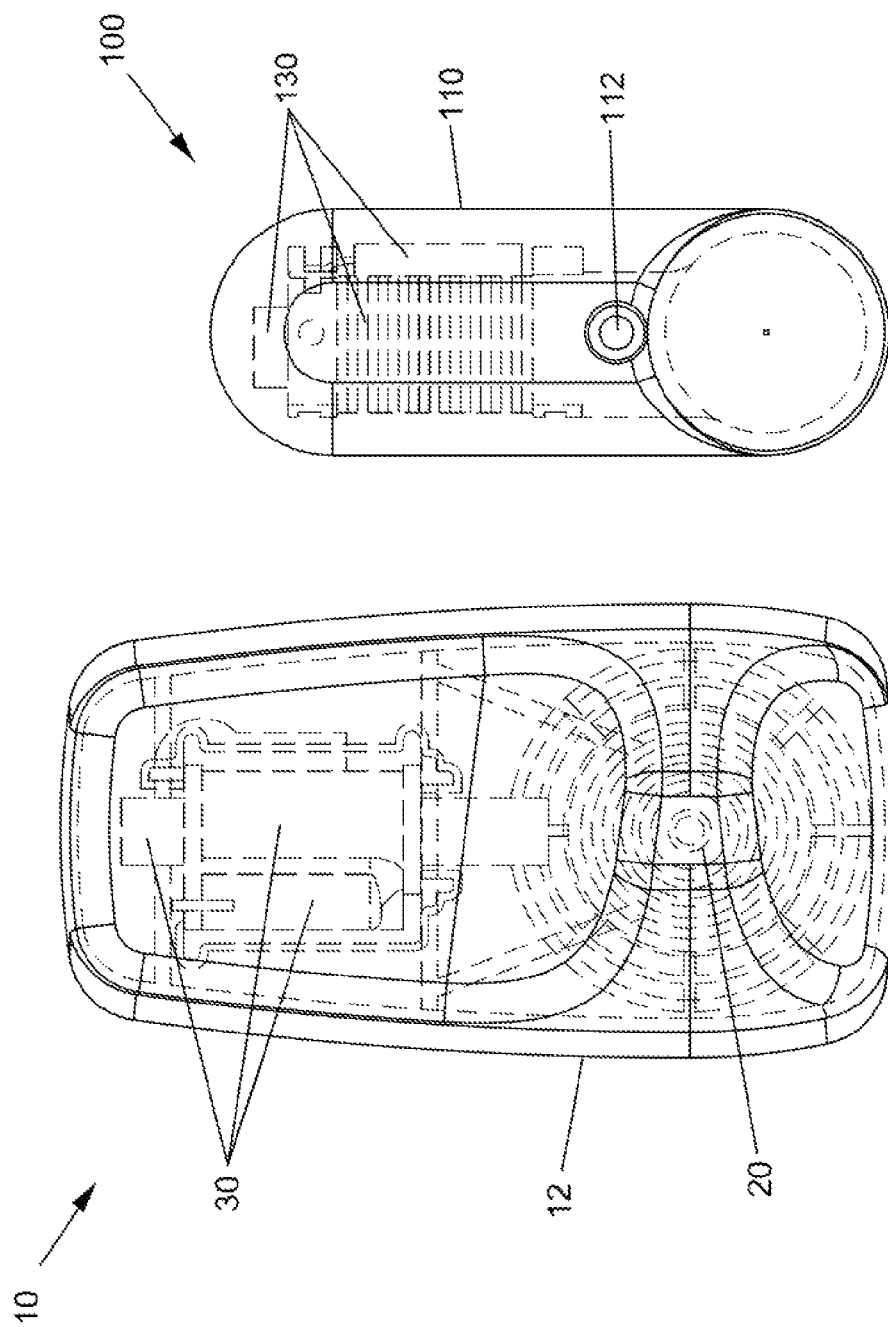
FIG. 3B illustrates the top-down comparison view of FIG. 3A with the tag encasing piece and housing shown transparent.

FIG. 3A illustrates a top-down comparison view of the prior art AM hard tag 10 of FIG. 1B with the AM solid molded housing tag 100 of FIG. 2C. FIG. 3B illustrates the top-down comparison view of FIG. 3A with the tag encasing piece 12 of the prior art and housing 110 of the preferred embodiment both shown transparent. Location of the security component 30 and lock component 20 in the prior art AM hard tag 10 with AM security component 130 and lock component 120 in the AM solid molded housing tag 100 may be compared in FIG. 3B. Due to the AM solid molded housing tag 100 assembly (see FIG. 4B) and housing injection mold process 300 (see FIG. 16) for a housing 110, the size of the AM solid molded housing tag 100 may be manufactured such that the AM solid molded housing tag 100 is smaller in dimension compared to the AM hard tag 10. Whereas the AM hard tag 10, as shown in FIG. 3B, measures in dimensions having a length of 51 mm, a width of 28 mm, and a height of 20 mm; the AM solid molded housing tag 100, in the preferred embodiment, measures in dimensions having length of 40 mm, a width of 15 mm, and a height of 16 mm. However, in other embodiments, the AM solid molded housing tag 100 may be constructed to be larger or smaller than the AM solid molded housing tag 100 shown in preferred embodiment.

FIG. 4A illustrates the solid molded housing tag manufacturing process 150, used as for example to form the AM solid molded housing tag 100 of FIG. 2B. The solid molded housing tag manufacturing process 150, as shown in FIG. 4A, is more efficient than the typical AM hard tag manufacturing process 50, shown in FIG. 1D. As shown in FIG. 4A, the steps, achieved in a linear progression, create for a more efficient process than the typical AM hard tag manufacturing process 50, shown in FIG. 1D.

Figure 16:
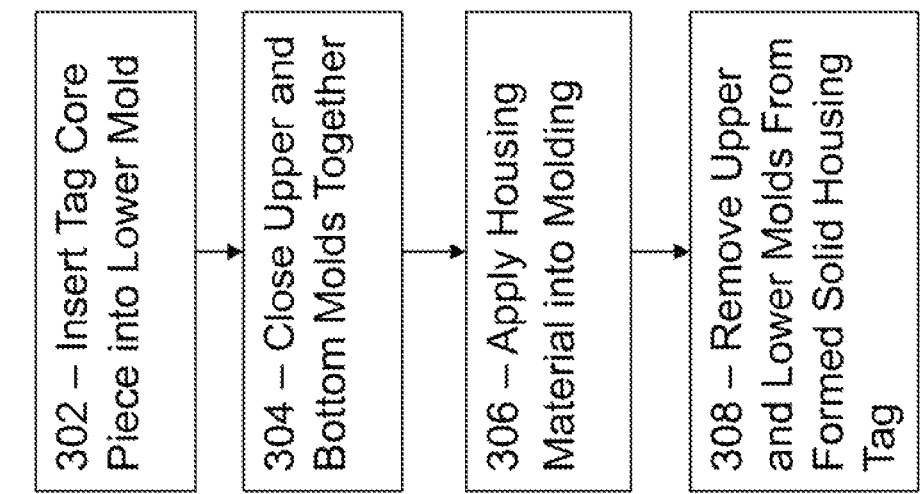
FIG. 16 illustrates the housing injection mold process according to one embodiment.

As shown in FIG. 4A, forming the AM solid molded housing tag 100 begins with manufacturing and quality control of AM tag frame 200 (see FIG. 5A) at step 156. At step 158, the AM tag core piece 140 is assembled. At step 162, injection molding occurs to form the housing 110 over the AM tag core piece 140. The housing injection mold process 300 of FIG. 16 is step 162 in the preferred embodiment. At step 164, testing to achieve 100% detachment and 100% frequency matching is performed on the AM solid molded housing tag 100.

Figure 4B:
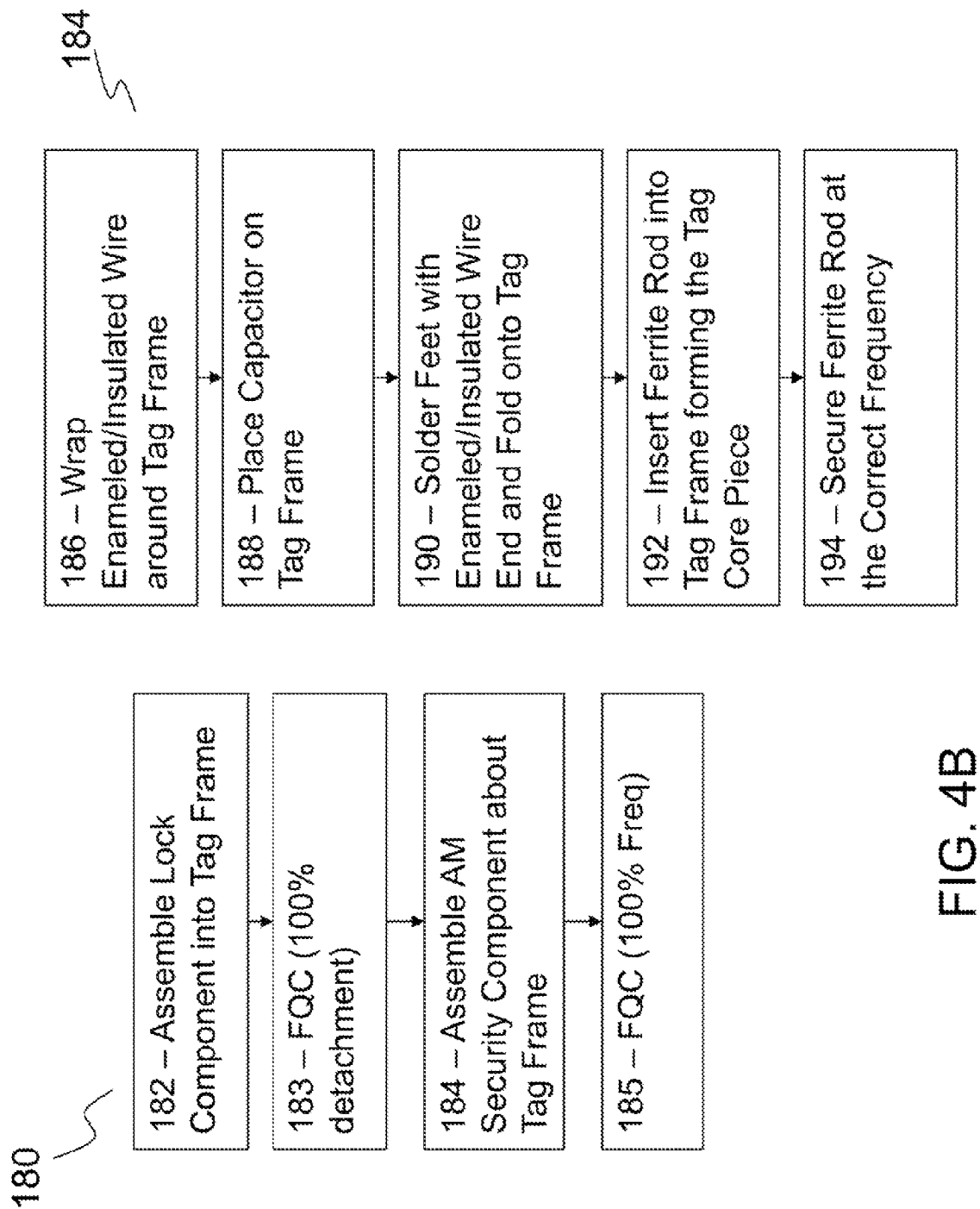
FIG. 4B illustrates the AM tag core piece assembly process according to one embodiment.

Tag core piece assembly process 180 is step 158 of FIG. 4A in the preferred embodiment and is further described in reference to FIG. 4B. The process of injection molding in step 162 to form the housing 110 over the AM tag core piece 140, assembled at step 158, is further described in reference to FIG. 16 in the housing injection mold process 300.

FIG. 4B illustrates the tag core piece assembly process 180 for the AM tag core piece 140 of the AM solid molded housing tag 100 of FIG. 2B. Assembly of the lock component 120 begins at step 182. Assembly of the AM security component 130 about the AM tag core piece 140 is further described under step 184. FIGS. 5A through 15B may be viewed in conjunction with the process illustrated in FIG. 4B.

Figure 5A:
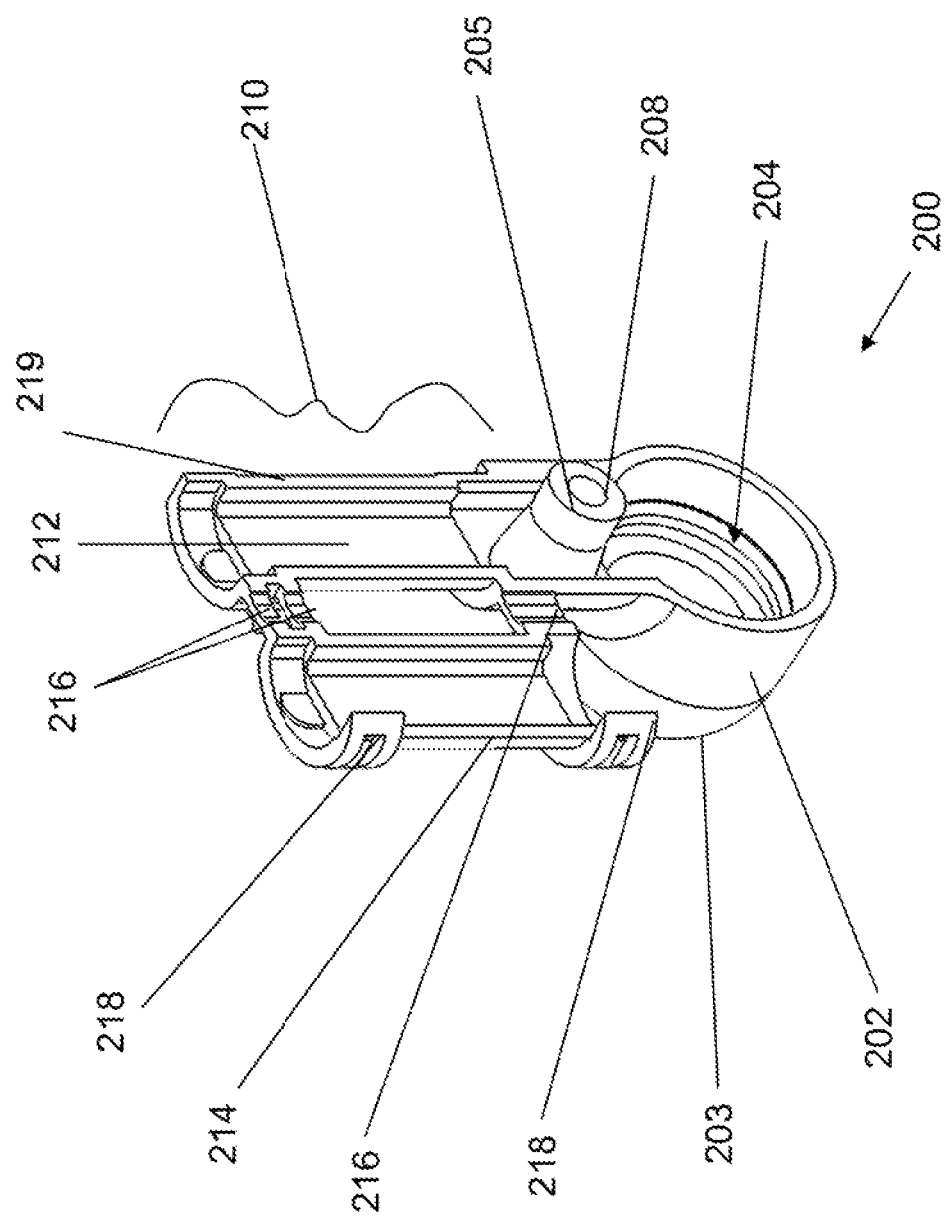
FIG. 5A illustrates bottom-side perspective view of AM tag frame standing vertical and having an open ferrite encasing according to one embodiment.
Figure 5B:
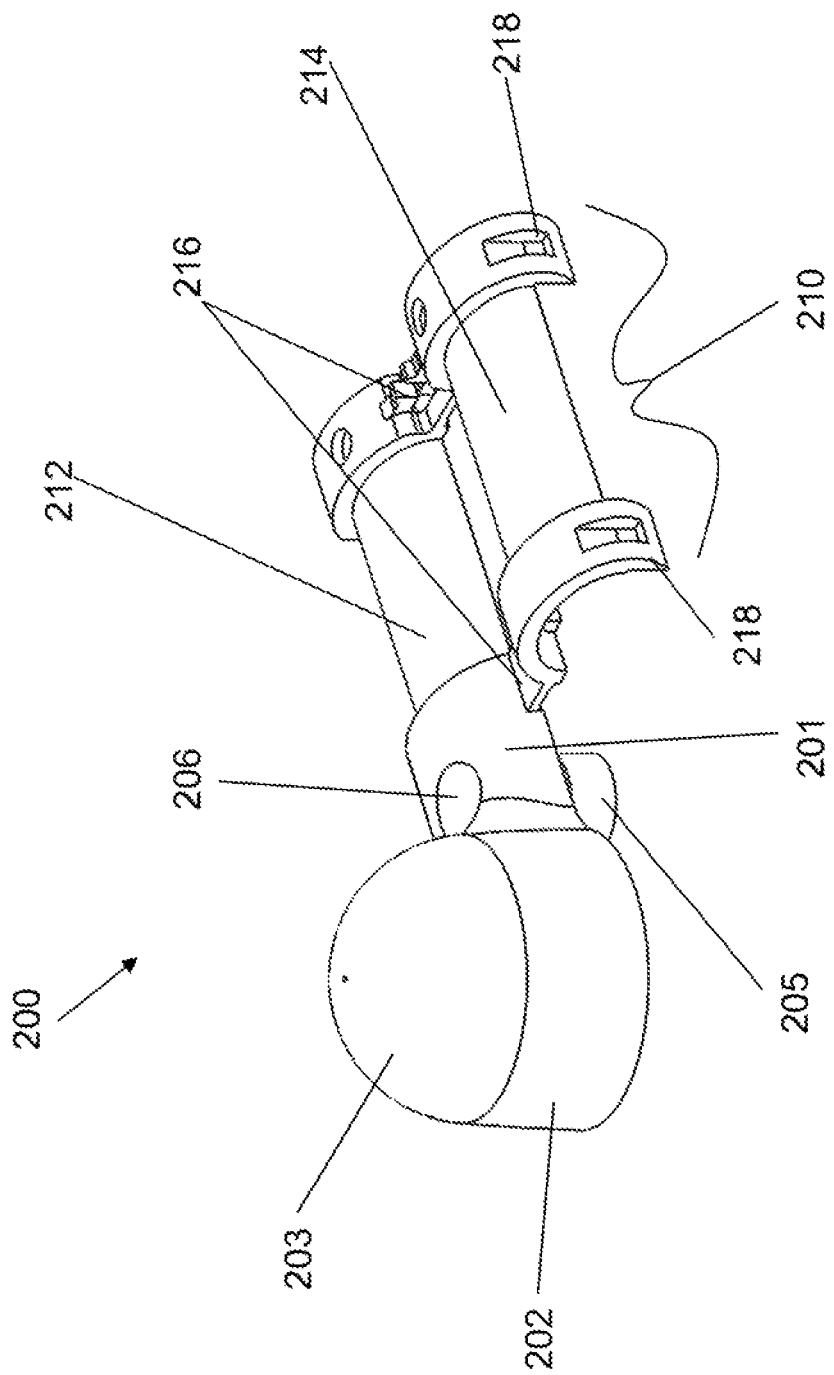
FIG. 5B illustrates a top-side perspective view of AM tag frame lying horizontal and having an open ferrite encasing according to one embodiment.

FIG. 5A illustrates bottom-side perspective view of AM tag frame 200, standing vertical, having an open ferrite encasing 210. FIG. 5B illustrates a top-side perspective view of AM tag frame 200, lying horizontal, having an open ferrite encasing 210. AM tag frame 200 is a single skeleton piece to hold or have arranged on one or more various tag components, including the AM security component 130 and lock component 120. The AM security component 130 and lock component 120 may be assembled about the AM tag frame 200, which may include positioning or affixing, by attachment, on or inside the AM tag frame 200. 'Skeleton' may be defined as not yet having any security or lock component incorporated on or in until assembly of the security or lock component about the frame. A 'skeleton' piece may also not contain any parts of the security or lock components until assembly. The AM tag frame 200 may be formed by plastic, metallic, or other formable materials. Plastics may include, for example, foam plastic or a wood-plastic composite. The AM tag frame 200 may be formed by a connection of smaller pieces, wherein the entire AM tag frame 200 or the pieces forming the frame are created by injection molding. In the preferred embodiment, AM tag frame 200 is one continuous single piece.

As shown in FIGS. 5A and 5B, AM tag frame 200 includes a lock component compartment 202 attached to stationary ferrite encasing side piece 212 via tag bridge 201. The lock component compartment 202 is a wall extending to form a circular piece with the circumference shaped by the wall between ends of the wall both connected at tag bridge 201 (see FIG. 5B). The top edge of the circumference wall of the lock component compartment 202 connects to a bottom edge of the wall of lock component compartment dome 203. The wall of the lock component compartment dome 203 extends upwards from connection with the top edge of the lock component compartment 202 and reduces in circumference to form the lock component compartment dome 203. The lock component compartment 202 and lock component compartment dome 203 are internally hollow forming the empty lock component cavity 204 within, as shown in FIG. 5A.

Tag bridge 201, shown in FIG. 5B, extends from connection with the lock component compartment 202 to connect at its opposite end to the stationary ferrite encasing side piece 212 of the shown open ferrite encasing 210. Mold connection tube 205 extends through the tag bridge 201, orthogonal to tag bridge 201 extending between connection with the lock component compartment 202 and stationary ferrite encasing side piece 212. As shown in FIG. 5B, one end of the hollow mold connection tube 205 is an opening exposed at the top-side of tag bridge 201, being upper mold connection cavity 206. On the opposite end of the mold connection tube 205, and as shown FIG. 5B, lower mold connection cavity 208 is shown as an opening on the opposing side of the mold connection tube 205, opposite the upper mold connection cavity 206. Utilization of the mold connection tube 205, including the upper mold connection cavity 206 and lower mold connection cavity 208, in the injection molding process 300 is further described in reference to FIG. 16. In the preferred embodiment, the cavities 206, 208 extend into one another and through the mold connection tube 205 providing for a passageway from one side of the AM tag frame 200 through to the other.

Referring again to FIG. 5B, the stationary ferrite encasing side piece 212 has a curved surface, with the raised center portion of the curve extending in the same direction as the peak center portion of the lock component compartment dome 203. The stationary ferrite encasing side piece 212 is adjoined to a swivel ferrite encasing side piece 214 by encasing swivel joints 216. The swivel ferrite encasing side piece 214 is similar in size and shape to the stationary ferrite encasing side piece 212. The swivel ferrite encasing side piece 214 can swing from encasing swivel joints 216 to lie in plane with the stationary ferrite encasing side piece 212, as shown in FIGS. 5A and 5B, or swing to any position between and up to a closed position to form the closed ferrite encasing 211, shown in FIG. 6A. In the closed position, encasing closure clasps 218, located on the opposite edge of the swivel ferrite encasing side piece 214 from the encasing swivel joints 216, connect to the clasp connection edge 219 (see FIG. 5A) to lock the swivel ferrite encasing side piece 214 to the stationary ferrite encasing side piece 212.

Figure 6A:
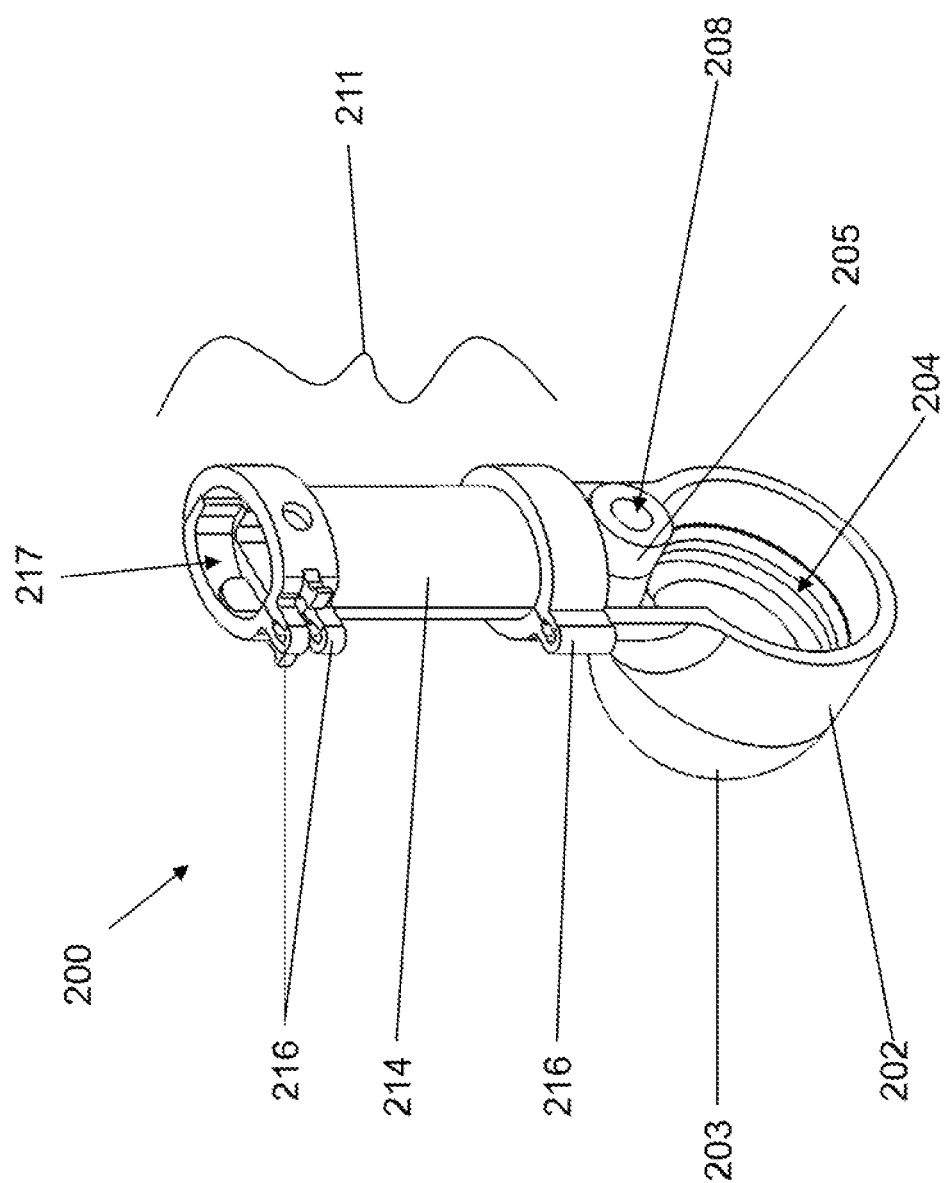
FIG. 6A illustrates a bottom-side perspective view of AM tag frame standing vertical and having a closed ferrite encasing according to one embodiment.
Figure 6B:
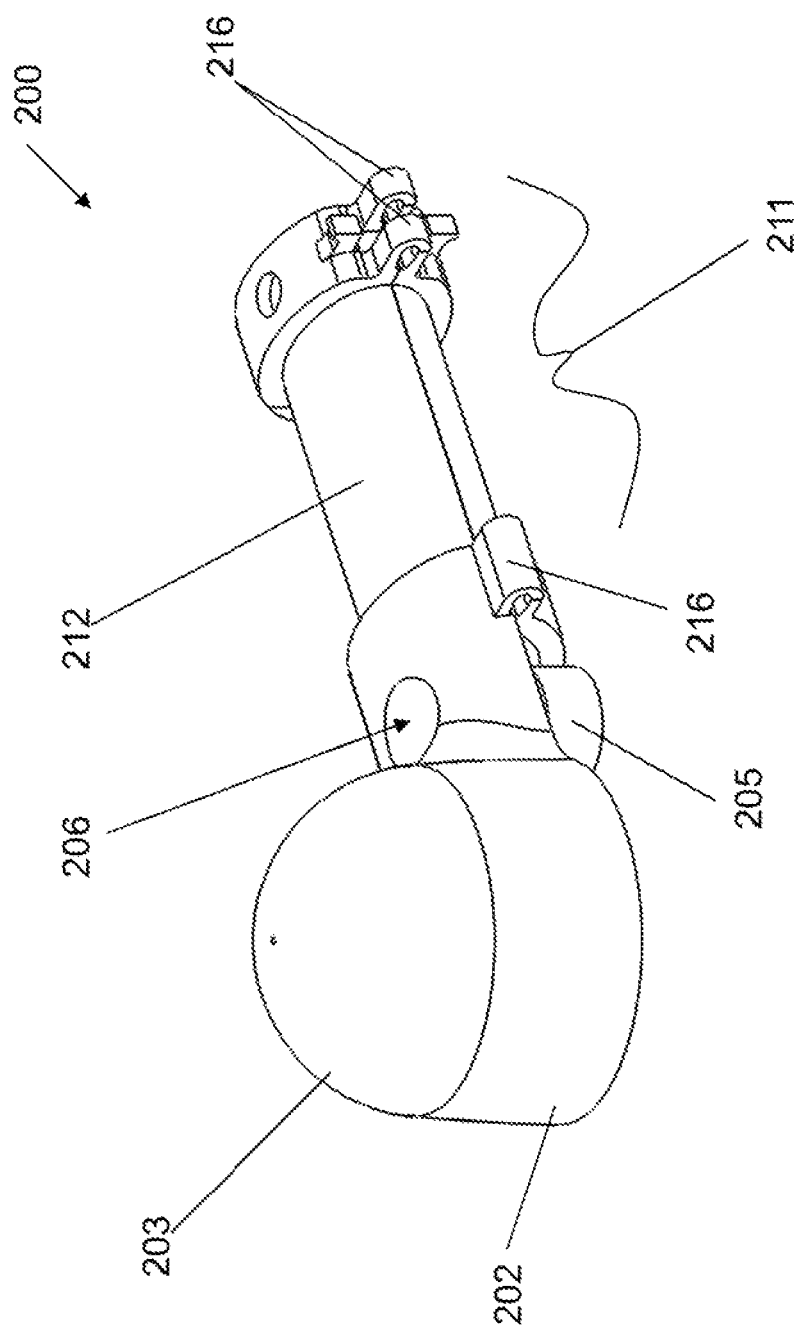
FIG. 6B illustrates a top-side perspective view of AM tag frame lying horizontal and having a closed ferrite encasing according to one embodiment.

FIG. 6A illustrates a bottom-side perspective view of AM tag frame 200, standing vertical, having a closed ferrite encasing 211. FIG. 6B illustrates a top-side perspective view of AM tag frame 200, lying horizontal, having a closed ferrite encasing 211. The closed ferrite encasing 211 forms a tube with an opening formed at least one end of the tube. The opening formed in the closed ferrite encasing 211, opposite the stationary and swivel encasing end connection with the tag bridge 201, is ferrite encasing access way 217.

Figure 7:
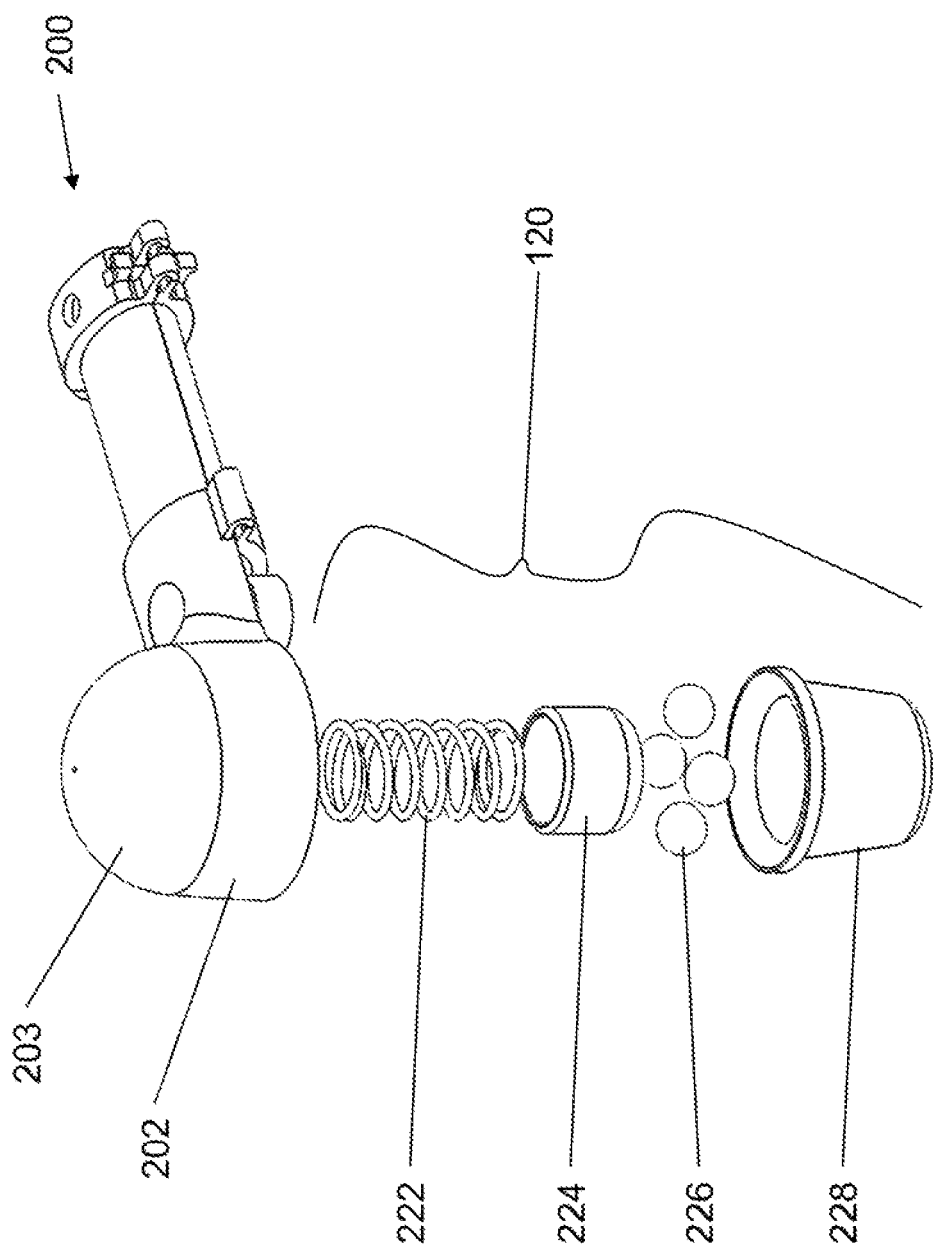
FIG. 7 illustrates AM tag frame and pieces of the lock component ordered for assembly into AM tag frame according to one embodiment.

Referring to FIG. 4B, at step 182, the lock component 120 is assembled into AM tag frame 200. FIG. 7 illustrates AM tag frame 200 and pieces of the lock component 120 ordered for assembly into AM tag frame 200. Lock component 120 includes a spring 222, pusher 224, balls 226, and lock component chamber 228. One end of spring 222 is inserted into the lock component cavity 204 (see FIG. 5A) and the other end is covered by pusher 224. The pusher 224 may resemble a cap having one open end and a closed end opposite the open end. The end of the spring 227 covered by the pusher 224 first passes through the open end of the pusher 224 and then is positioned against the inside side of the closed end of the pusher 224. Balls 226, four of which are shown in FIG. 7, are placed inside the lock component chamber 228 to rest on the floor of the lock component chamber 228. The top-side of the balls 226 are positioned against the external side of the closed end of the pusher 224. The open end of the lock component chamber 228, opposite the floor end of the chamber 228, is placed over the balls 226 and the bottom side of the pusher 224, opposite the side of the pusher 224 where an opening allows for the spring 222 to be inserted. The lock component chamber 228 is then pushed towards the lock component cavity 204 such that the spring 222 compresses against the internal side of the lock component compartment dome 203 and within lock component compartment 202.

Figure 8:
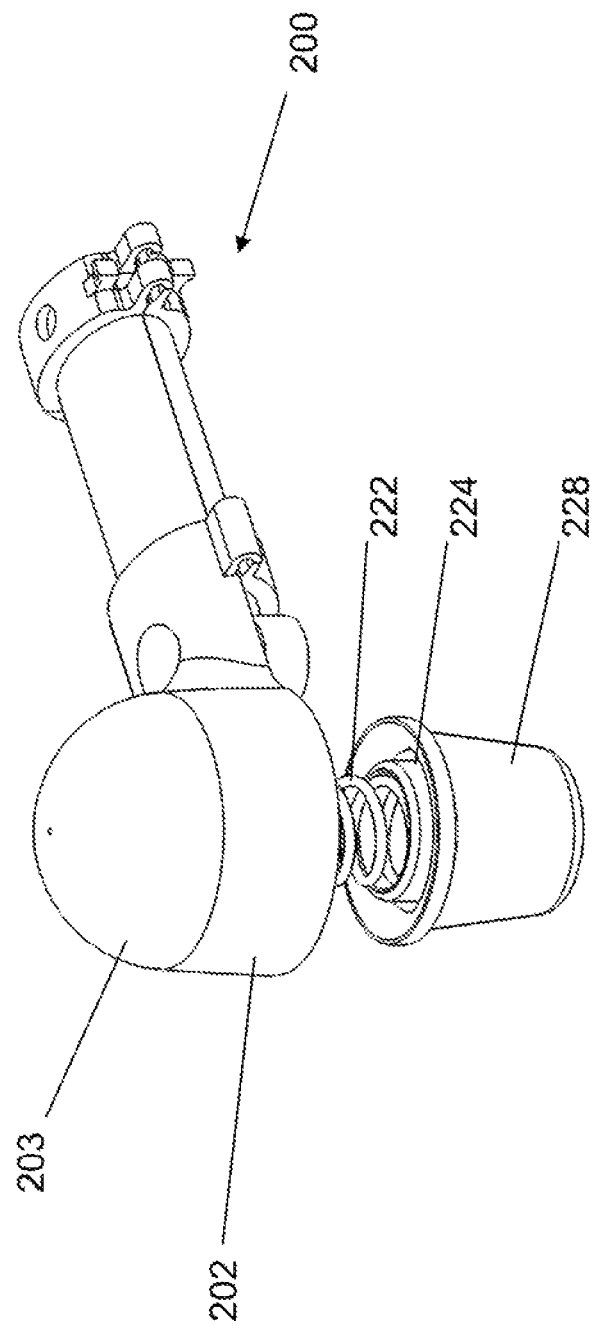
FIG. 8 illustrates AM tag frame and the pieces of the lock component partially concealed inside the lock component compartment dome and lock component compartment according to one embodiment.

FIG. 8 illustrates AM tag frame 200 and the pieces of the lock component 120 partially concealed inside the lock component compartment dome 203 and lock component compartment 202, along with inside the lock component chamber 228. The lock component chamber 228 may be pushed into the lock component compartment 202 until the top edge of the lock component chamber 228 is snapped and held in place within the lock component compartment 202 at about the bottom edge of the lock component chamber 228 opposite the edge in connection with the lock component compartment dome 203. In other embodiments, the top edge of the lock component chamber 228 may include screw ridges to coincide with screw ridges about the bottom portion of the lock component compartment 202, located internal or external of the circumferential wall of the lock component compartment 202, so that the lock component chamber 228 may screw into the lock component compartment 202.

Figure 9A:
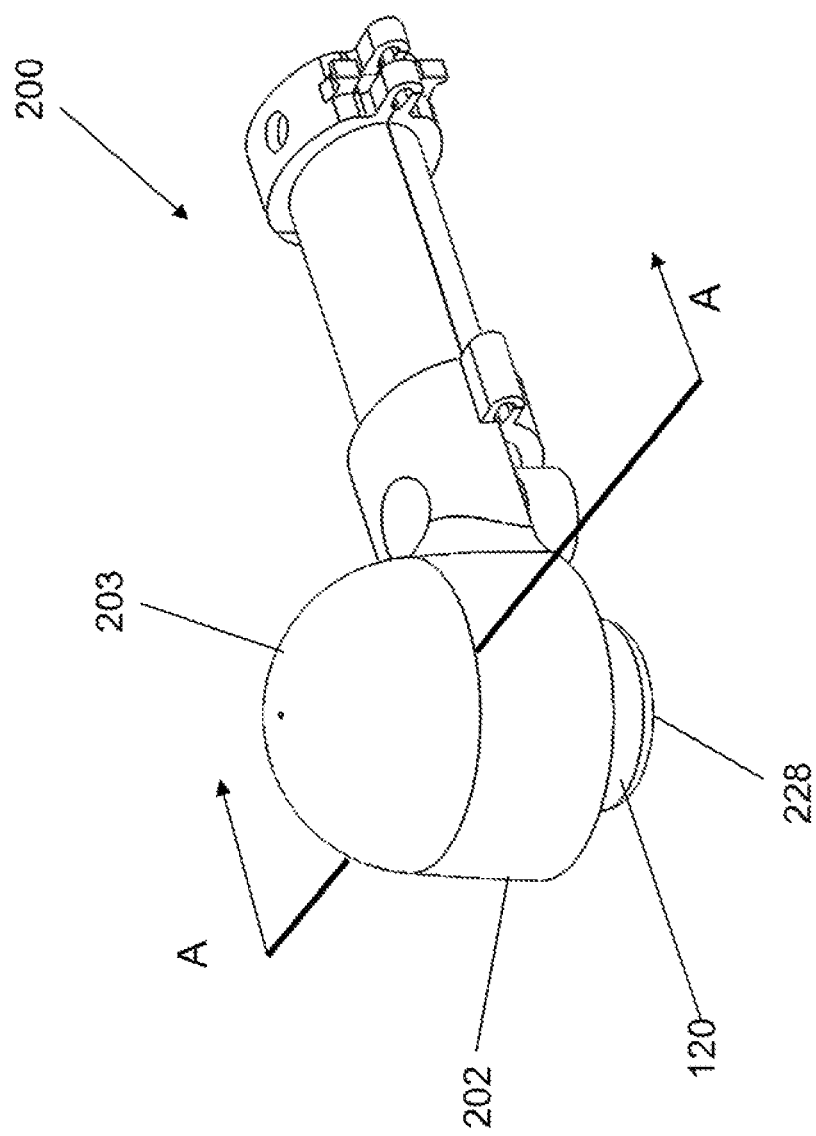
FIG. 9A illustrates AM tag frame and the pieces of the lock component concealed inside the lock component compartment dome, lock component compartment, and lock component chamber according to one embodiment.
Figure 9B:
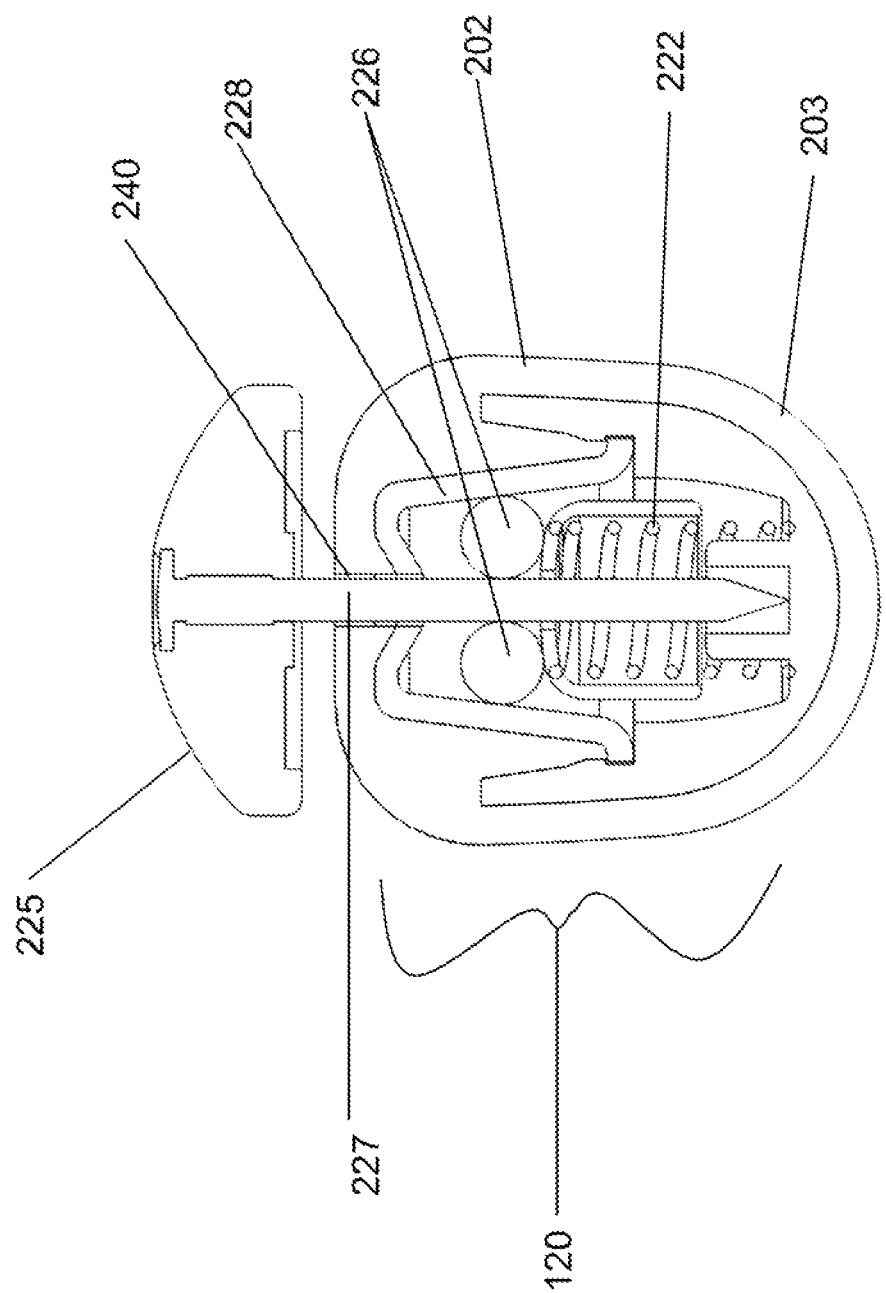
FIG. 9B illustrates a diagrammatic cross-sectional view of the lock component, as viewed in direction A-A in FIG. 9A, with lock pin attached with balls engaged locking lock pin according to one embodiment.
Figure 9C:
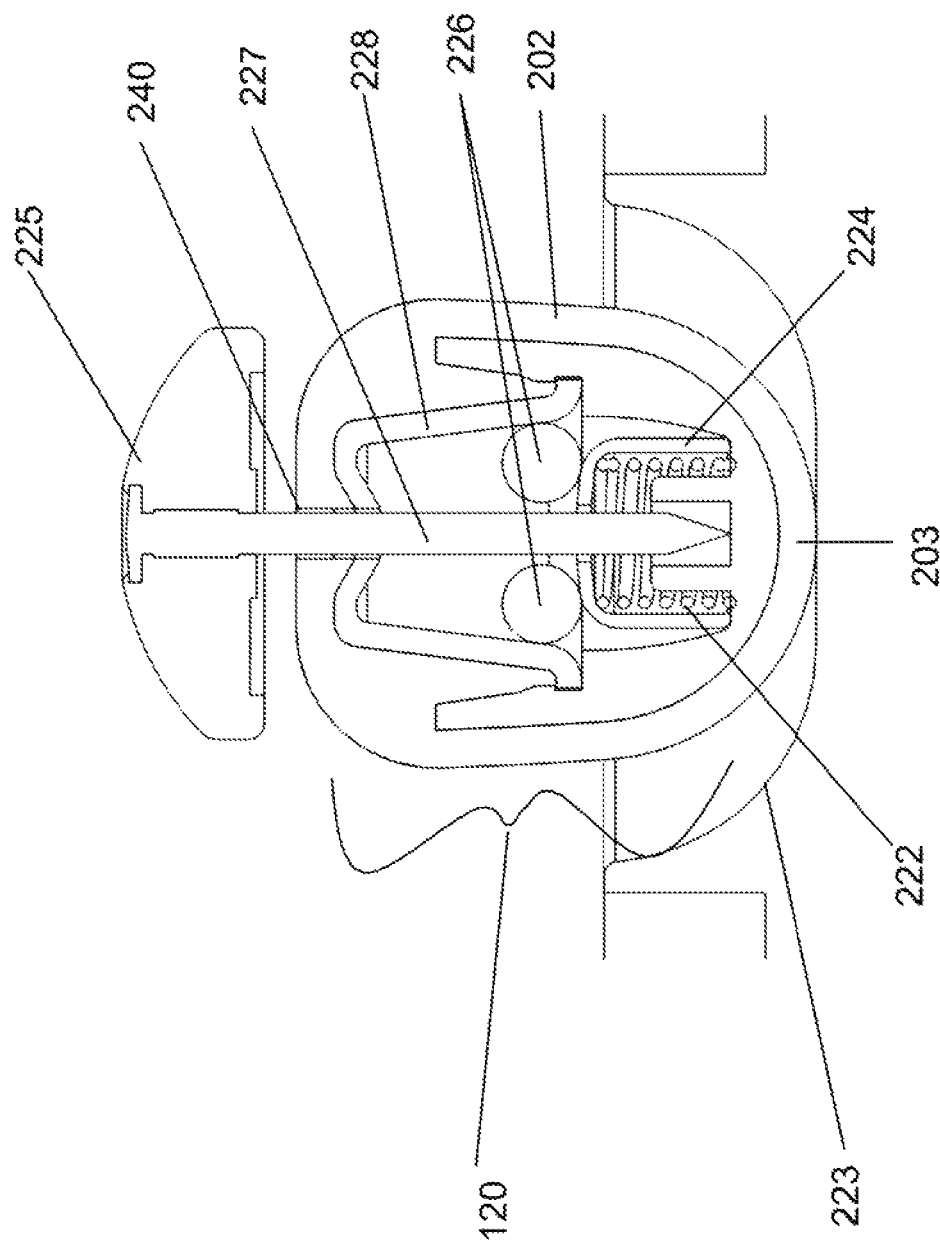
FIG. 9C illustrates a diagrammatic cross-sectional view of the lock component, as viewed in direction A-A in FIG. 9A, on a magnet detacher with lock pin attached and the balls not engaged and the lock pin released for removal according to one embodiment.

FIG. 9A illustrates AM tag frame 200 and the pieces of the lock component 120 concealed inside the lock component compartment dome 203, lock component compartment 202, and lock component chamber 228. As shown in FIG. 9A, the bottom of the lock component chamber 228 is visible, with the lock component chamber locked in place about the lock component compartment 202 and lock component compartment dome 203. FIG. 9B illustrates a diagrammatic cross-sectional view of the lock component 120, as viewed in direction A-A in FIG. 9A, with lock pin 227 attached and with balls 226 engaged locking lock pin 227. FIG. 9C illustrates a diagrammatic cross-sectional view of the lock component 120, as viewed in direction A-A in FIG. 9A, on a magnet detacher 223 with lock pin 227 attached, with balls 226 not engaged on the lock pin 227 so that the lock pin 227 is released for removal from the lock component compartment 202 and lock component compartment dome 203 through lock pin cavity 240. In both FIG. 9B and FIG. 9C, AM tag frame 200 is shown flipped one hundred and eighty degrees from as shown in FIG. 9A, such that the lock component compartment dome 203 is facing down as opposed to up.

As shown in FIG. 9B and 9C, the lock pin 227 is inserted into an opening, being the lock pin cavity 240 (see also FIG. 15B), centered about the floor of the lock component chamber 228. As shown in FIG. 9B, when inserted, lock pin 227 moves into the lock component compartment 202 towards the lock component compartment dome 203, between the four balls 226. Pusher 224 and lock component chamber 228 both force the four balls 226 to tighten about the lock pin 227 to hold the lock pin 227 in place. With the lock pin 227 locked into the lock component 120, a garment or other merchandise may be held between the AM tag frame 200 and pin head 225 of lock pin 227. The pin head 225 is connected to one end of the lock pin 227, and remains positioned external of AM tag frame 200. As shown in FIG. 9C, to detach lock pin 227 from the lock component compartment 202 and out of lock component 102, an external magnet detacher 223, a cross section of which is shown, may be applied. The magnet detacher 223 may be positioned near the peak of the lock component compartment dome 203, resulting in the pusher 224, spring 222, and balls 226 being drawn to the magnetic detacher by magnetic forces, releasing the lock pin 227 from between the balls 226 so that the lock pin 227 may be removed from the lock component compartment 202 and out through the lock pin cavity 240 (see also FIG. 15B) of lock component chamber 228.

Referring to FIG. 4B, at step 183, the lock component 120 is tested so as to attain a 100% detachment of the pin from the lock component 120 under FQC and as described for above. Once a housing 110 is formed around the tag core piece 140, the lock pin 227 will additionally have to pass through an accessway 111 before entering lock pin cavity 240 to lock within the lock component 120.

Referring again to FIG. 4B, at step 184, AM security component 130 is assembled about AM tag frame 200. To begin assembly of the AM security component 130 about AM tag frame 200, wire is first wrapped around a portion of tag frame at step 186. The wire may be enameled or insulated wire, such that the wire is referred to as enameled/insulated wire 232.

Figure 10:
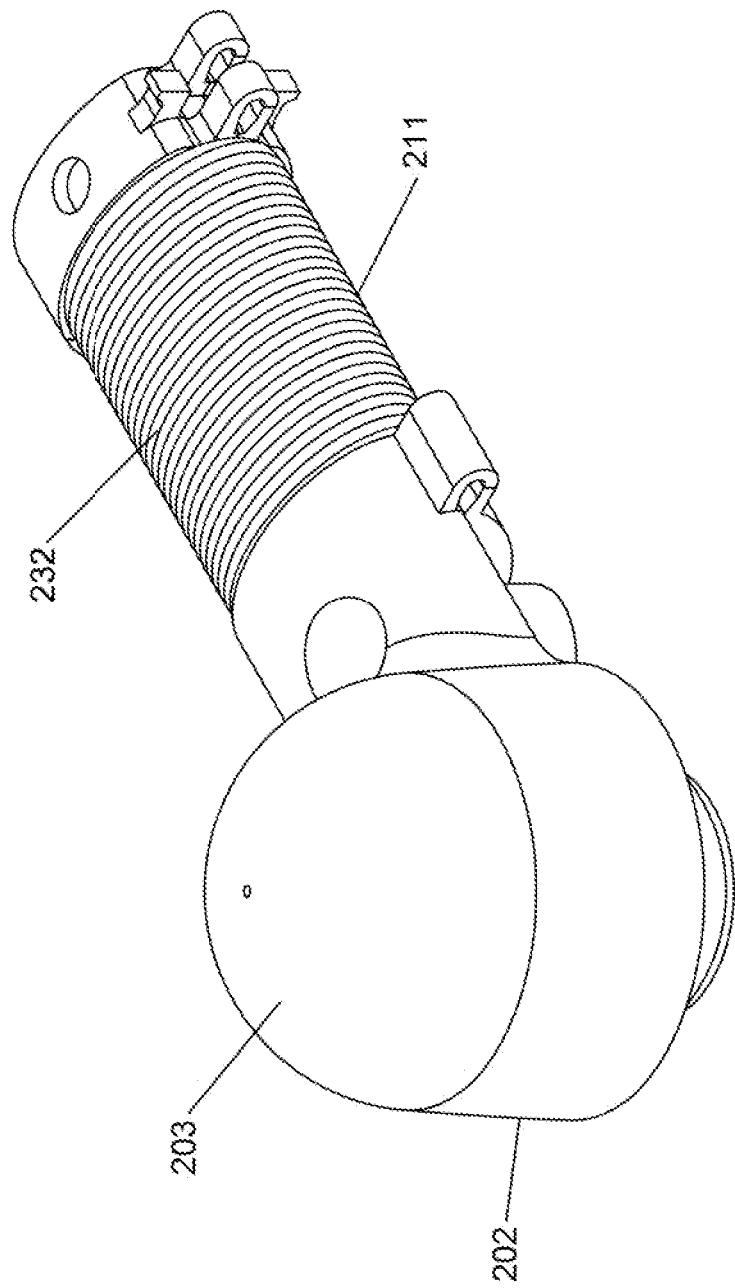
FIG. 10 illustrates a perspective view of AM tag frame with enameled/insulated wire wrapped around the closed ferrite encasing according to one embodiment.

FIG. 10 illustrates a perspective view of AM tag frame 200 with enameled/insulated wire 232 wrapped around the closed ferrite encasing 211. The enameled/insulated wire 232 is wrapped around both the circumference of the stationary ferrite encasing side piece 212 and swivel ferrite encasing side piece 214, in the portion formed of both pieces 212, 214 between the two closure clamps 218 (see also FIG. 68).

Figure 11:
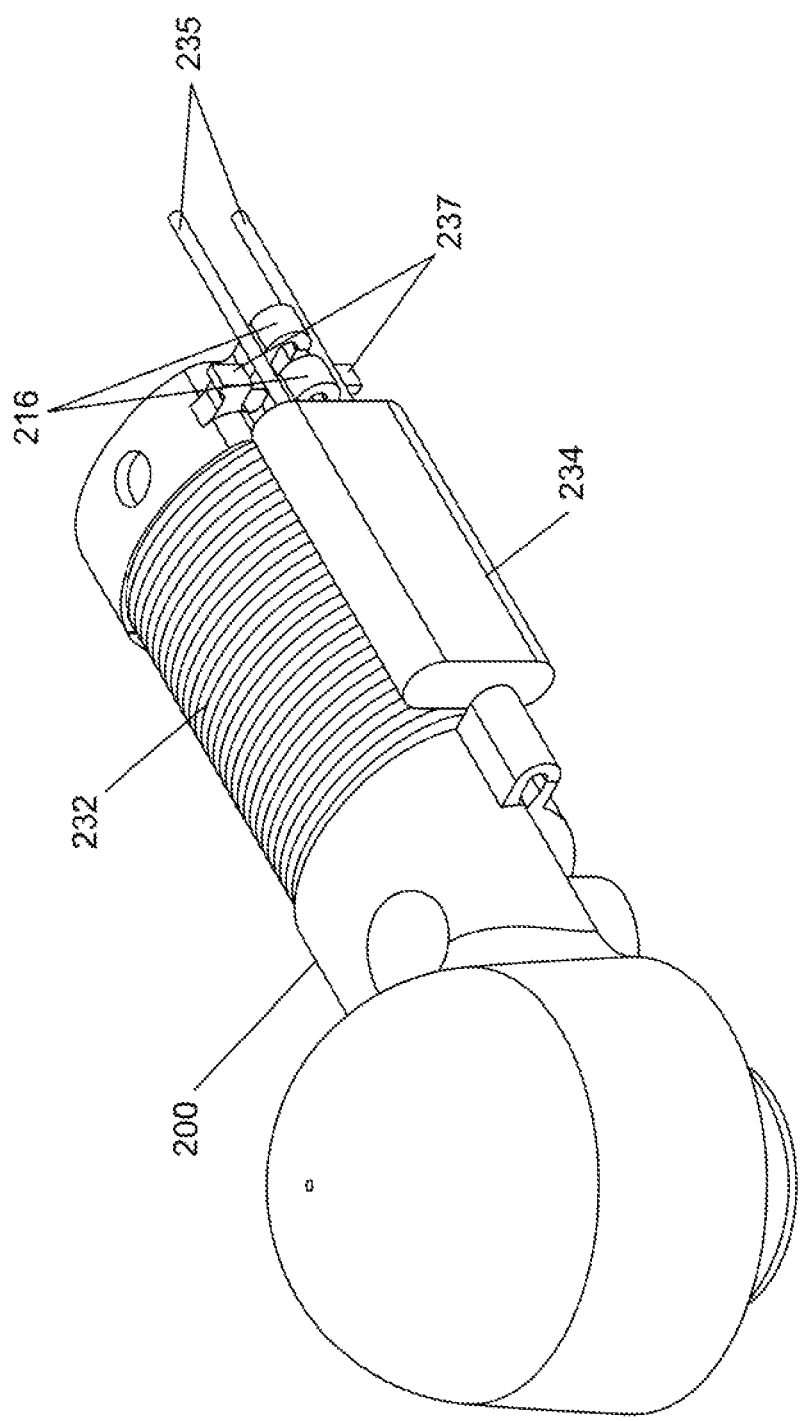
FIG. 11 illustrates a perspective view of AM tag frame with capacitor located on AM tag frame according to one embodiment.

Referring again to FIG. 4B, capacitor 234 is then placed onto AM tag frame 200 at step 188. FIG. 1 illustrates a perspective view of AM tag frame 200 with capacitor 234 located on AM tag frame 200. As shown in FIG. 11, capacitor 234 is attached onto AM tag frame 200, such that the length of capacitor 234 is positioned across the enameled tag wire 232 in a position orthogonal to the direction in which the enameled/insulated wire 232 is wrapped. The capacitor 234 may be placed about or in proximity to the closed ferrite encasing 211. The capacitor 234 may simply rest above the enameled tag wire 232 over the closed ferrite encasing 211 or be adhered to the wire 232 and/or a portion of the closed ferrite encasing 211. Two capacitor feet 235 extend from one end of the capacitor 234, both parallel to one another and each located on opposite sides of the encasing swivel joints 216, wherein swivel joints 216 are bent forming the closed ferrite encasing 211. Each capacitor foot 235 is located between the swivel joints 216 and one of the encasing notches 237, wherein one notch 237 extends from the stationary ferrite encasing side piece 212 and the other from the swivel ferrite encasing side piece 214.

Figure 12A:
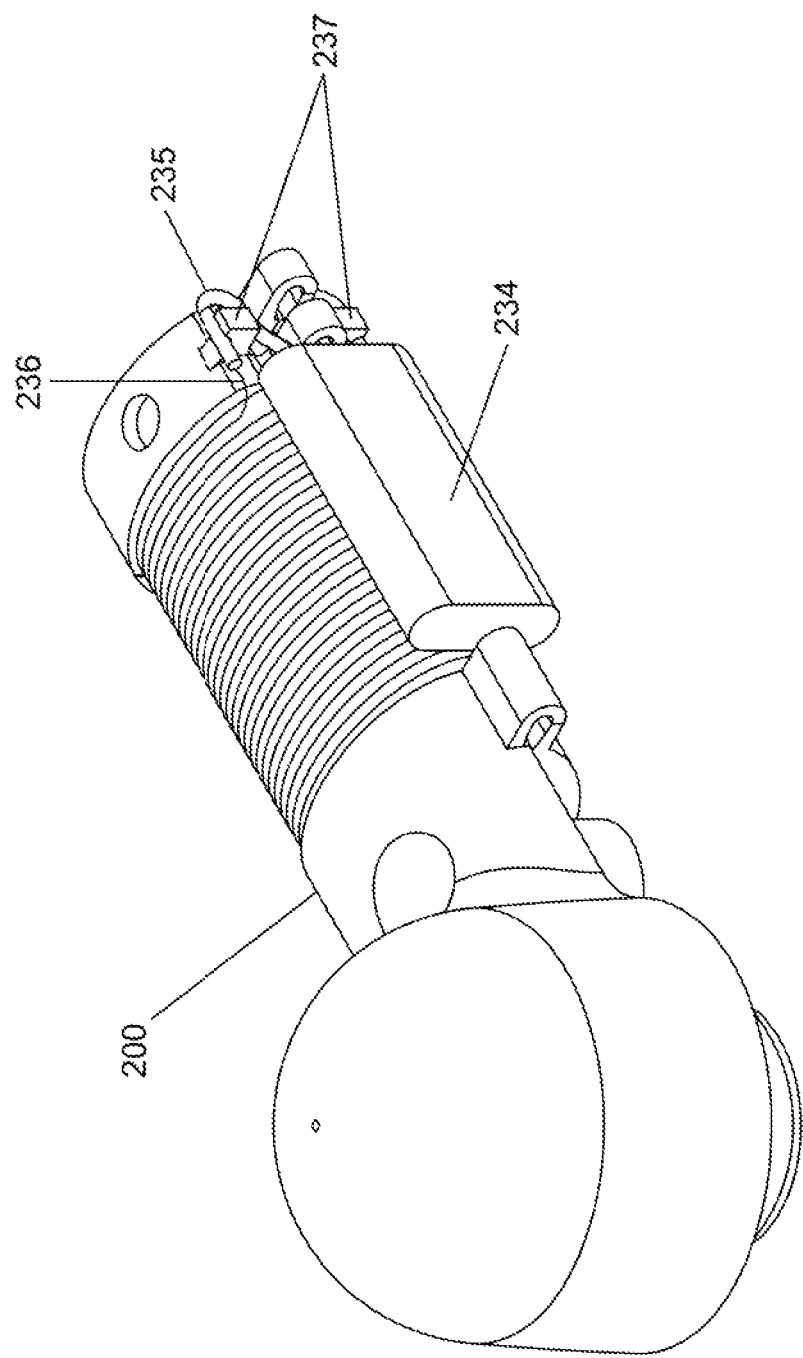
FIG. 12A illustrates a perspective view of AM tag frame with capacitor located about tag frame with capacitor feet folded back onto the frame according to one embodiment.
Figure 12B:
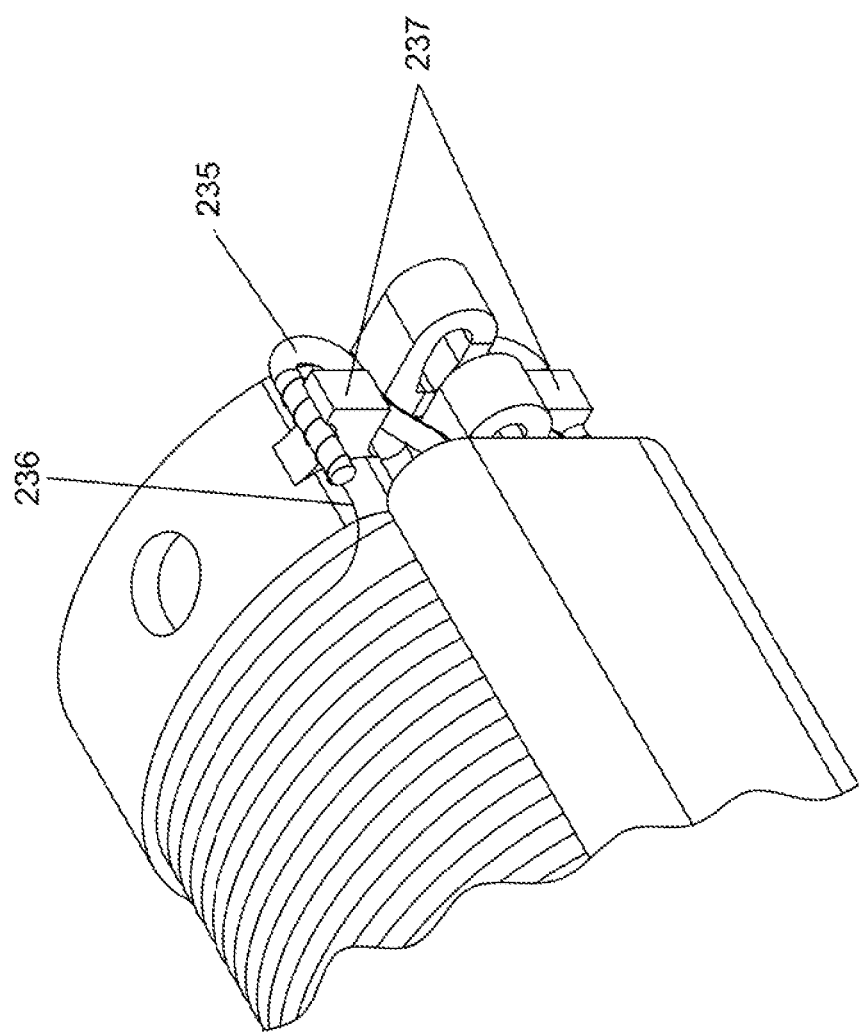
FIG. 12B illustrates a close-up view of the capacitor feet connected with the enameled/insulated wire ends according to one embodiment.
Figure 12C:
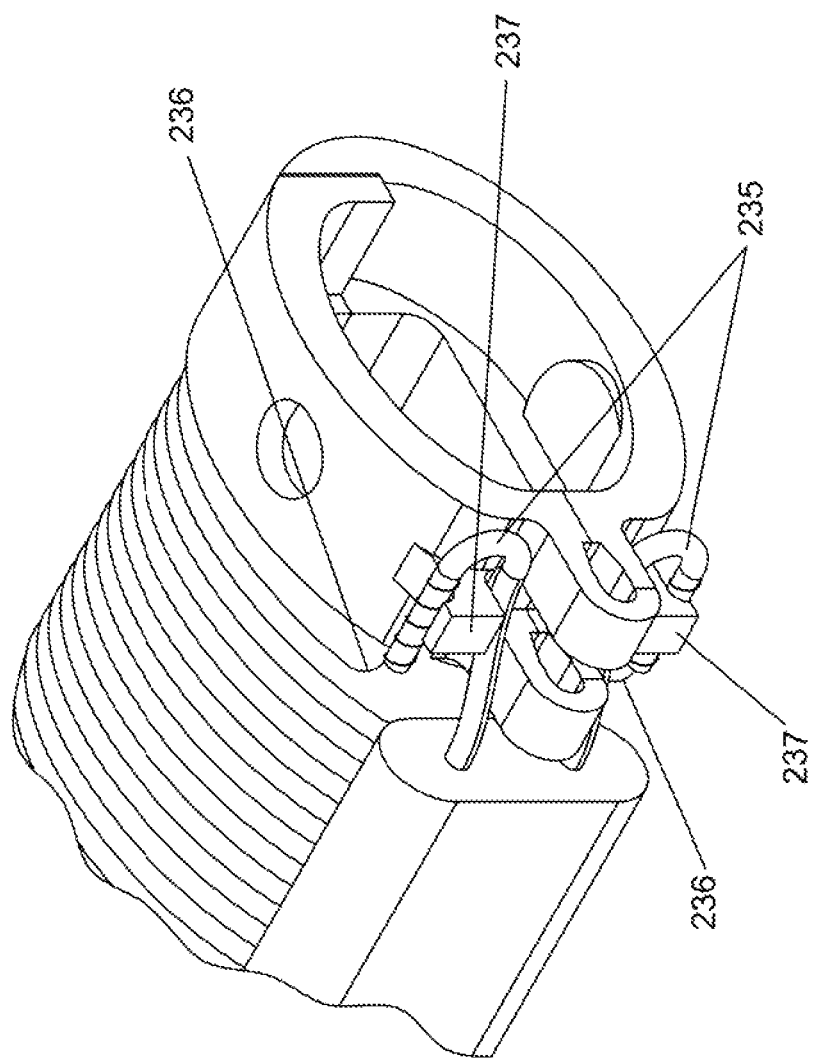
FIG. 12C illustrates another close-up view of the capacitor feet connected with the enameled/insulated wire ends according to one embodiment.

Referring again to FIG. 4B, at step 190, each capacitor foot 235 is soldered to one of the ends of the enameled/insulated wire 232. The capacitor feet 235 are then folded onto AM tag frame 200. In the preferred embodiment, folding the capacitor feet 235 onto the frame 200 secures the capacitor 234 to the frame 200. FIG. 12A illustrates a perspective view of AM tag frame 200 with capacitor 234 located about AM tag frame 200 with capacitor feet 235 folded back onto the frame. FIGS. 12B and 12C illustrate a close-up view of the capacitor feet 235 connected with the enameled/insulated wire ends 236. FIGS. 12B and 12C also show the folded capacitor feet 235 around encasing notches 237. Each enameled/insulated wire end 236 is soldered to one end of a capacitor foot 235.

Figure 13:
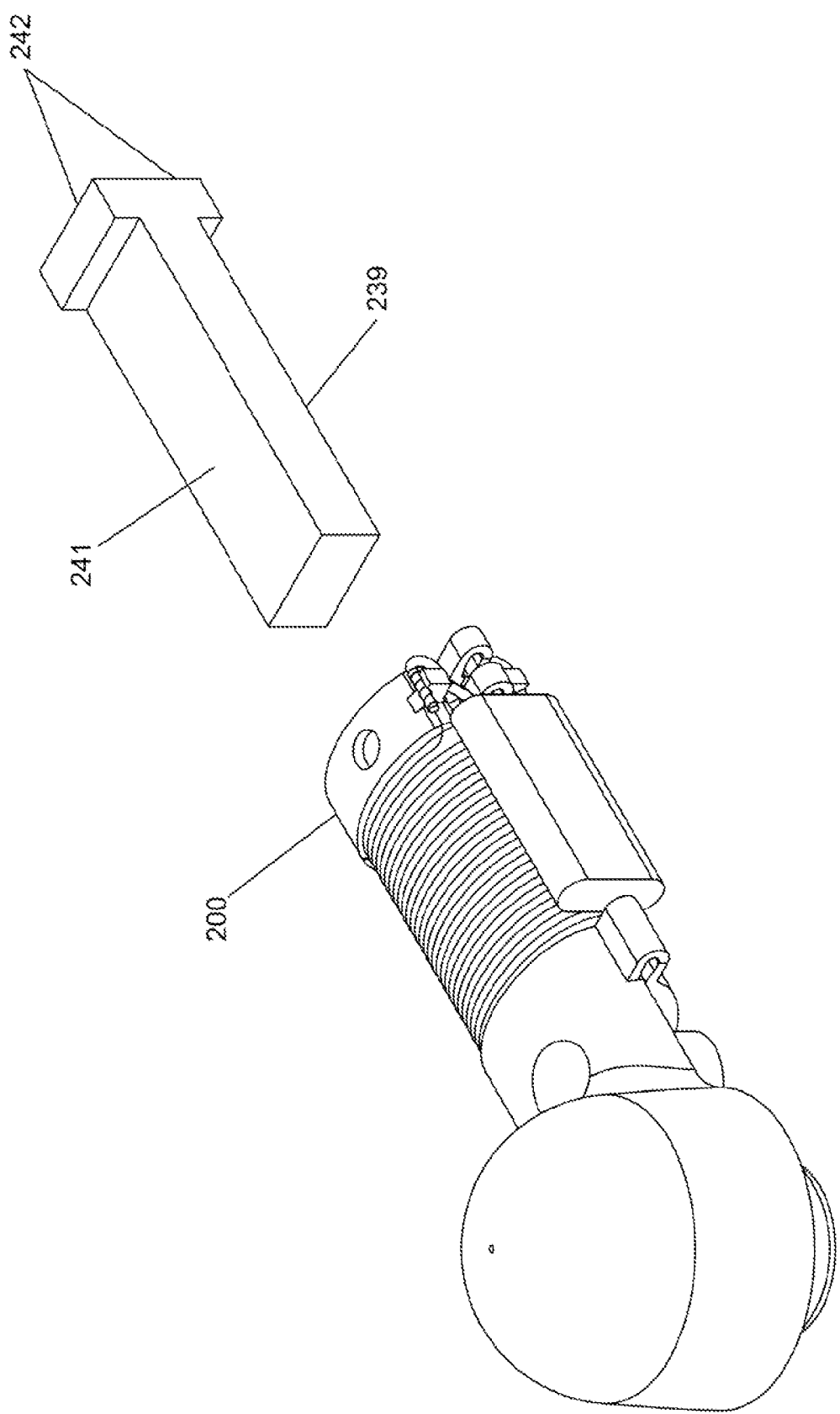
FIG. 13 illustrates a perspective view of AM tag frame separate from ferrite rod before ferrite rod is inserted into the tag frame according to one embodiment.

Referring again to FIG. 48, at step 192, ferrite rod 239 is inserted into AM tag frame 200 to form the finalized AM tag core piece 140. In the disclosure, the AM tag core piece 140 is the AM tag frame 200 containing the security and/or lock components. However, in other embodiments, the finalized AM tag core piece 140 may contain either one of the security or lock components or some other components and/or any combination of one or more security, lock, or other components. FIG. 13 illustrates a perspective view of AM tag frame 200 separate from ferrite rod 239 before ferrite rod 239 is inserted into the AM tag frame 200. As shown in FIG. 13, the ferrite rod 239 is t-shaped having a ferrite insertion bar 241 and ferrite back ends 242, the back ends 242 extending in opposite directions from one another at one end of the insertion bar 241 and orthogonal in direction to the length of the ferrite insertion bar 241.

Figure 14:
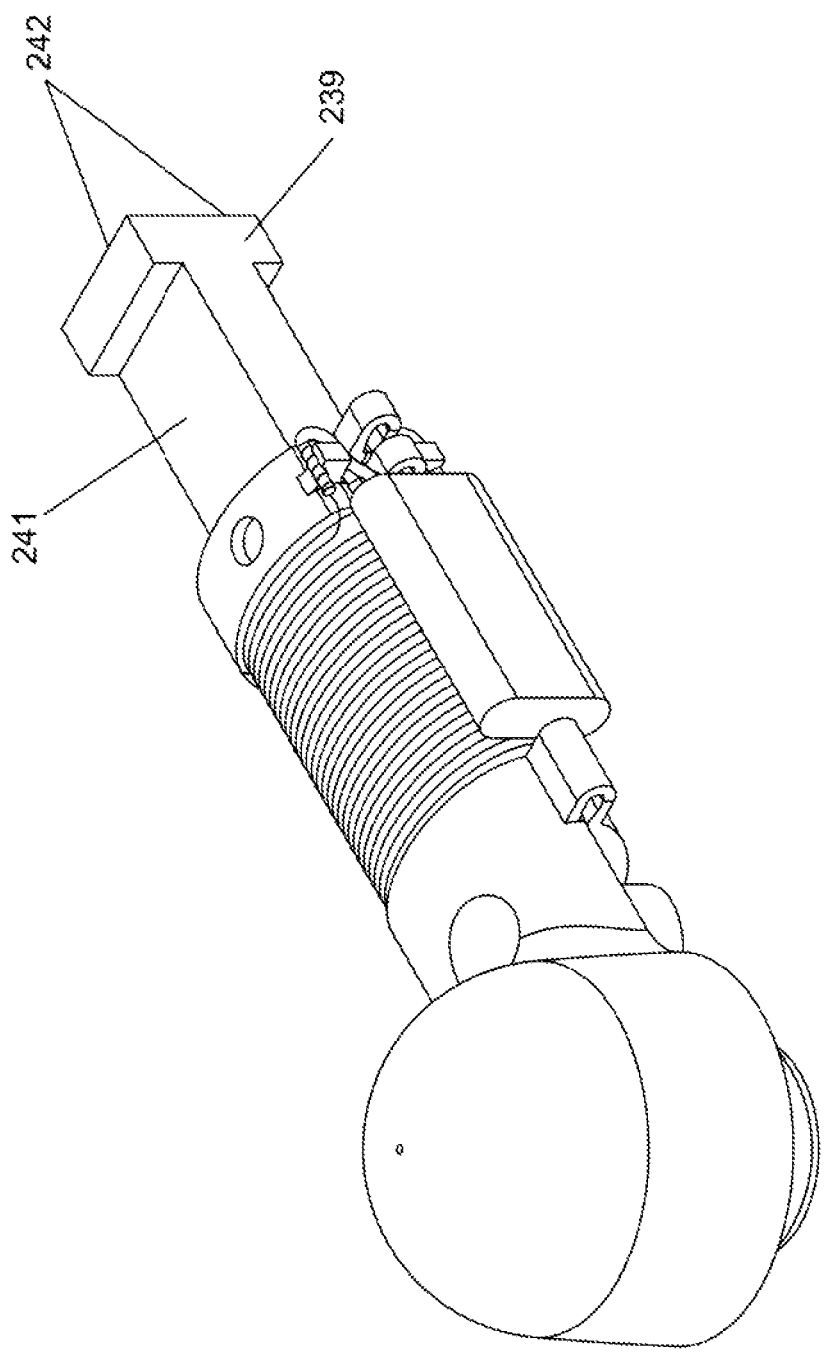
FIG. 14 illustrates a perspective view of ferrite rod inserted into AM tag frame according to one embodiment.

FIG. 14 illustrates a perspective view of ferrite rod 239 inserted into AM tag frame 200. Ferrite rod 239 is inserted into the AM tag frame 200 at the end of the ferrite rod 239 not having back ends 242. The ferrite insertion bar 241 of ferrite rod 239 is inserted into the ferrite encasing access way 217 (see FIG. 6A). Thus the ferrite rod 239 is inserted within the closed ferrite encasing 211 and thus inside enameled tag wire 232. The ferrite rod 239 is pushed into the ferrite encasing access way 217 until the correct frequency is achieved within the AM tag frame 200, which may or may not be where the ferrite back ends 242 are up against the edges of the closed ferrite encasing 211 about the entrance of the ferrite encasing access way 217. The correct frequency results in the AM security component 130 being detectable by a detector. After the ferrite rod 239 is inserted into the tag frame in the right position for proper frequency, the AM tag core piece 140 is formed.

Figure 15A:
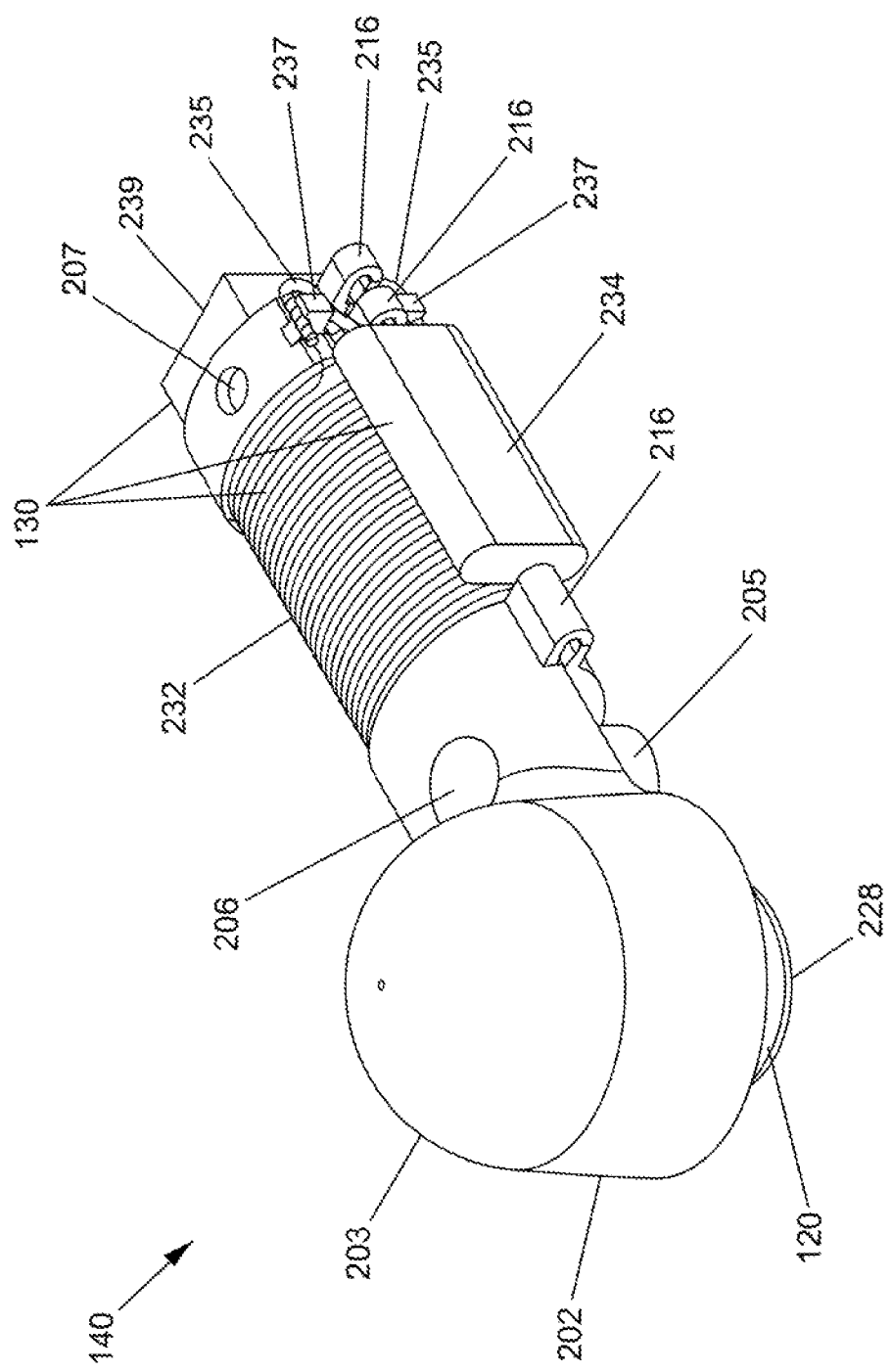
FIG. 15A illustrates a perspective view of the AM tag core piece according to one embodiment.
Figure 15B:
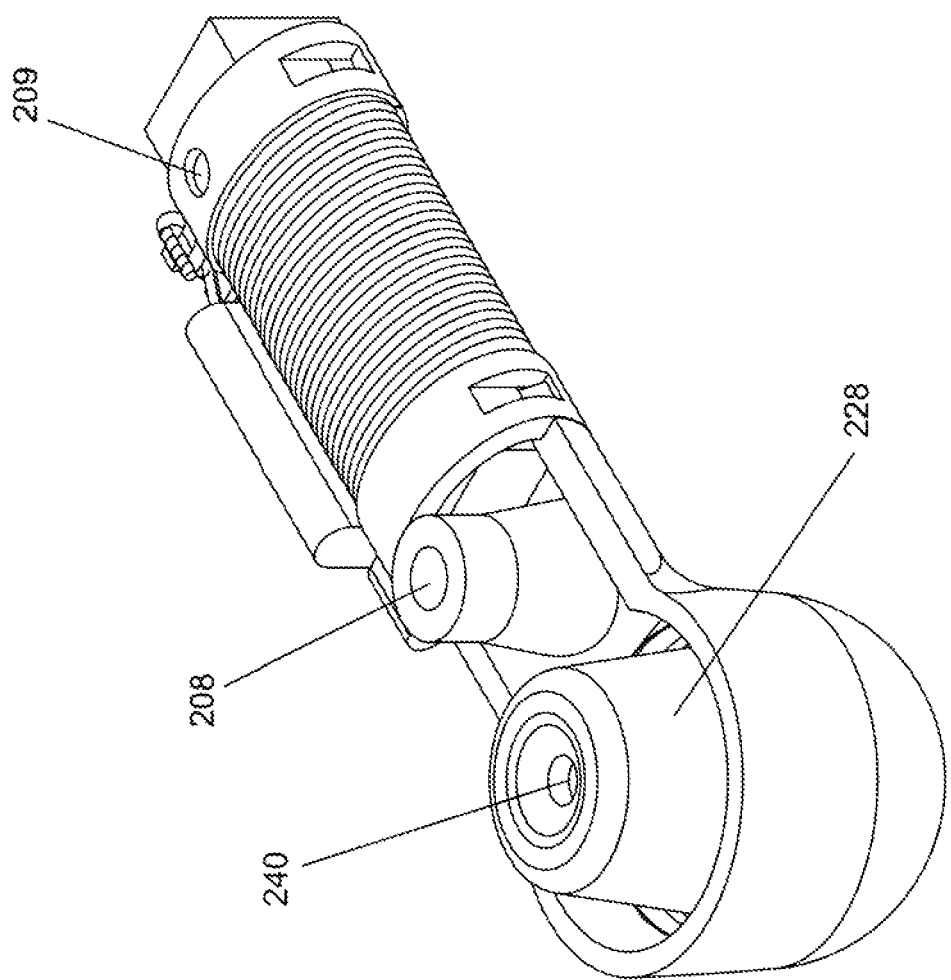
FIG. 15B illustrates a bottom-side perspective view of the AM tag core piece of FIG. 15A according to one embodiment.

FIG. 15A illustrates a perspective view of the AM tag core piece 140. FIG. 15B illustrates a bottom-side perspective view of the AM tag core piece 140 of FIG. 15A. Referring again to FIG. 4B, ferrite rod 239 is secured at the correct frequency for activation at step 194, following insertion of the ferrite rod 239 into the AM tag frame 200 in step 192. The ferrite rod 239 may be mechanically snapped into AM tag frame 200. The ferrite rod 239 may also be glued to the internals of AM tag frame 200 and/or secured in any other fashion known by one of ordinary skill in the art into AM tag frame 200. The AM tag core piece 140, as shown in the preferred embodiment (see FIG. 15A), which includes the lock component 120 and AM security component 130, may operate as a working EAS tag, being an AM tag in the preferred embodiment. In other embodiments, modifications or alternatives to the ferrite rod 239, capacitor 234, and/or to the thickness, diameter, or number of enameled/insulated wires 232 from that shown in the preferred embodiment, may be provided to the tag core piece 140. By changing ferrite rods 239, capacitor 234, enameled/insulated wires' thickness, diameter or amount, this embodiment may apply in a RF tag utilizing ferrite. In an RF tag with ferrite, the tuned frequency may be 8.2 MHz based on the number of enameled/insulated wire turns and capacitance value.

As shown in FIG. 15B, the lower mold connection cavity 208 is shown as the opposing end opening to upper mold connection cavity 206 (see FIG. 5B) on tag bridge 201. Also shown in FIG. 15B, lock pin cavity 240 is visible as centrally located on the floor of the lock component chamber 228 for inserting lock pin 227 (see FIGS. 9B and 9C). Shown in FIG. 15A is the upper encasing cavity 207 and shown in FIG. 15B is the lower encasing cavity 209. The upper encasing cavity 207 and lower encasing cavity 209 serve for connection with inserted ejection bars 326 and 346 further described in the housing injection mold process 300 and in reference to FIGS. 17A and 19A.

In other embodiments, the step 184 of assembling the AM security component 130 into AM tag frame 200 may come before, or may occur simultaneously with step 182 of assembling the lock component 120 into AM tag frame 200.

In reference to FIG. 4B, at step 185, a frequency analysis to attain 100% matched frequency of the manufactured ferrite, inside the AM tag core piece 140, to a detector for sensing the AM solid molded housing tag 100 is conducted at step 185 under FQC. Step 183 occurs after step 182 and step 185 occurs after step 184, but step 183 may occur after or simultaneously with step 185 when both steps 183 and 185 occur after step 184.

With the AM tag core piece 140 finalized, the housing 110 may then be formed to at least partially surround the AM tag core piece 140. In the preferred embodiment, the AM tag core piece 140 may then be subjected to the housing injection mold process 300 to form the housing 110 around the AM tag core piece 140. The housing 110 in the injection mold process 300 is described in reference to FIG. 16. FIG. 16 illustrates the housing injection mold process 300 of the preferred embodiment. FIGS. 17A through 29D may be viewed in conjunction with FIG. 16 to further describe the housing injection mold process 300.

Referring again to FIG. 16, the housing injection mold process 300 initializes with the AM tag core piece 140 inserted into lower mold 320 at step 302.

Figure 17A:
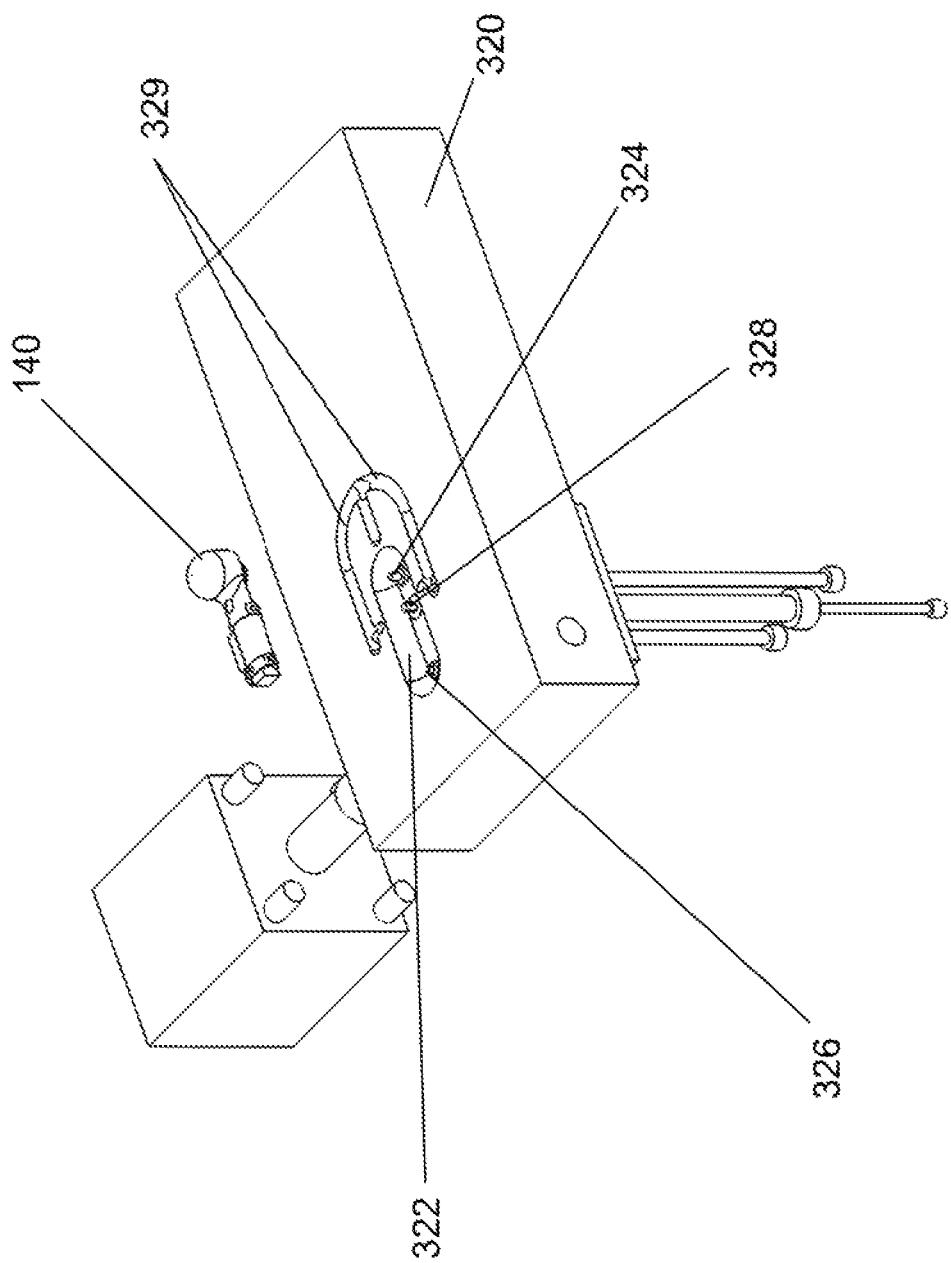
FIG. 17A illustrates a perspective view of the AM tag core piece separate from lower mold according to one embodiment.
Figure 17B:
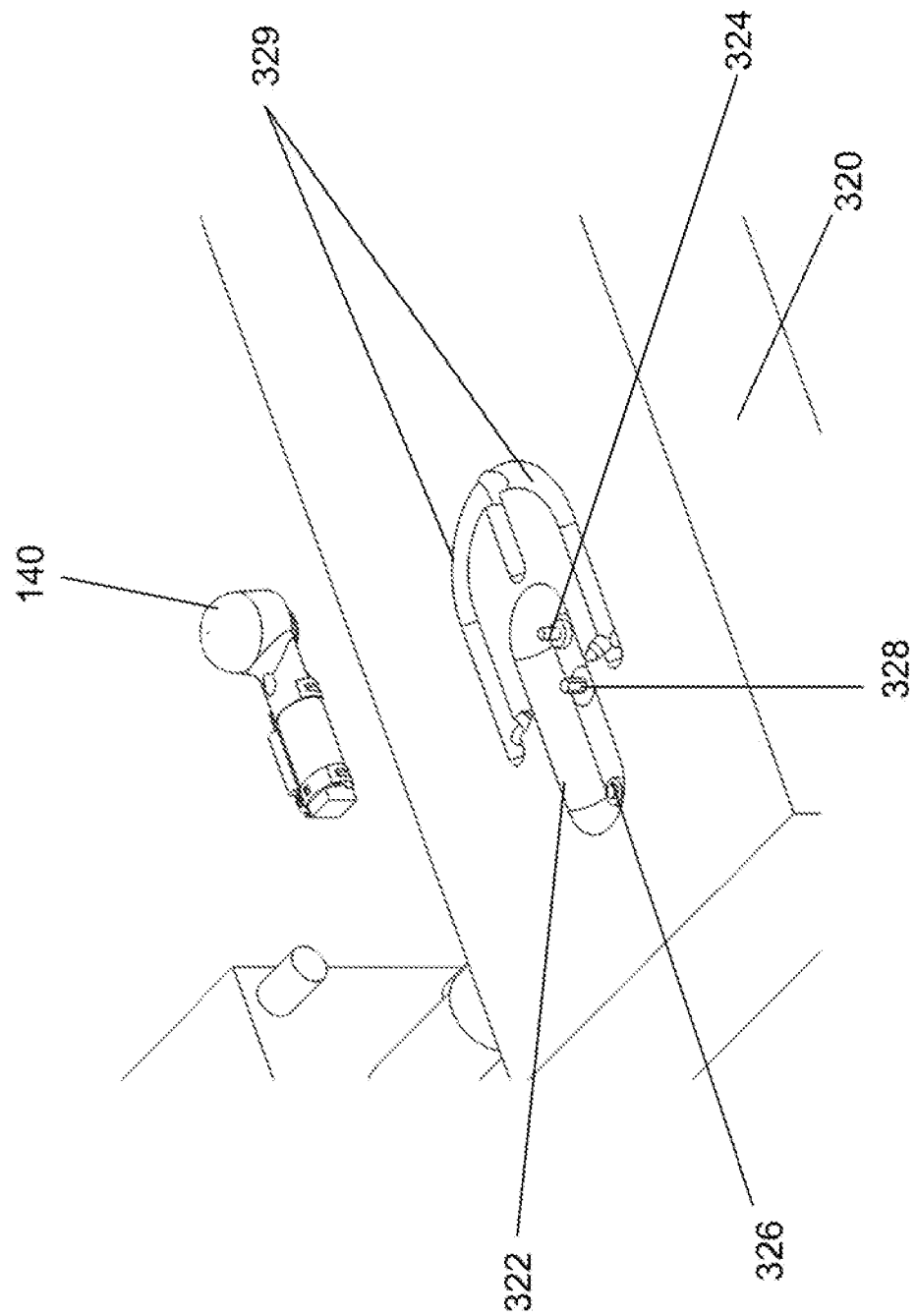
FIG. 17B illustrates a close-up view of the AM tag core piece and lower mold of FIG. 17A according to one embodiment.
Figure 17C:
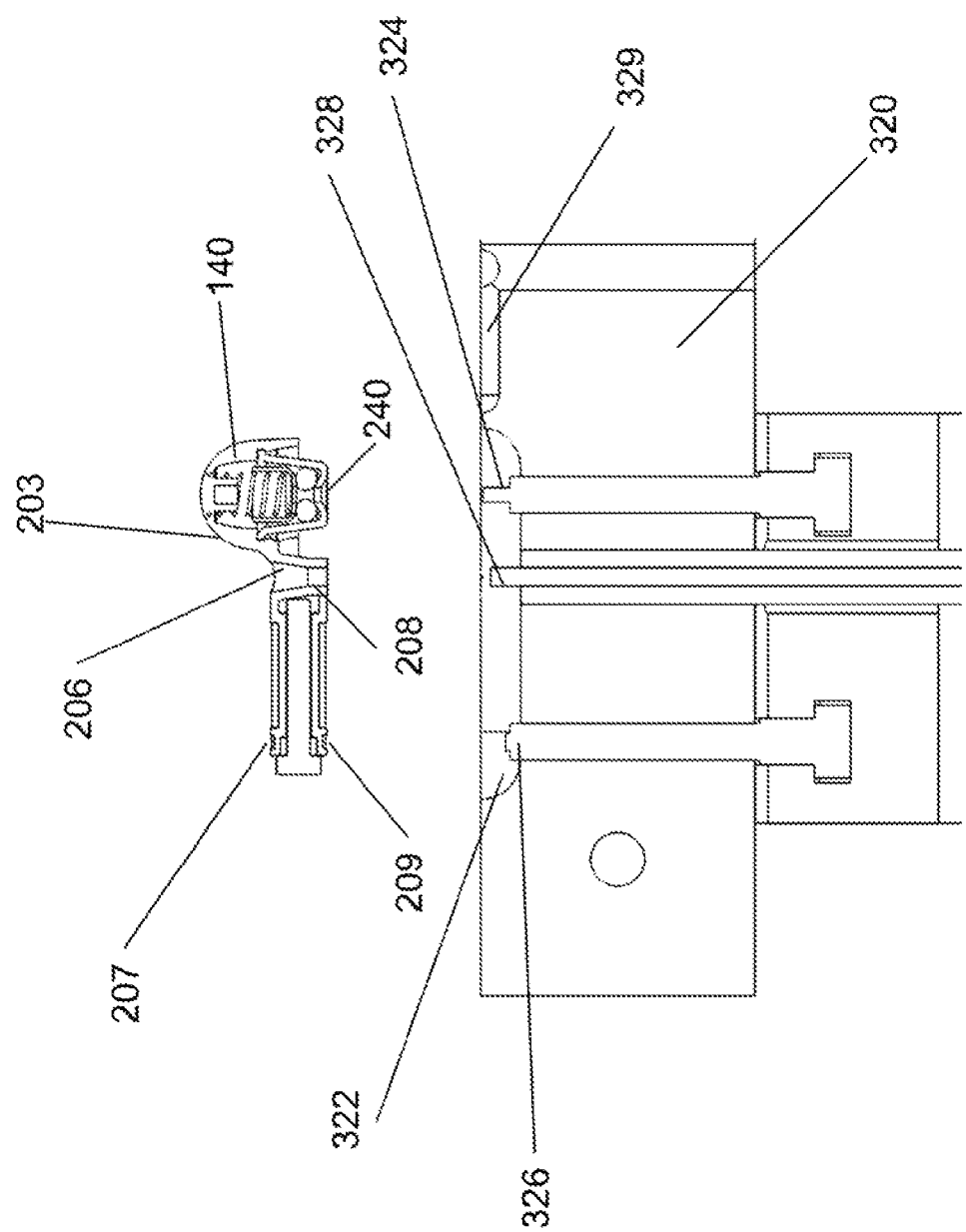
FIG. 17C illustrates a cross-sectional side view of the AM tag core piece and lower mold of FIG. 17A according to one embodiment.

FIG. 17A illustrates a perspective view of the AM tag core piece 140 separate from lower mold 320. FIG. 17B illustrates a close-up view of the AM tag core piece 140 and lower mold 320 of FIG. 17A. FIG. 17C illustrates a cross-sectional side view of the AM tag core piece 140 and lower mold 320 of FIG. 17A.

As shown in FIG. 17A through 17C, lower mold 320 includes an indentation about the upper surface of lower mold 320, wherein the indentation forms lower mold core piece cavity 322 and lower mold runner of plastic 329. The lower mold core piece cavity 322 is shaped like the bottom side of the AM tag core piece 140 (see FIG. 15B) and is larger in length and width than AM tag core piece 140 such that the bottom portion of the AM tag core piece 140 may lie inside lower mold core piece cavity 322. As shown in the in FIG. 17A through 17C, a first lower ejection bar 324, second lower ejection bar 326, and lower mold connection plug 328 are positioned in the interior of lower mold 320 and extending above the floor of the lower mold core piece cavity 322. In the preferred embodiment, lower mold connection plug 328 also extends through beyond the opposite surface of lower mold 320 from the surface in which the lower mold core piece cavity 322 is located. In the preferred embodiment, the lower mold connection plug 328 is immobile. Both the first lower ejection bar 324 and second lower ejection bar 326 also extend through the opposite surface of the lower mold 320 from the surface in which the lower mold core piece cavity 322 is located. However, both the first lower ejection bar 324 and second lower ejection bar 326 are capable of movement in the direction to or away from the location of the AM tag core piece 140, as shown in FIG. 17A through 17C. Both the first lower ejection bar 324 and second lower ejection bar 326 may be moved by machine or operator.

Figure 18A:
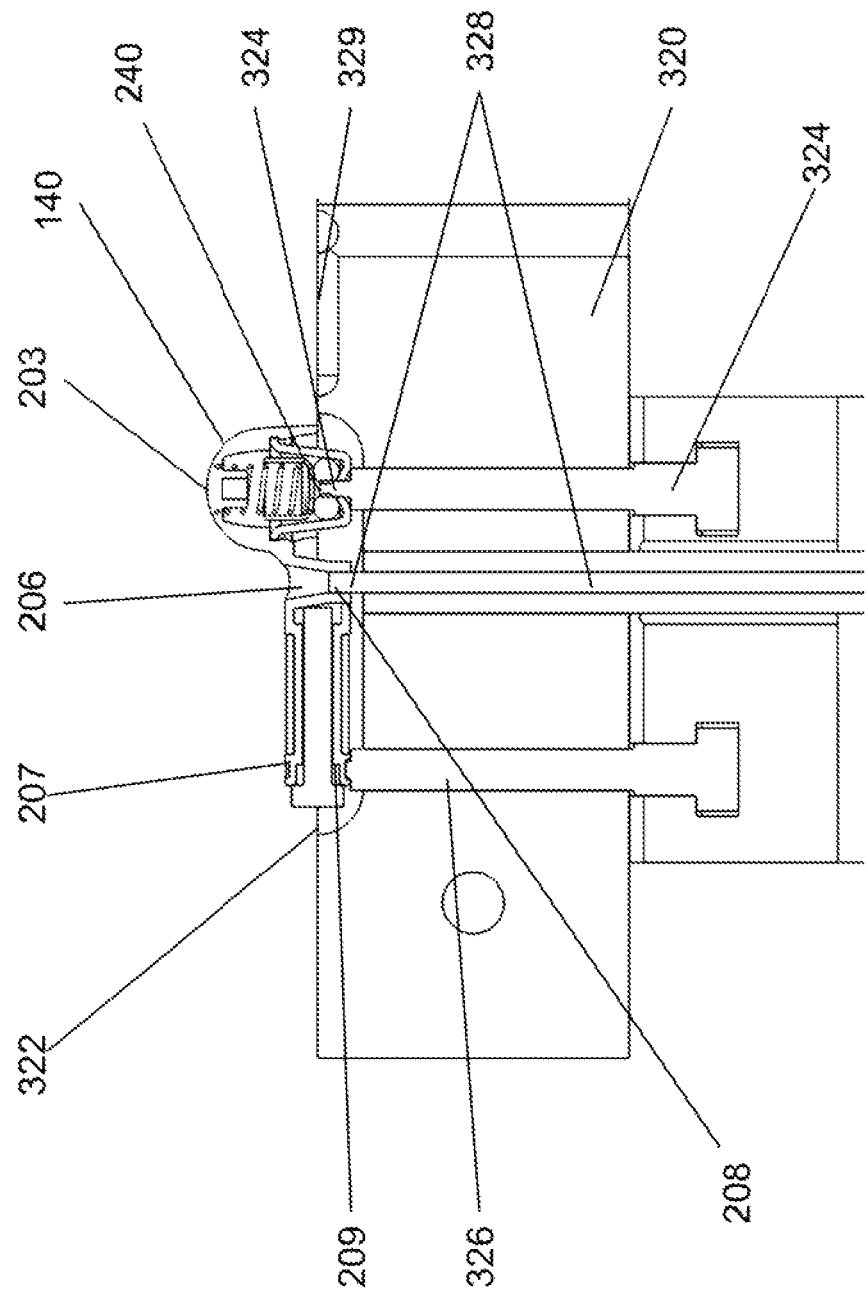
FIG. 18A illustrates a cross-sectional side view of the AM tag core piece mounted into lower mold according to one embodiment.
Figure 18B:
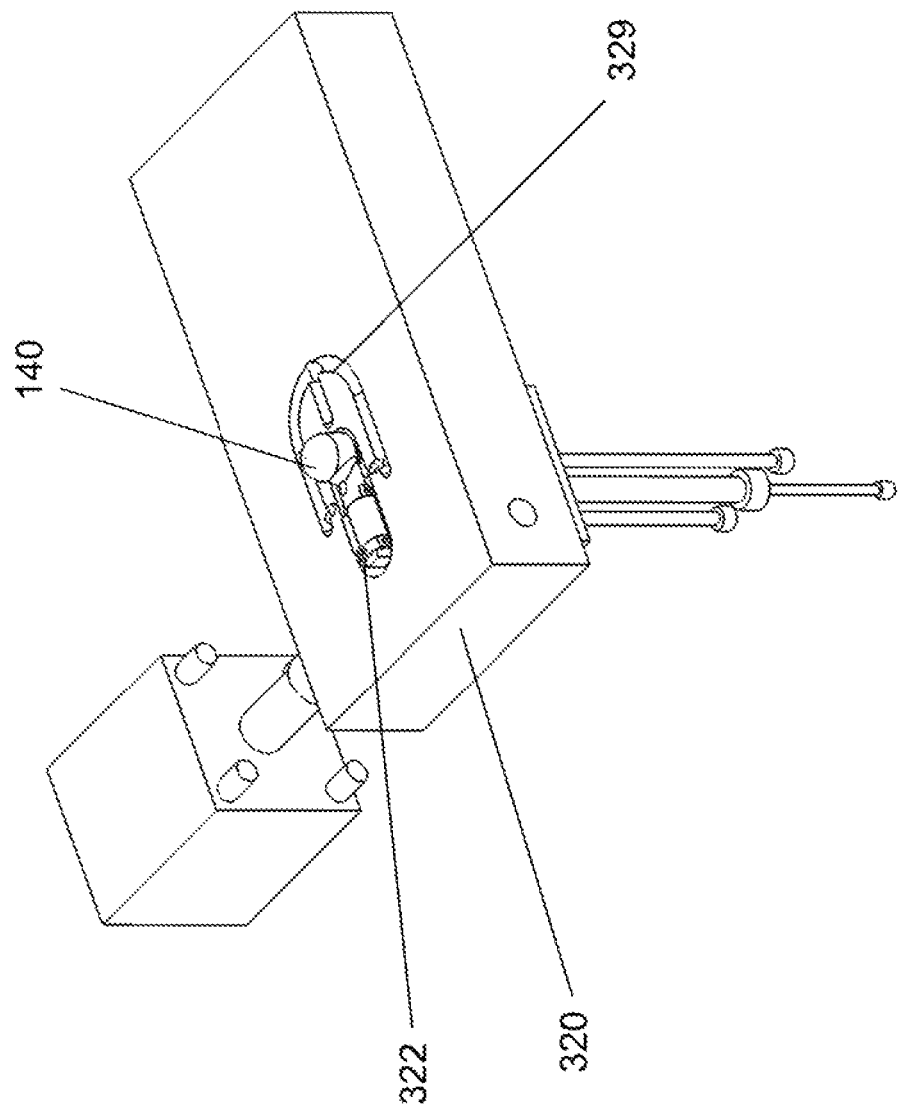
FIG. 18B illustrates a perspective view of the AM tag core piece mounted into lower mold from FIG. 18A according to one embodiment.

FIG. 18A illustrates a cross-sectional side view of the AM tag core piece 140 mounted into lower mold 320. FIG. 18B illustrates a perspective view of the AM tag core piece 140 mounted into lower mold 320 from FIG. 18A. As shown in both FIG. 18A and FIG. 18B, the AM tag core piece 140 is inserted into the lower mold core piece cavity 322 of lower mold 320. One end of first lower ejection bar 324, extending into lower mold core piece cavity 322, is inserted into the lock pin cavity 240 of AM tag core piece 140. One end of second lower ejection bar 326, extending into lower mold core piece cavity 322, is inserted into the lower encasing cavity 209 of AM tag core piece 140. One end of lower mold connection plug 328, extending into lower mold core piece cavity 322, is inserted into the lower mold connection cavity 208 of AM tag core piece 140. Connection of the AM tag core piece 140 about the first lower ejection bar 324, lower mold connection plug 328, and second lower ejection bar 326, secures the AM tag core piece 140 within the lower mold core piece cavity 322.

Figure 19A:
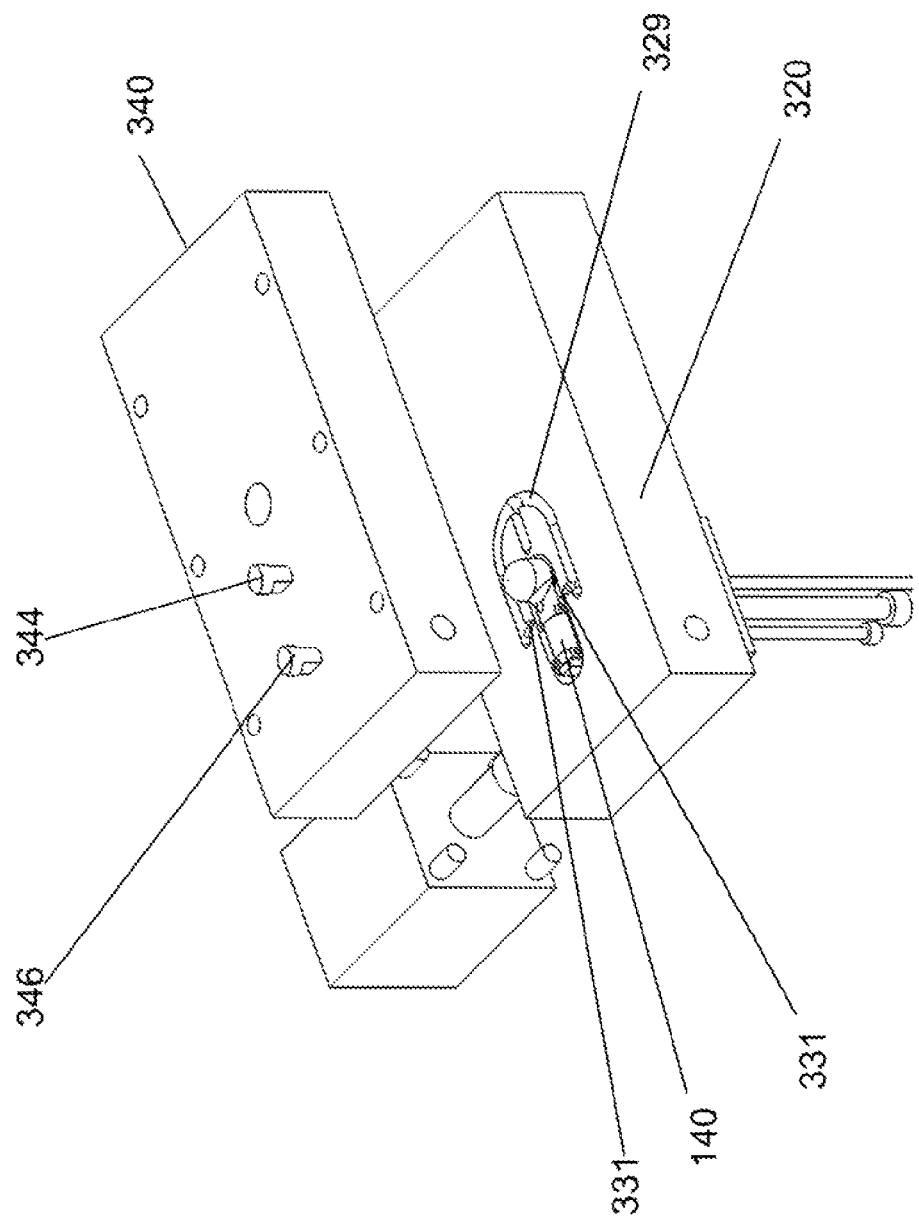
FIG. 19A illustrates a perspective view of upper mold located above lower mold, with AM tag core piece secured within the lower mold core piece cavity of the lower mold according to one embodiment.
Figure 19B:
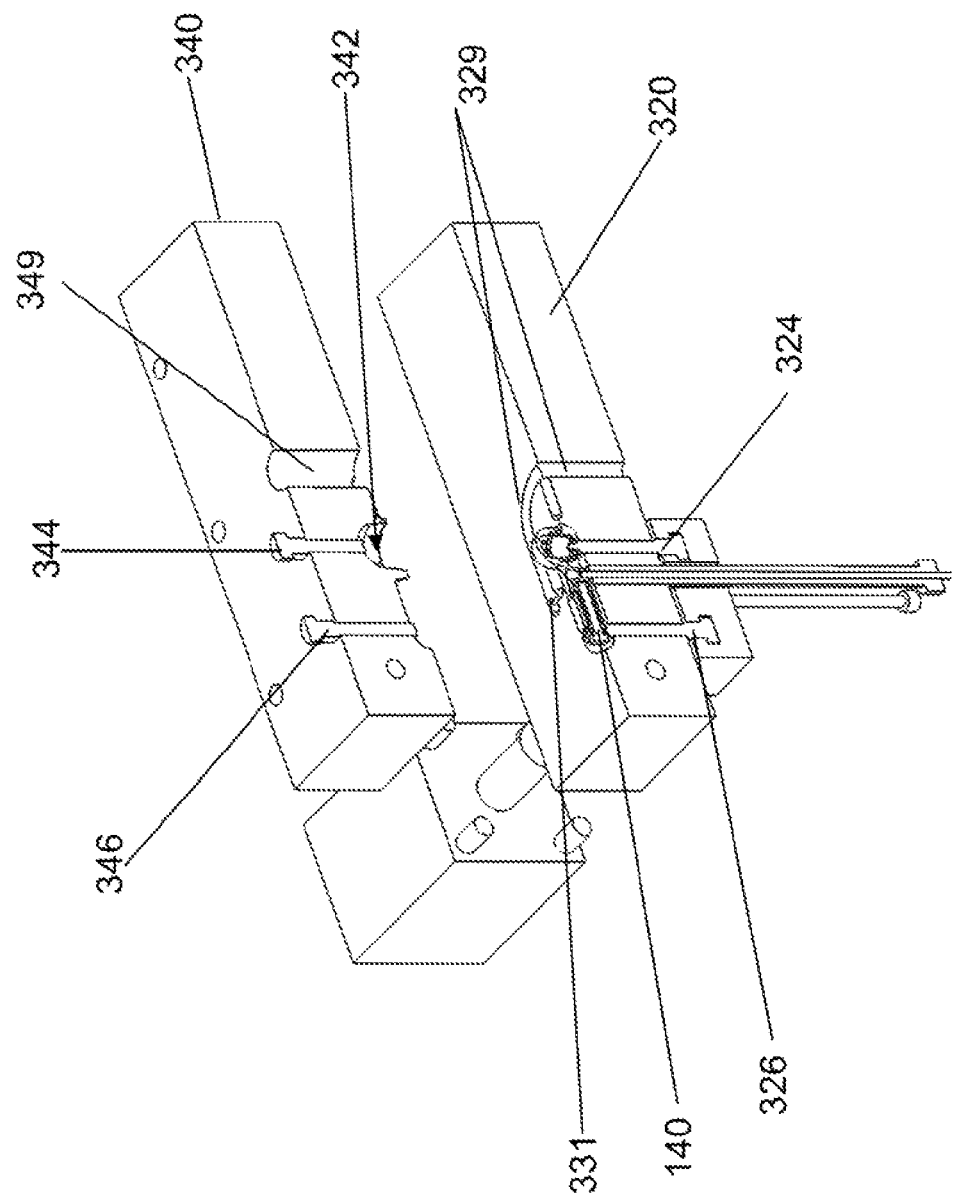
FIG. 19B illustrates a perspective cross-sectional view of the upper mold, AM tag core piece, and lower mold shown in FIG. 19A according to one embodiment.
Figure 19C:
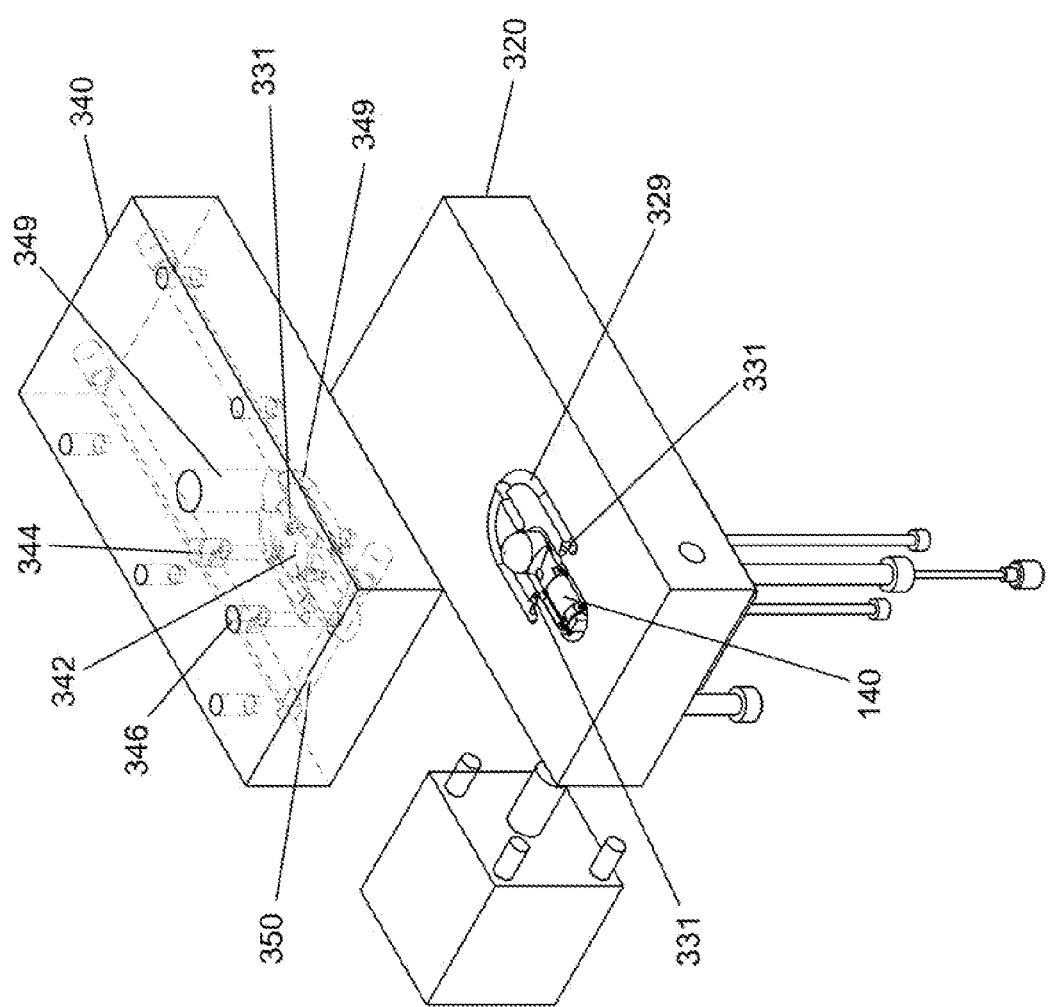
FIG. 19C illustrates the same perspective view of upper mold. AM tag core piece, and lower mold of FIG. 19A with the upper mold shown as transparent according to one embodiment.
Figure 19D:
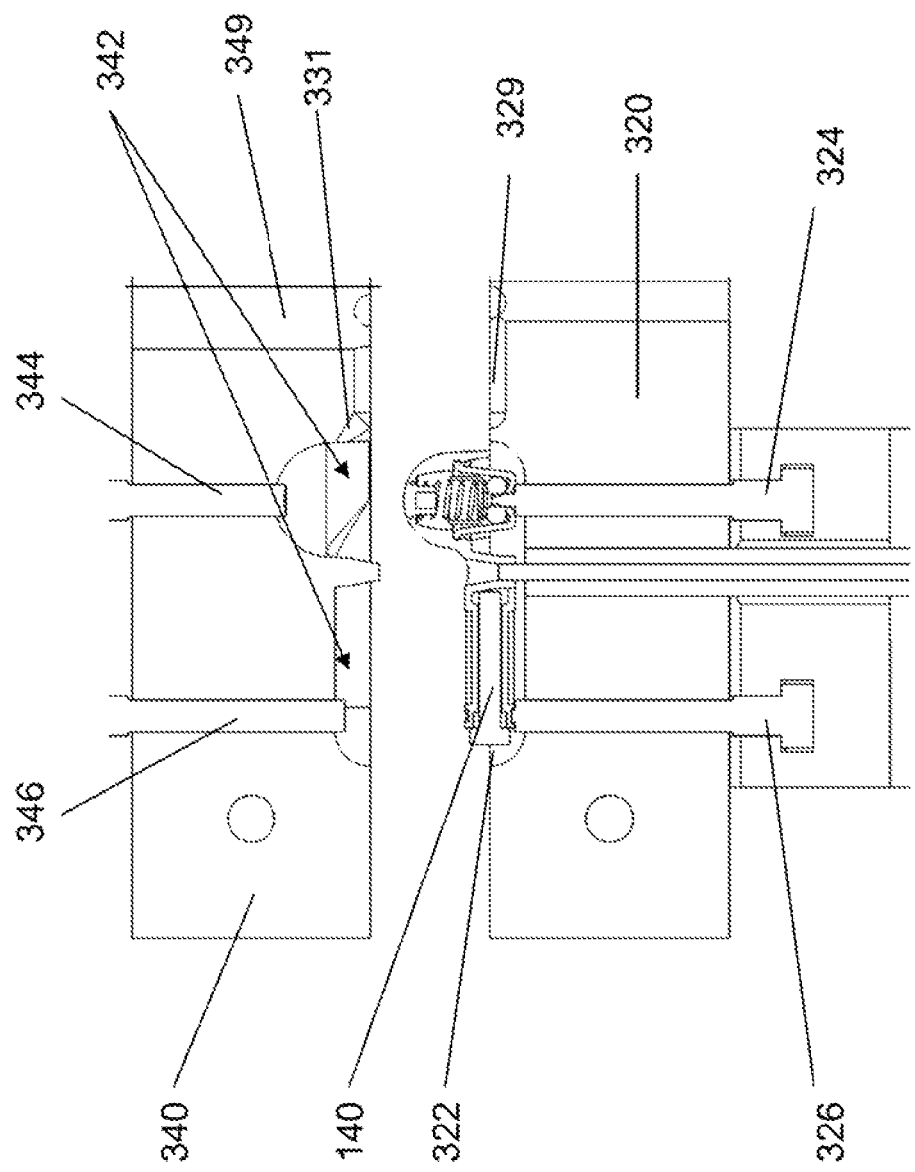
FIG. 19D illustrates a cross-sectional side view of the upper mold, AM tag core piece, and lower mold of FIG. 19A according to one embodiment.

Referring again to FIG. 16, at step 304, upper mold 340 and lower mold 320 are closed together. FIG. 19A illustrates a perspective view of upper mold 340 located above lower mold 320, with AM tag core piece 140 secured within the lower mold core piece cavity 322 of the lower mold 320. FIG. 19B illustrates a perspective cross-sectional view of the upper mold 340, AM tag core piece 140, and lower mold 320 shown in FIG. 19A. FIG. 19C illustrates the same perspective view of upper mold 340, AM tag core piece 140, and lower mold 320 of FIG. 19 with upper mold 340 shown as transparent. FIG. 19D illustrates a cross-sectional side view of the upper mold 340, AM tag core piece 140, and lower mold 320 of FIG. 19A.

As shown in FIG. 19A through FIG. 19D, upper mold 340 includes an indentation about the lower surface of upper mold 340, wherein the indentation being upper mold core piece cavity 342 (see FIG. 19D). Upper mold runner of plastic 349 is located in proximity to the upper mold core piece cavity 342 in upper mold 340. The upper mold core piece cavity 342 is shaped like top side of the AM tag core piece 140 (see FIG. 15A) and is larger in length and width than the AM tag core piece 140 such that the top portion of the AM tag core piece 140 may be enclosed within the upper mold core piece cavity 342. As shown in FIGS. 19A through 19D, a first upper ejection bar 344 and second upper ejection bar 346 are positioned interior to the upper mold 340 and extending through the floor of the upper mold core piece cavity 342. Both the first upper ejection bar 344 and second upper ejection bar 346 also extend through the opposite surface of the upper mold 340 from the surface in which the upper mold core piece cavity 342 is located. Both the first upper ejection bar 344 and second upper ejection bar 346 are capable of movement in the direction to or away from the location of the AM tag core piece 140, as shown in FIG. 19A through 19D. Both the first upper ejection bar 344 and second upper ejection bar 346 may be moved by machine or operator.

The upper mold core piece cavity 342 aligns directly with the lower mold core piece cavity 322, such that when the upper mold 340 closes down on the lower mold 320 the walls of the upper mold core piece cavity 342 and lower mold core piece cavity 322 align on top of one another to form a tag core piece compartment 360 (see FIG. 20C) completely encasing the AM tag core piece 140 within.

Figure 20A:
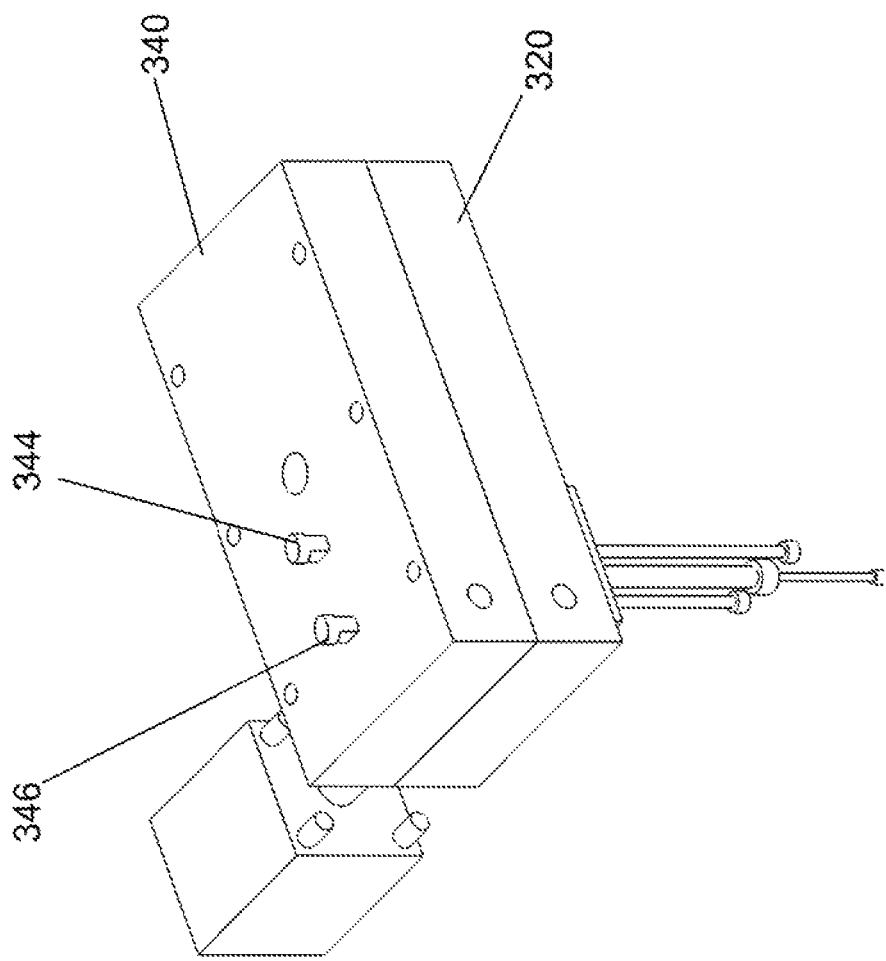
FIG. 20A illustrates a perspective view of upper mold closed on top lower mold according to one embodiment.
Figure 20B:
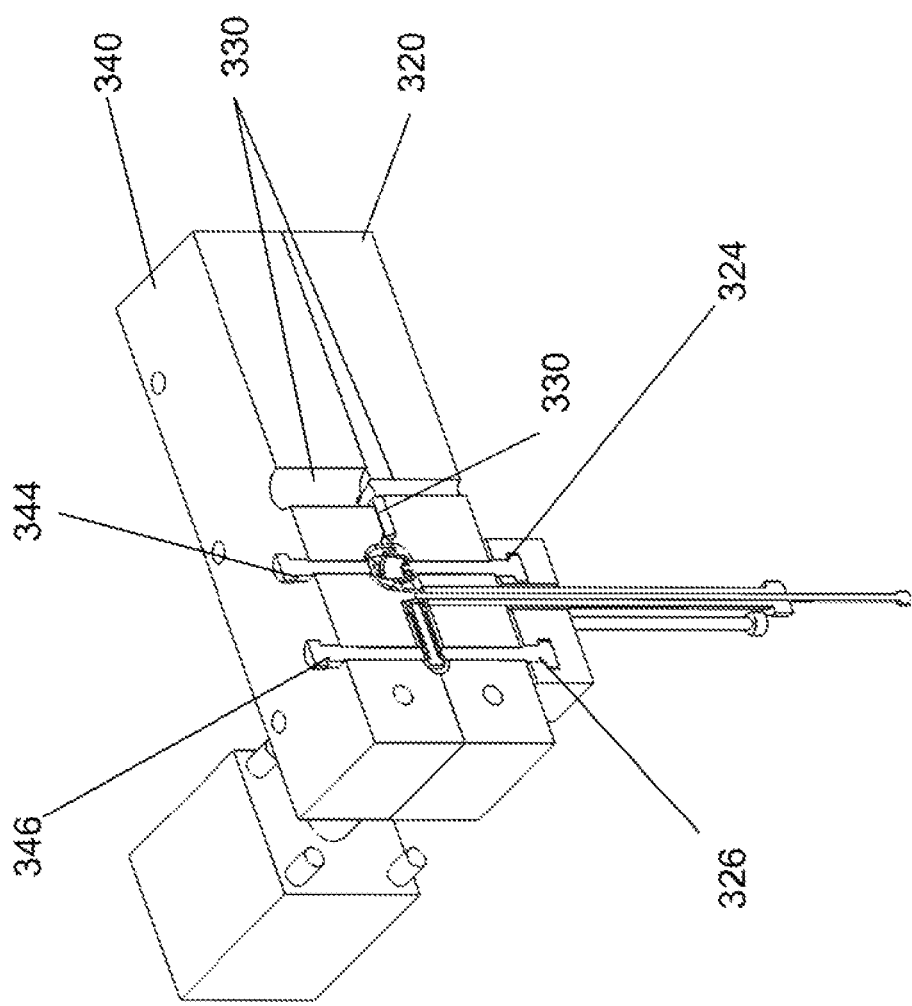
FIG. 20B illustrates a perspective cross-sectional view of the upper mold and lower mold closed together as shown in FIG. 20A according to one embodiment.
Figure 20C:
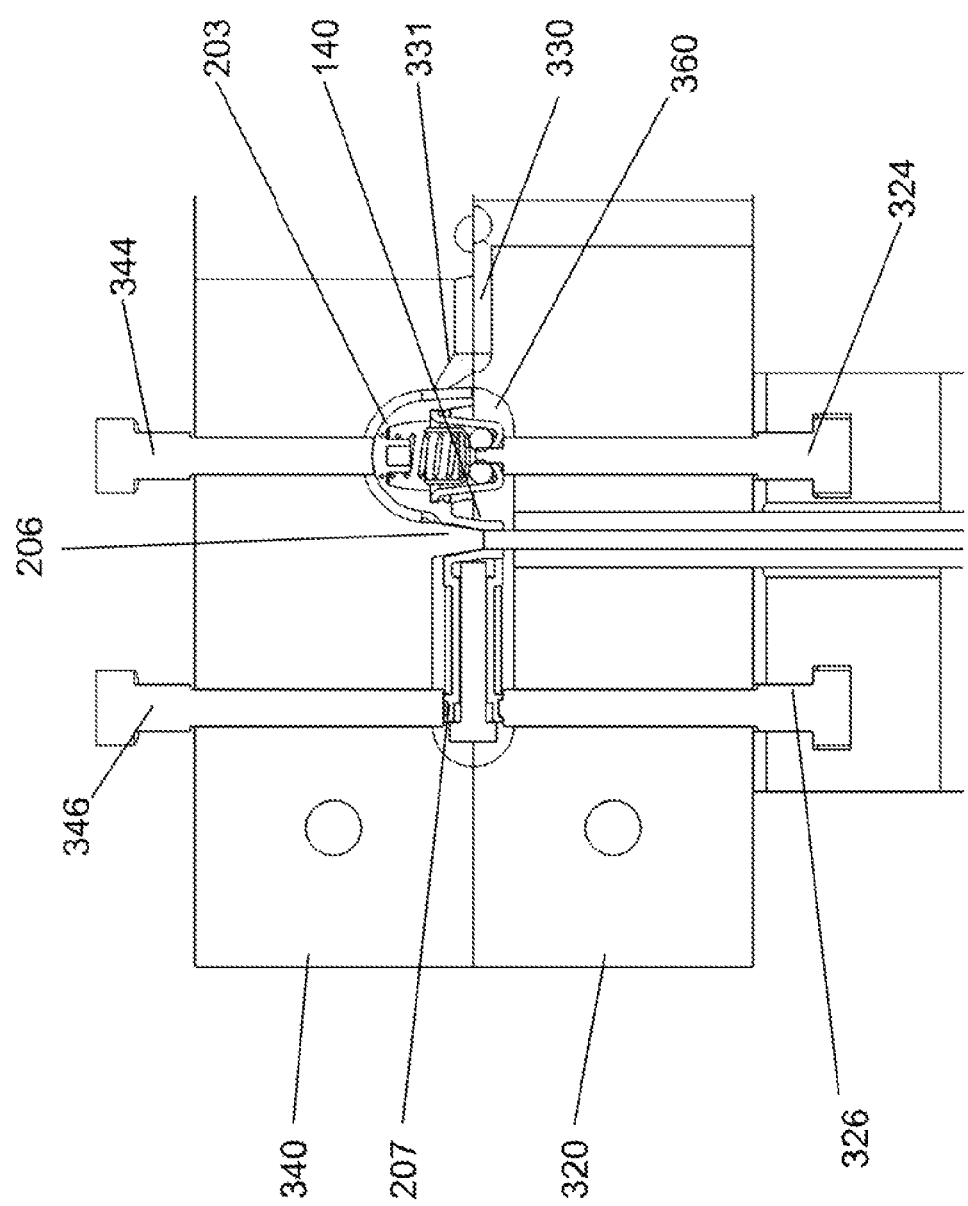
FIG. 20C illustrates a cross-sectional side view of the upper mold and lower mold closed together in FIG. 20A according to one embodiment.

FIG. 20A illustrates a perspective view of upper mold 340 closed on top lower mold 320, with AM tag core piece 140 secured within the tag core piece compartment 360. FIG. 20B illustrates a perspective cross-sectional view of the upper mold 340 and lower mold 320 closed together as shown in FIG. 20A. FIG. 20C illustrates a cross-sectional side view of the upper mold 340 and lower mold 340 closed together in FIG. 20A. As shown in both FIG. 20B and FIG. 20C, the top portion of AM tag core piece 140 is inserted into upper mold core piece cavity 342 of upper mold 340. One end of first upper ejection bar 344, extending into upper mold core piece cavity 342, is positioned and secured over lock component compartment dome 203. One end of second upper ejection bar 346, extending into upper mold core piece cavity 342, is inserted into the upper encasing cavity 207 of AM tag core piece 140. A portion of the surface of upper mold 340, about the upper mold core piece cavity 342, is inserted into the upper mold connection cavity 206 of AM tag core piece 140. Connection of the AM tag core piece 140 about the first upper ejection bar 344, second upper ejection bar 346, and at the upper mold connection cavity 206 with a surface of the upper mold 340, secures the AM tag core piece 140 within the upper mold core piece cavity 342. The tag core piece 140 secured in the lower mold core piece cavity 322 and upper mold core piece cavity 342 is thus secured in the tag core piece compartment 360.

The upper mold runner of plastic 349 and lower mold runner of plastic 329 (see FIG. 19C) form an enclosed channel in which housing material 352 (see FIG. 21) may flow when the upper mold 340 is placed directly on top of the lower mold 320, wherein the enclosed channel is identified as runner of plastic 330 beginning at FIG. 20. Three gates 331 are located about ends of the enclosed channel of runner of plastic 330. The gates 331 condense in volume from the opening at connection with the runner of plastic 330 to a small opening into the tag core piece compartment 360 (see FIG. 20C). Housing material 352 flows from the runner of plastic 330, through the gates 331 and into the tag core piece compartment 360. Housing material 352 arrives into the runner of plastic 330 via injection passageway 350 (see FIG. 19C).

With the AM tag core piece 140 secured in the tag core piece compartment 360 of the upper mold 340 and lower mold 320, housing material 352 is then applied at step 306 as shown in FIG. 16.

Figure 21:
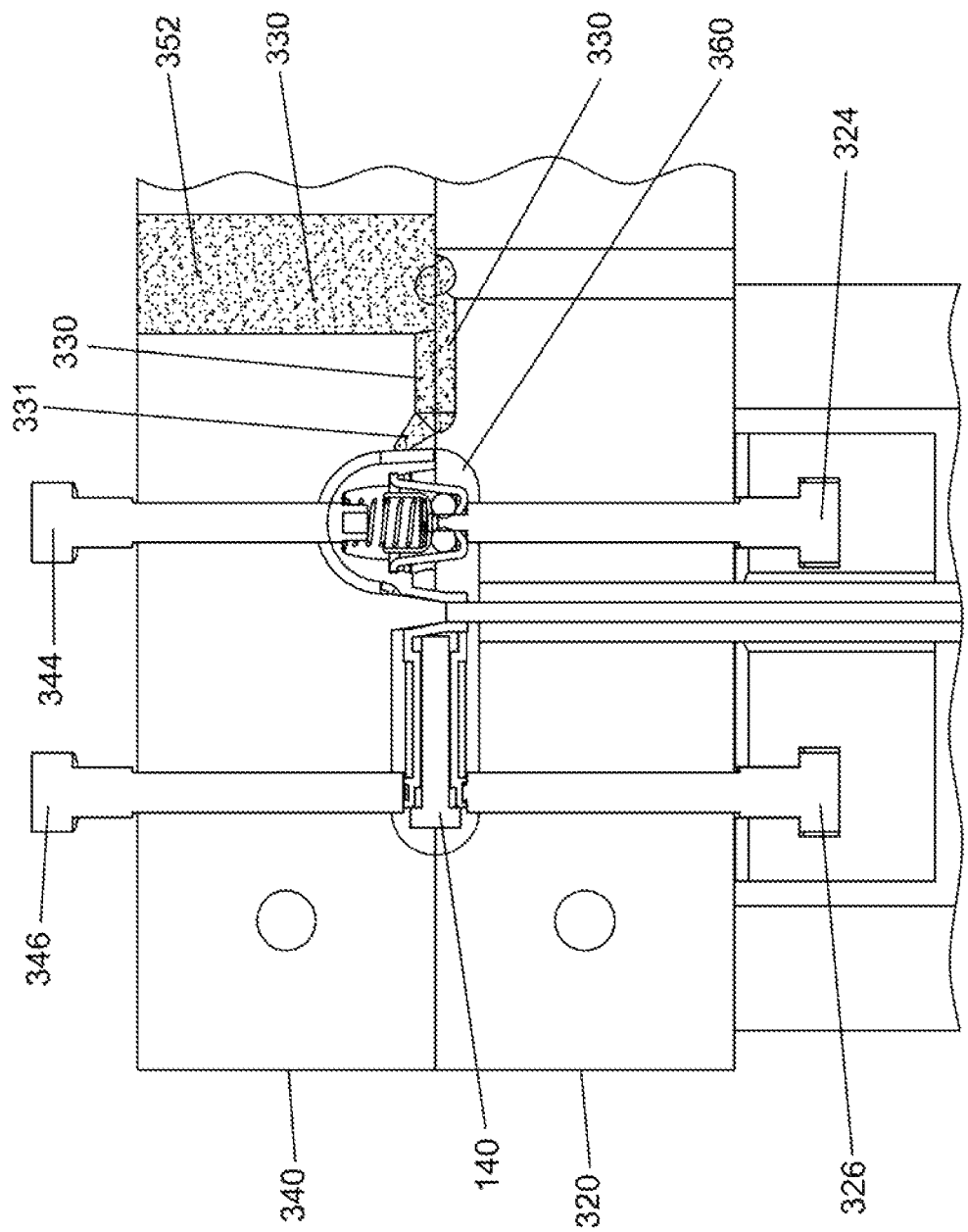
FIG. 21 illustrates a cross-sectional side view of the upper mold and lower mold closed together with housing material being applied according to one embodiment.

FIG. 21 illustrates a cross-sectional side view of the upper mold 340 and lower mold 320 closed together with housing material 352 being applied. Housing material is carried via the runner of plastic 330 to and though gates 331.

Figure 22:
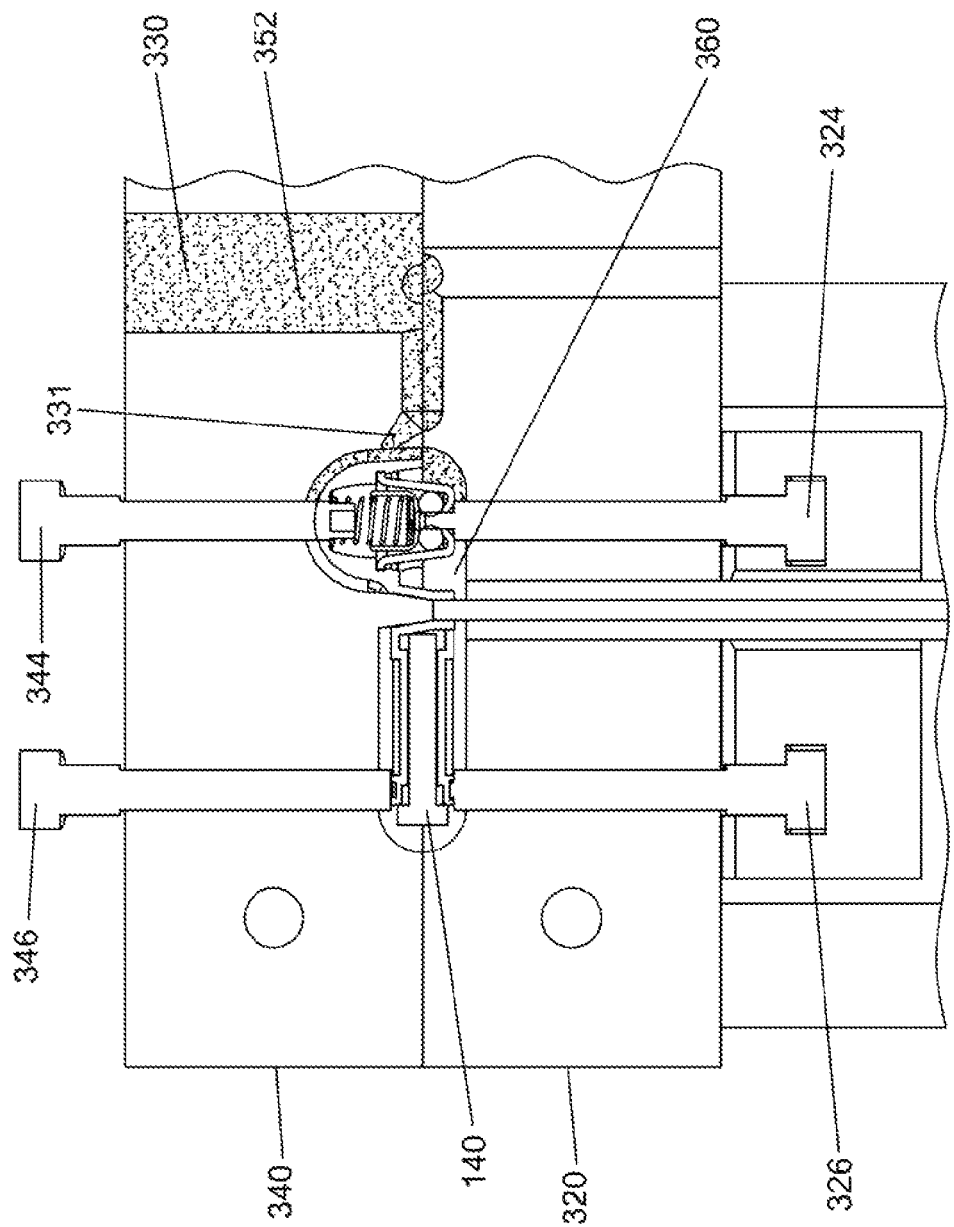
FIG. 22 illustrates a cross-sectional side view of the upper mold and lower mold closed together with housing material being applied into the tag core piece compartment according to one embodiment.

FIG. 22 illustrates a cross-sectional side view of the upper mold 340 and lower mold 320 closed together with housing material 352 being applied into the tag core piece compartment 360. As shown in FIG. 22, housing material 352 is shown only exiting one gate 331 into the tag core piece compartment 360. However, housing material 352 is exiting all three gates 331 (see FIG. 19C) into the tag core piece compartment 360. Since FIG. 22 is a cross-sectional side view, only housing material 352 from the gate 331 shown in FIG. 22 may be seen entering the tag core piece compartment 360 in the two-dimensional plane. The housing material 352 actually forms around the AM tag core piece 140 in three dimensions, forming both in front and behind of the tag core piece in FIG. 22, though not shown.

Figure 23:
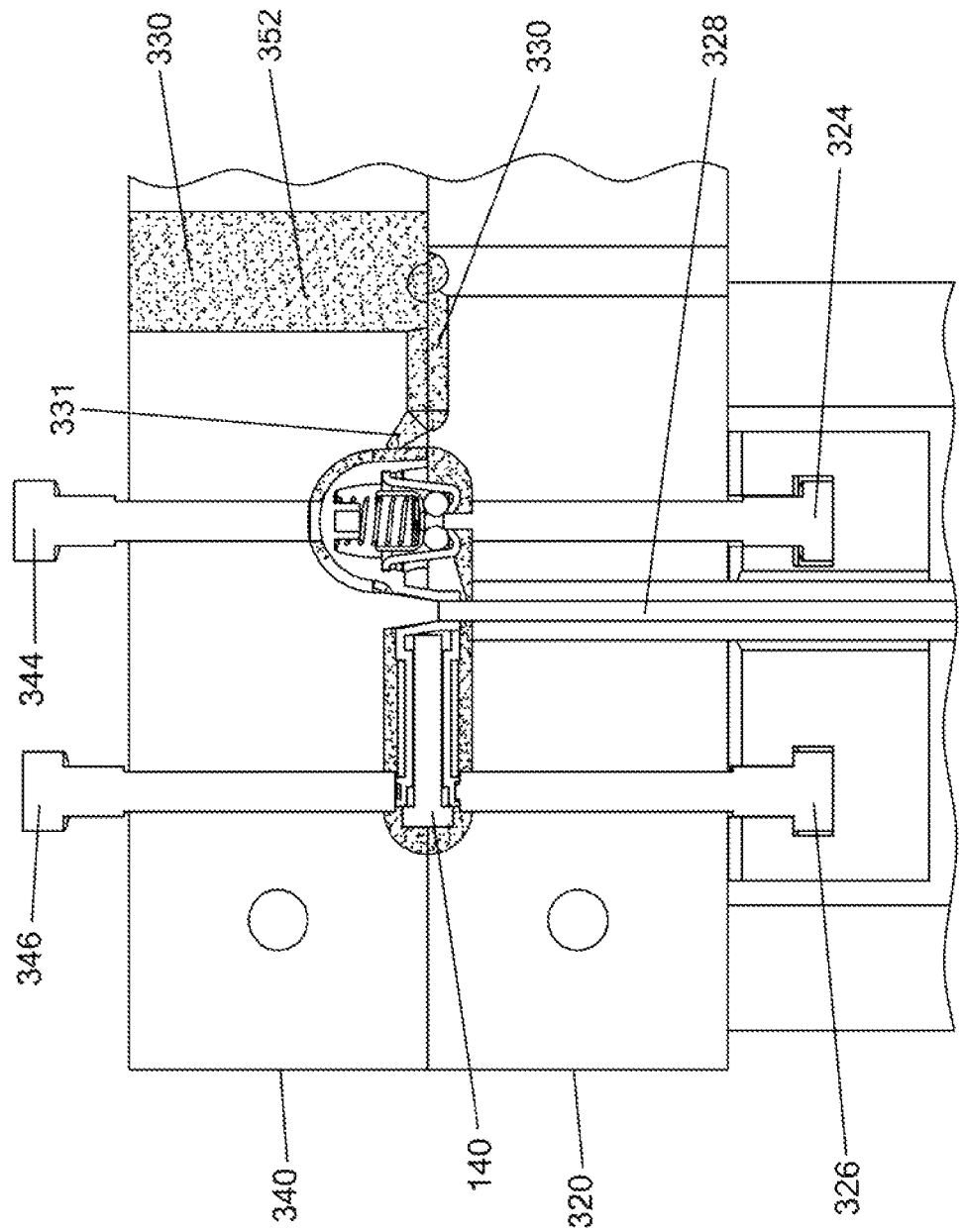
FIG. 23 illustrates a cross-sectional side view of the upper mold and lower mold closed together with housing material applied around the AM tag core piece according to one embodiment.

FIG. 23 illustrates a cross-sectional side view of the upper mold 340 and lower mold 320 closed together with housing material 352 applied around the AM tag core piece 140. Housing material 352 delivered via the runner of plastic 330, through gates 331, into the tag core piece compartment 360 covers over nearly all the surface area of the AM tag core piece 140, except, for example, where the AM tag core piece 140 is still in connection with ejection bars 344, 346, 324, 326, the lower mold connection plug 328, and with the surface of the upper mold core piece cavity 342 about the upper mold connection cavity 206. Housing material 352 fills the volume formed by the geometric surface of the upper mold core piece cavity 342 and lower mold core piece cavity 322, being the tag core piece compartment 360 around the AM tag core piece 140.

Figure 24:
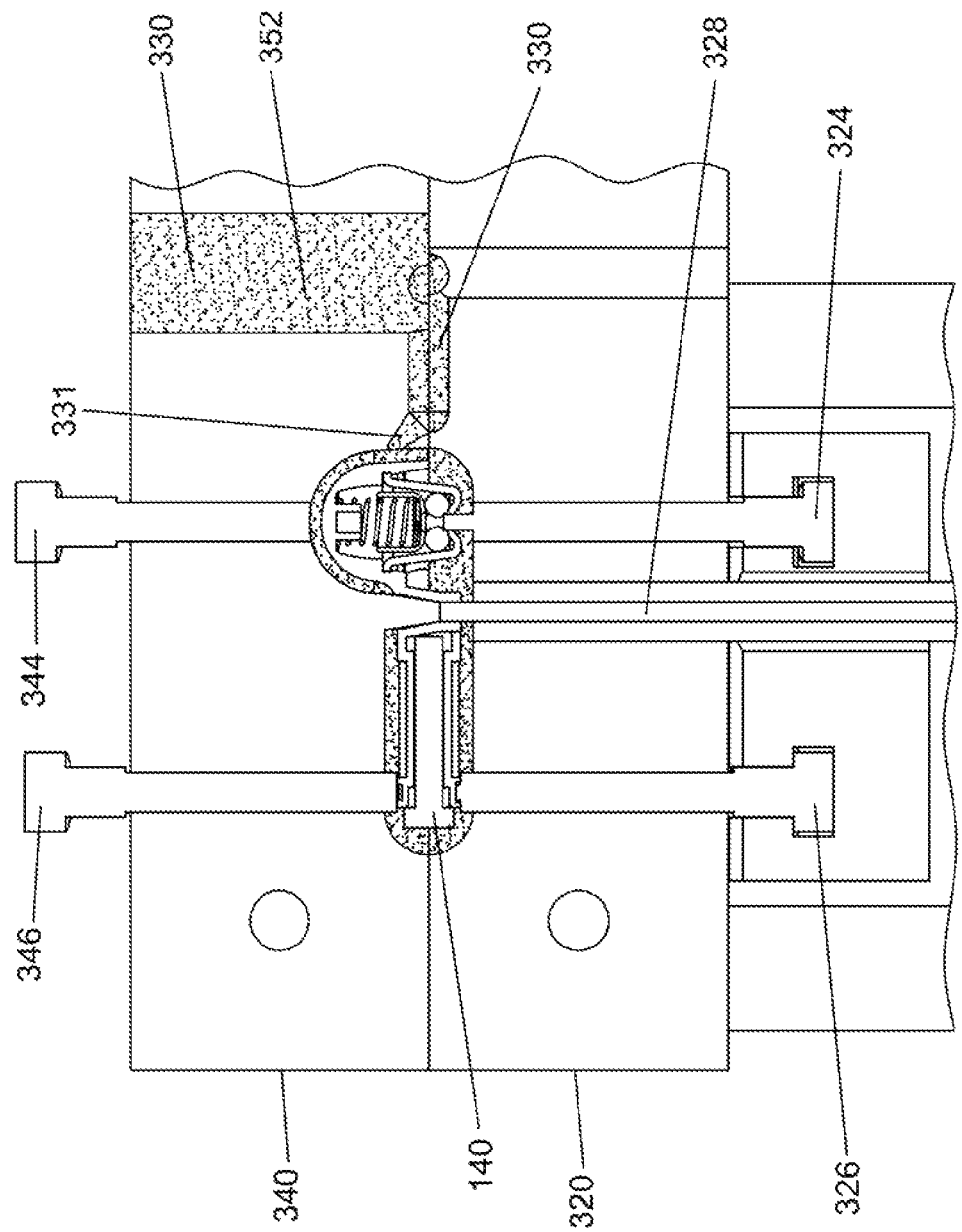
FIG. 24 illustrates a cross-sectional side view of the upper mold and lower mold closed together with housing material filling the volume previously occupied by first upper ejection bar according to one embodiment.

As shown in FIG. 23, first upper ejection bar 344 is lifted away from a position adjacent on top the lock component compartment dome 203. This allows for housing material 352 to fill over the surface of the AM tag core piece 140 and the volume left where the first upper ejection bar 344 was positioned. Filling in the volume left by an ejection bar eliminates apertures that could be made apparent in the final housing. Leaving an ejection bar partially in connection about the housing may leave indentations in the housing, thus totally removing the ejection bar may allow for the surface of the housing to be smooth with little if any indication that an ejection bar was connected or utilized to hold the tag core piece. FIG. 24 illustrates a cross-sectional side view of the upper mold 340 and lower mold 320 closed together with housing material 352 filling the volume previously occupied by first upper ejection bar 344.

Figure 25:
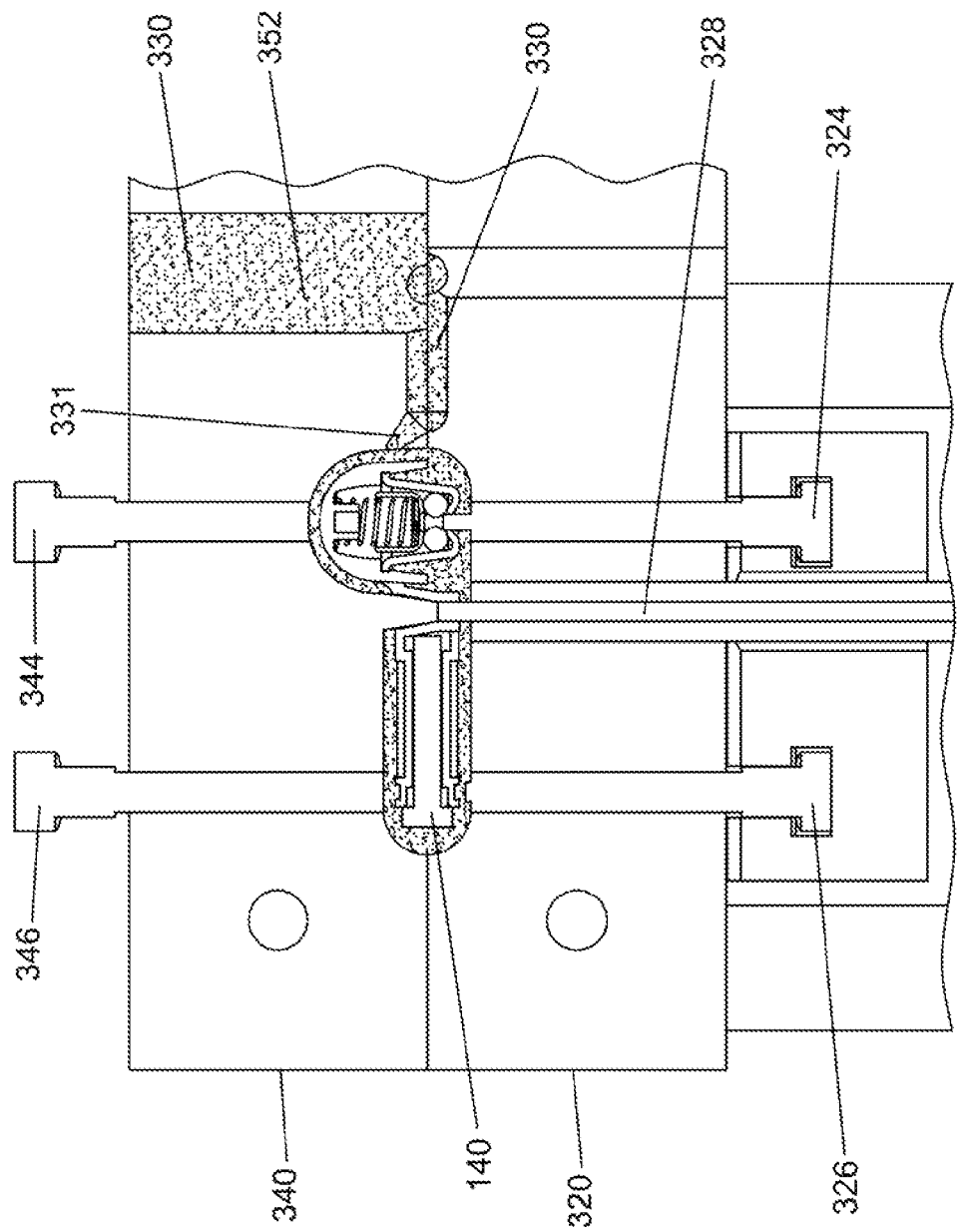
FIG. 25 illustrates a cross-sectional side view of the upper mold and lower mold closed together with housing material filling the volume previously occupied by both second upper ejection bar and second lower ejection bar according to one embodiment.

FIG. 25 illustrates a cross-sectional side view of the upper mold 340 and lower mold 320 closed together with housing material 352 tilling the volume previously occupied by both second upper ejection bar 346 and second lower ejection bar 326. Both the second upper ejection bar 346 and second lower ejection bar 326 are removed from connection with the AM tag core piece 140. Housing material 352 fills in the volume where the second upper ejection bar 346 and second lower ejection bar 326 were formerly positioned. After these volumes are filled with housing material 352, housing material 352 is no longer introduced into the runner of plastic 330, through gates 331, and into the tag core piece compartment 360. The housing for a solid housing tag is formed. In the preferred embodiment, the AM solid molded housing tag 100 is formed by the described housing injection mold process 300.

Figure 26:
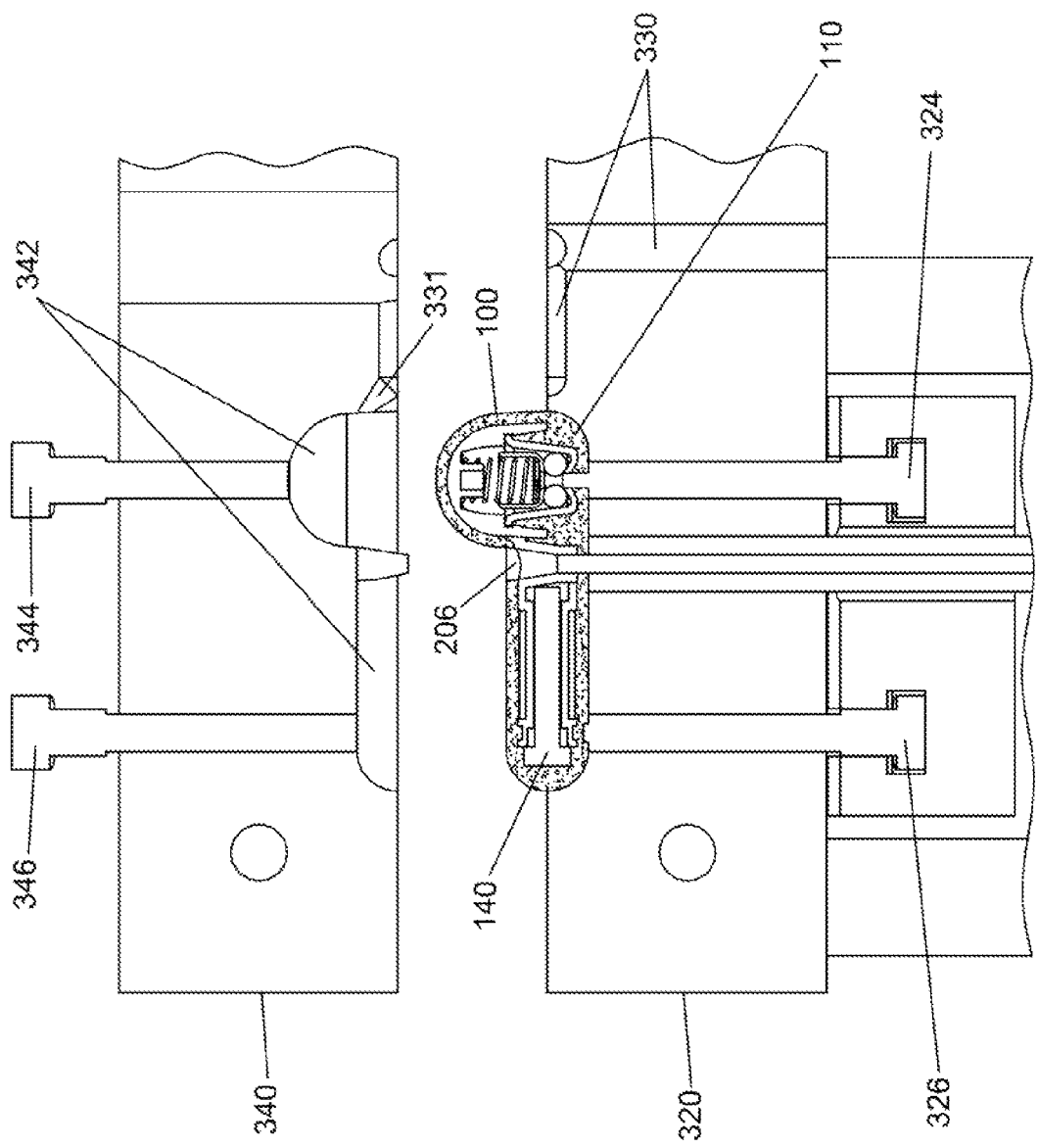
FIG. 26 illustrates a cross-sectional side view of the upper mold removed from AM solid molded housing tag according to one embodiment.

In another embodiment, injection molding may fill the mold beginning at the step as shown in FIG. 21. In alternative to the steps described above and as shown in reference to FIG. 22 through FIG. 25, both the upper ejection bars 344, 346 and the lower ejection bars 324, 326 may remain intact in the same position as shown in FIG. 22 without movement. The upper mold 340 is then removed as shown in FIG. 26 such that there may be a dimple or exposed area within housing 110 covering over and/or surrounding the AM tag core piece 140. In this embodiment, more standard injection molding machines may be used to produce the AM solid molded housing tag 100.

Referring again to FIG. 16 in relation to the preferred embodiment, at step 308, the upper mold 340 is moved away from the AM solid molded housing tag 100 and then AM solid molded housing tag 100 is removed from lower mold 320. In other embodiments, the lower mold 320 may first be removed, followed by removal of the AM solid molded housing tag 100 from the upper mold 340. In other embodiments, the upper and lower molds may be removed simultaneously.

FIG. 26 illustrates a cross-sectional side view of the upper mold 340 removed from AM solid molded housing tag 100. The surface of upper mold core piece cavity 342 is detached particularly at upper mold connection cavity 206. As shown in FIG. 26, the AM solid molded housing tag 100 remains attached to lower mold 320.

Figure 27:
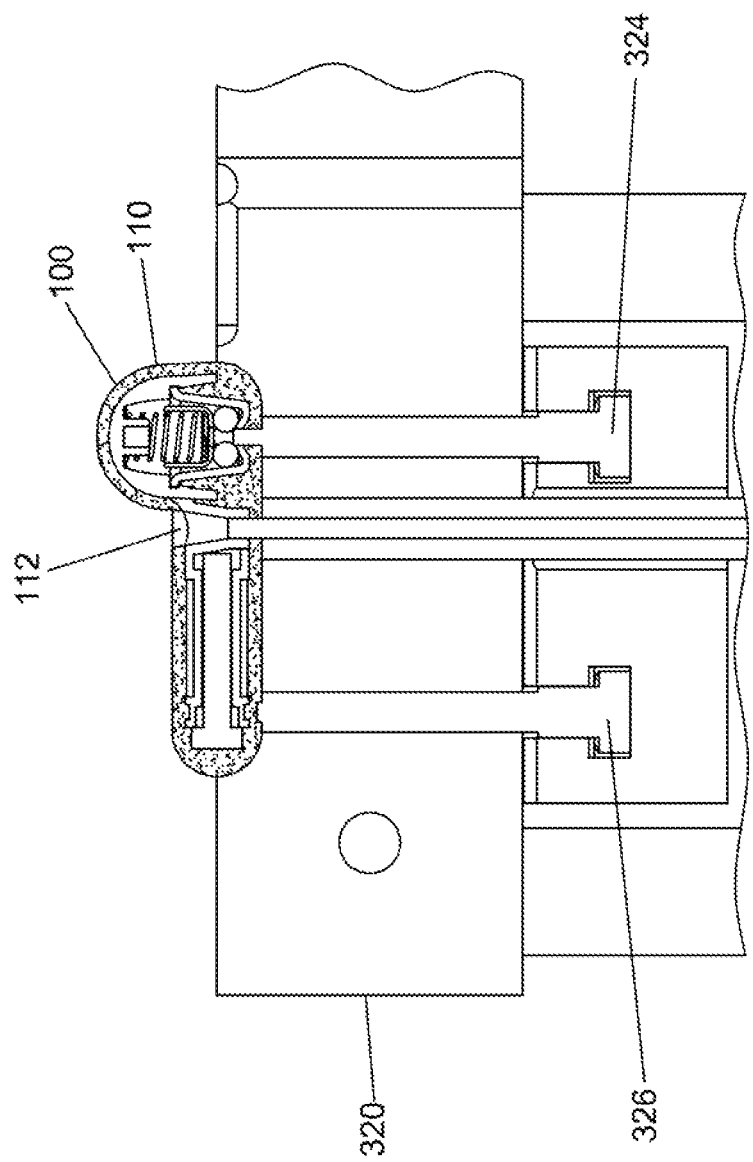
FIG. 27 illustrates a cross-sectional side view of the AM solid molded housing tag attached to lower mold according to one embodiment.

FIG. 27 illustrates a cross-sectional side view of the AM solid molded housing tag 100 attached to lower mold 320. As shown in FIG. 27 and as described in the preferred embodiment, upper mold 340 is removed from the lower mold 320 holding the AM solid molded housing tag 100.

Figure 28:
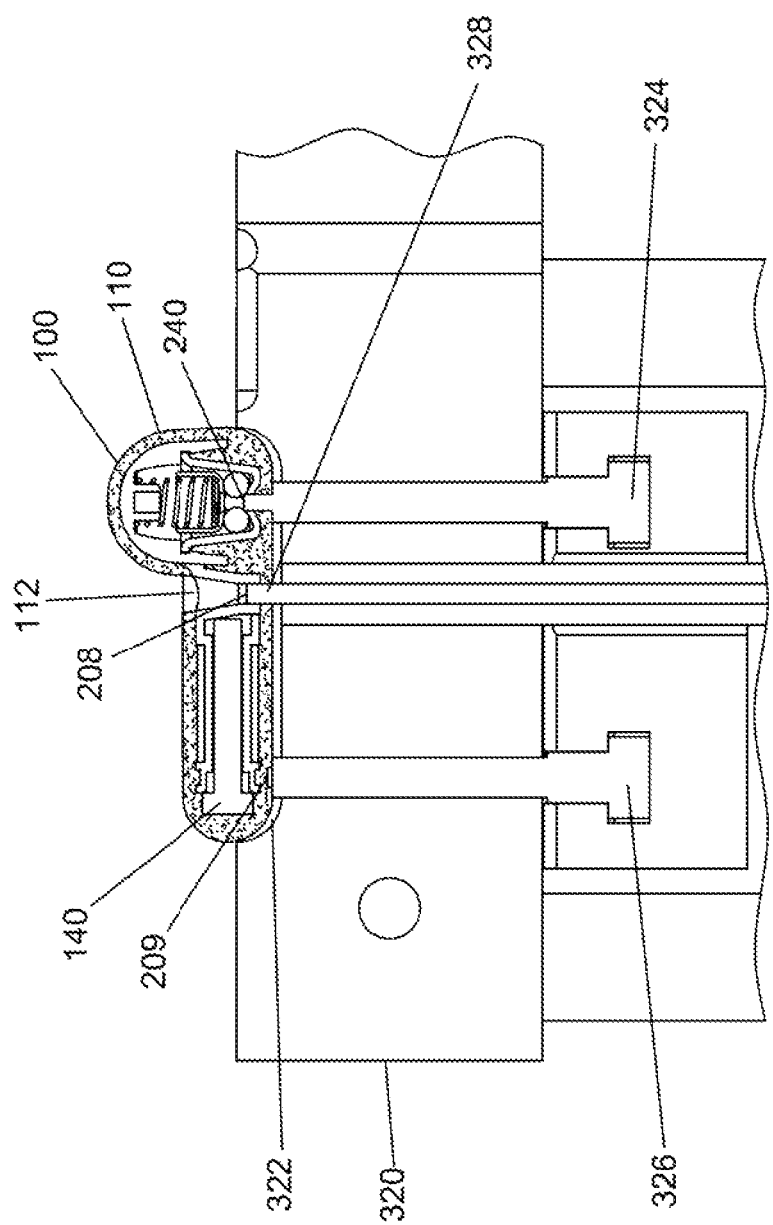
FIG. 28 illustrates a cross-sectional side view of the AM solid molded housing tag ejecting from lower mold according to one embodiment.

FIG. 28 illustrates a cross-sectional side view of the AM solid molded housing tag 100 ejecting from lower mold 320. As shown in FIG. 28, AM solid molded housing tag 100 is removed from the surface of the lower mold core piece cavity 322. As shown in FIG. 28, the only connection between the lower mold 320 and AM solid molded housing tag 100 are where the second lower ejection bar 326 connects on the housing 110 above the lower encasing cavity 209, the first lower ejection bar 324 connects into the lock pin cavity 240, and lower mold connection plug 328 connects into the lower mold connection cavity 208.

Figure 29B:
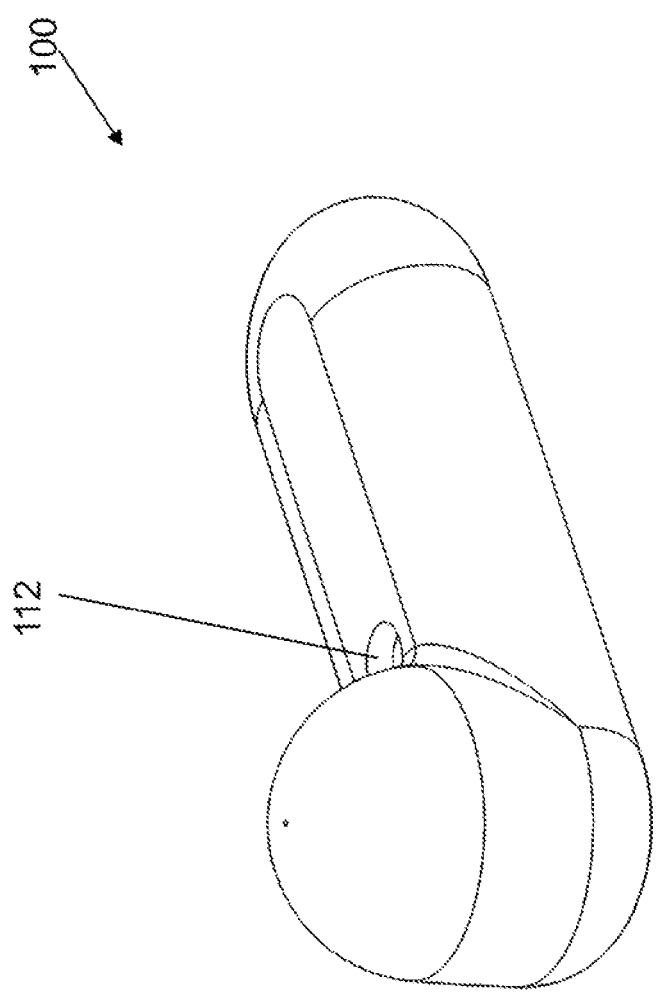
FIG. 29B illustrates a perspective view of the AM solid molded housing of FIG. 29A according to one embodiment.
Figure 29C:
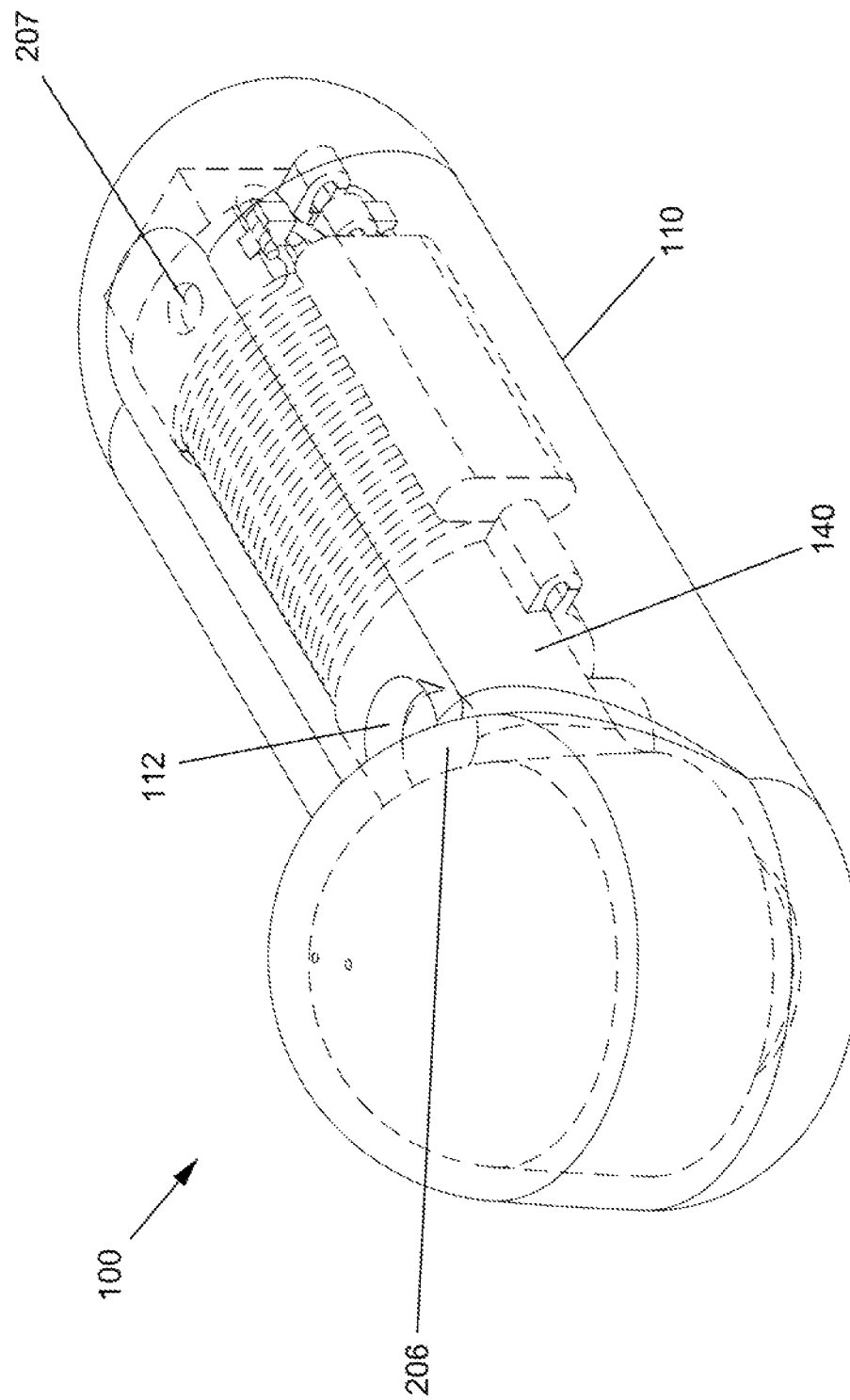
FIG. 29C illustrates a perspective view of the AM solid molded housing tag of FIG. 2B shown with a transparent housing according to one embodiment.
Figure 29D:
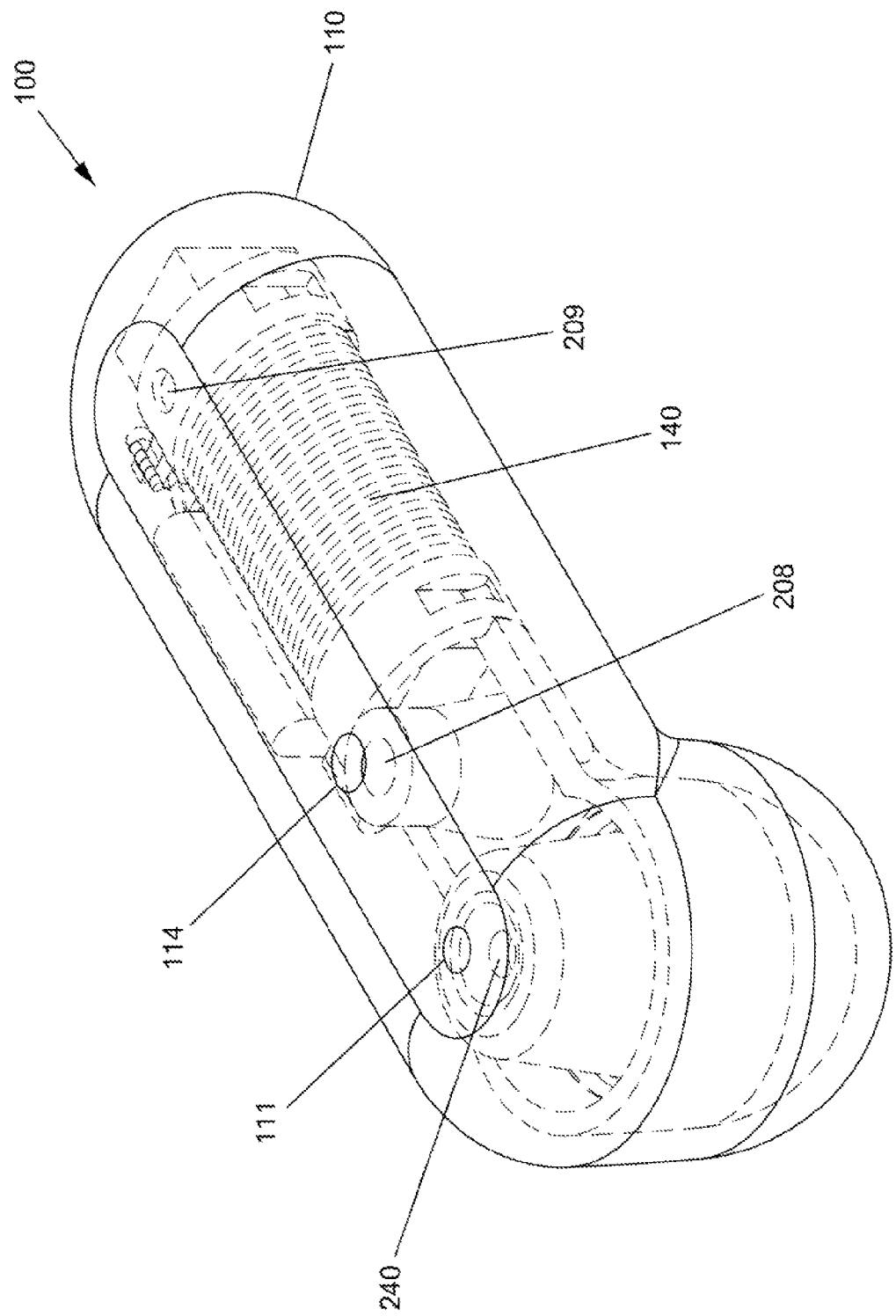
FIG. 29D illustrates perspective view of the AM solid molded housing tag of FIG. 2C flipped over one hundred and eighty degrees to see the bottom side of the AM solid molded housing tag according to one embodiment.

FIG. 29A illustrates a cross-sectional side view of the AM solid molded housing tag 100 removed from lower mold 320. FIG. 29B illustrates a perspective view of the AM solid molded housing tag 100 of FIG. 29A. FIG. 29C illustrates a perspective view of the AM solid molded housing tag 100 of FIG. 29B shown with a transparent housing 110 to view the AM tag core piece 140 within. FIG. 29D illustrates perspective view of the AM solid molded housing tag 100 of FIG. 2C flipped over one hundred and eighty degrees to see the bottom side of the AM solid molded housing tag 100. As shown in FIG. 29A through FIG. 29D, the AM solid molded housing tag 100 is no longer connected with the second lower ejection bar 326 at the lower encasing cavity 209, nor with the first lower ejection bar 324 at the lock pin cavity 240, nor with the lower mold connection plug 328 at the lower mold connection cavity 208. Where the first lower ejection bar 324 was positioned in the housing 110 as shown in FIG. 24 and later removed, a gap is formed therein being the housing lock pin accessway 111 aligned over the lock pin cavity 240 (see FIG. 29D). Where the lower mold connection plug 328 was positioned in the housing 110 as shown in FIG. 24 and later removed, a gap is formed therein being the housing lower mold connection cavity 114 aligned over the lower mold connection cavity 208 (see FIG. 29D). The second lower ejection bar 326 was removed (see FIG. 25) such that injection mold 352 filled in over the lower encasing cavity 209. Also as shown in FIG. 29A through FIG. 291), the AM solid molded housing tag 100 is no longer connected with second upper ejection bar 346 at upper encasing cavity 207, nor with first upper ejection bar 344 at the lock component compartment dome 203, nor with the portion of the surface of upper mold 340 about the upper mold core piece cavity 342 which inserted into the upper mold connection cavity 206. The second upper ejection bar 346 was removed (see FIG. 25) such that housing material 352 tilled in over the upper encasing cavity 207 (see FIG. 29C). Housing material 352 also filled in to form housing 110 where first upper ejection bar 344 was once positioned over the lock component compartment dome 203 (see FIG. 24). Where portion of the surface of upper mold 340 was inserted into the upper mold connection cavity 206, a housing upper mold connection cavity 112 formed in alignment over upper mold connection cavity 206, as shown in FIG. 29C. In some embodiments, only the accessway 111 is not filled in by housing material 352 if the ejection bar at the lock pin cavity 240 is the only ejection bar removed after injection of the housing material 352 has completed.

Figure 30:
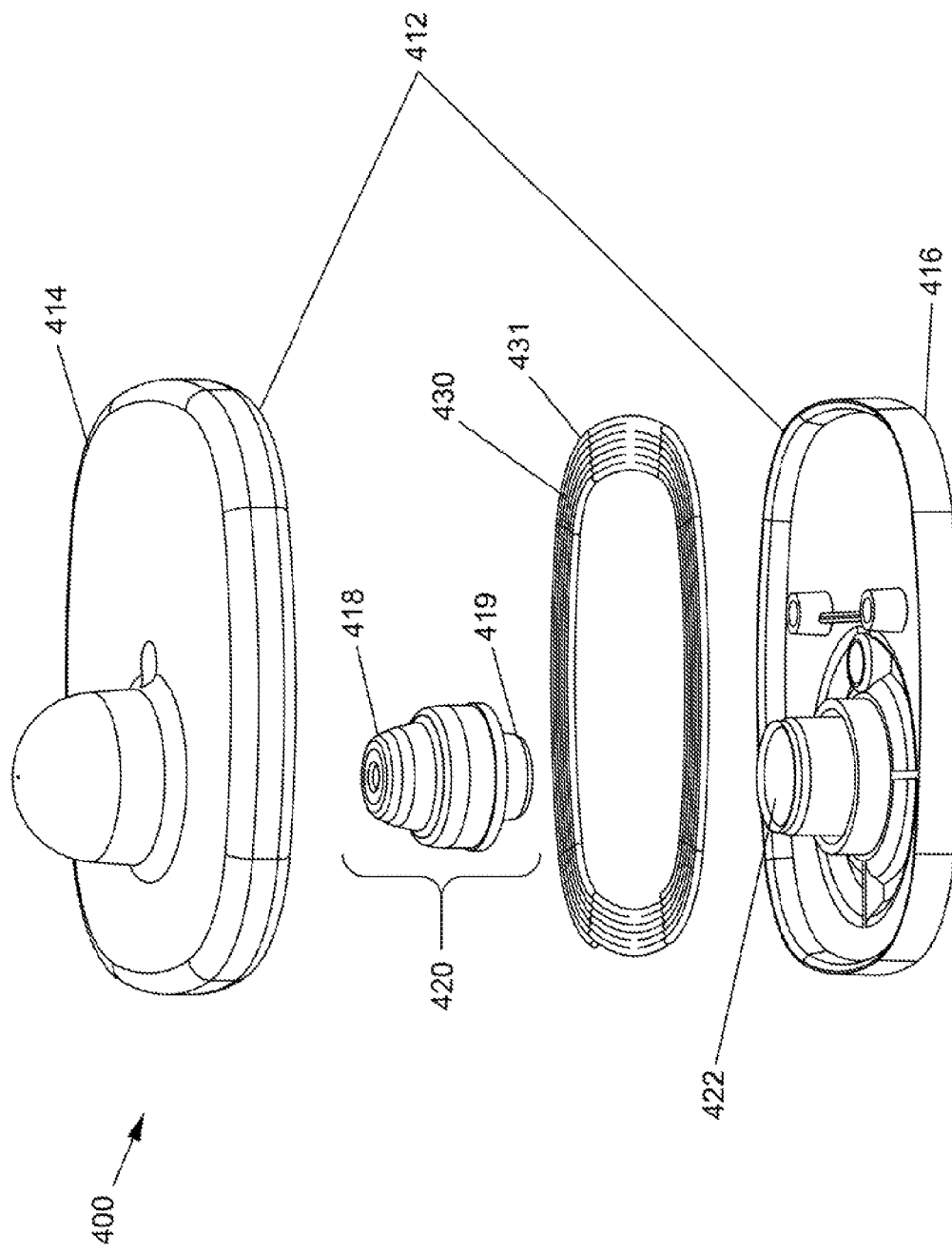
FIG. 30 illustrates a perspective view of an exemplary open RF hard tag and the components within, including open air coil element, as known in the prior art.

FIG. 30 illustrates a perspective view of an exemplary open RF hard tag 400 with open air coil element, and components within, as known in the prior art. As shown in FIG. 30, the RF hard tag 400 includes two tag encasing pieces 412, the top tag encasing piece 414 and bottom tag encasing piece 416. In this example, the bottom tag encasing piece 416 of the RF hard tag 400 includes a lock component compartment 422. Lock component 420 in the RF hard tag 400 is the same as the lock component 20 of AM hard tag 10, shown in FIG. 1A. However, the security component 430 in the RF hard tag 400 is different than the security component 30 of the AM hard tag 10. The security component 430 in the RF hard tag 400 is a RF open air coil 431, forming the open air coil element, a LC tank circuit that has a resonance peak between 1 MHz to 30 MHz, wherein the most popular frequency used in EAS is 8.2 MHz. Sensing of the RF hard tag 400 is achieved by sweeping around the resonant frequency of the RF open air coil 431 and detecting a dip by a detector.

To assemble RE hard tag 400, lock component 420, including the known pieces of a spring, pusher, and balls, all of which are not shown inside the lock component 420, are placed inside the lock component compartment 422. The lock component 420 typically includes a cap 418 and base 419 to enclose the known internal pieces. Separate from the lock component 420, the security component 430, herein shown as the RF open air coil 431 is placed to fit within the perimeter wall of the bottom encasing piece 416. The only connection between the security component 430 and lock component 420 is by the bottom encasing piece 416 after both components 420, 430 have been inserted. The top encasing piece 414 is then placed over the lock component 420 and security component 430 and connected with the bottom encasing piece 416 to be ultrasonically welded together.

The top encasing piece 414 and bottom encasing piece 416 are separately injection molded. The top encasing piece 414 and bottom encasing piece 416 are designed to mate together by welding to securely hold the internal components 420, 430 positioned within.

Like the AM hard tag 10 of FIG. 1A, a pin (not shown) is placed into the lock pin cavity (not shown), located on the opposing side surface of the bottom housing 416 to the side containing the lock component 420 and security component 430. A garment is positioned between the RF hard tag 400 and the head of the pin (not shown) to secure the RF hard tag 400 about the garment.

Figure 37A:
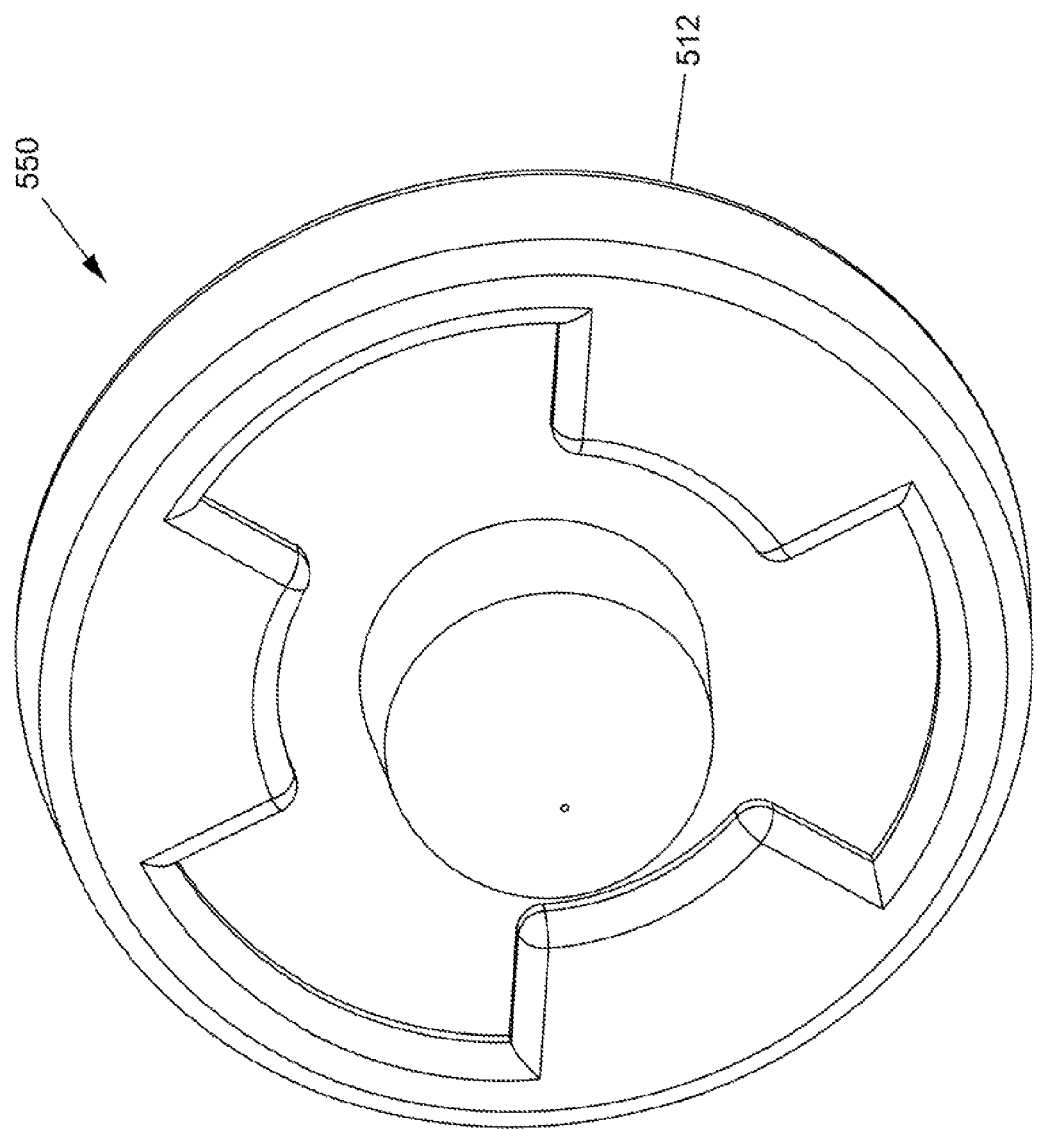
FIG. 37A illustrates a top side perspective view of the RF solid molded housing tag according to one embodiment.
Figure 37B:
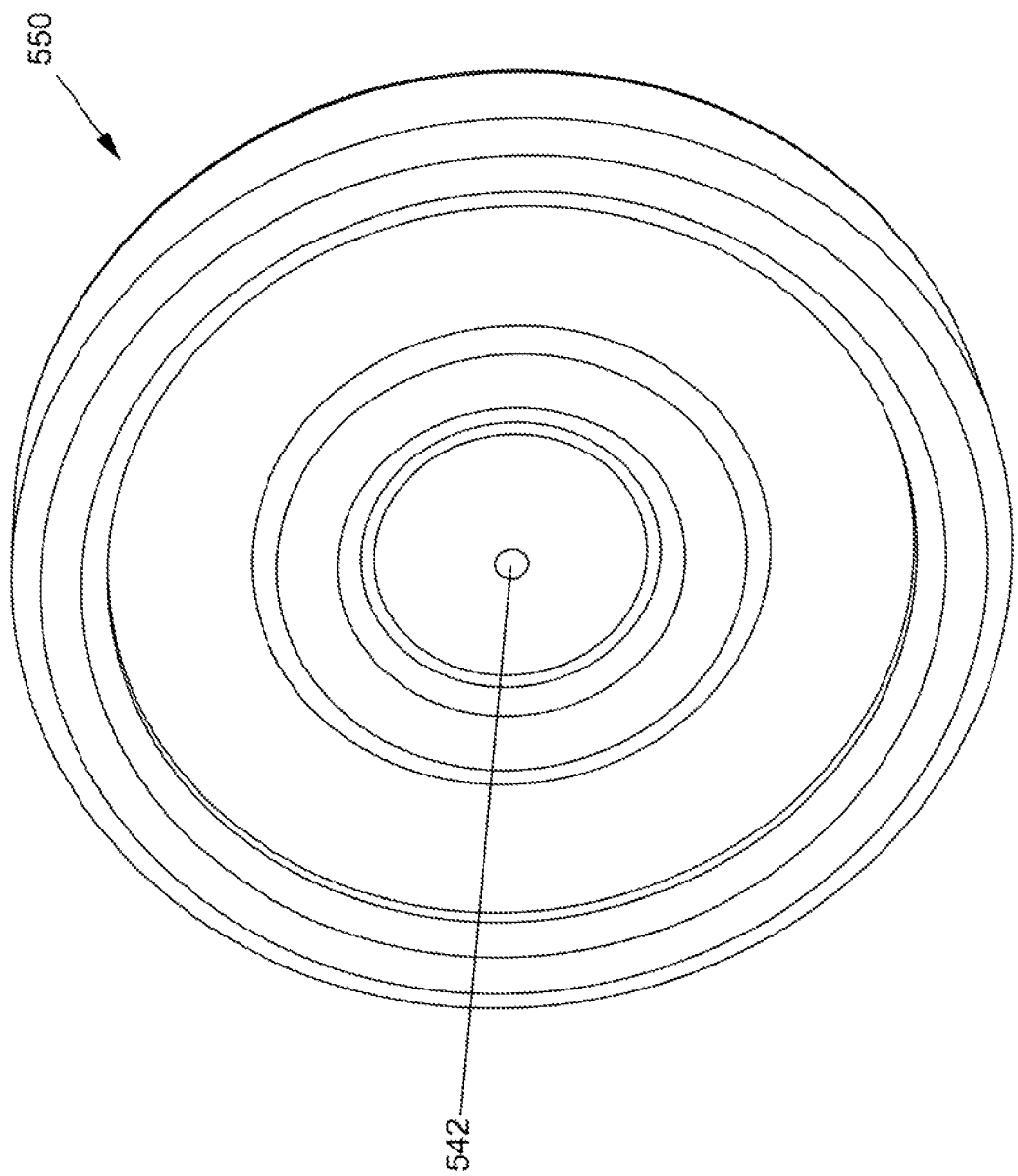
FIG. 37B illustrates a bottom side perspective view of the RF solid molded housing tag according to one embodiment.

FIG. 37A through FIG. 37C illustrate an RF solid molded housing tag 550. Like the AM solid molded housing tag 100 of the preferred embodiment, the RF solid molded housing tag 550 in this exemplary embodiment includes a single continuous housing 512, which is not generated by ultrasonically welding together separate encasing pieces.

Figure 31:
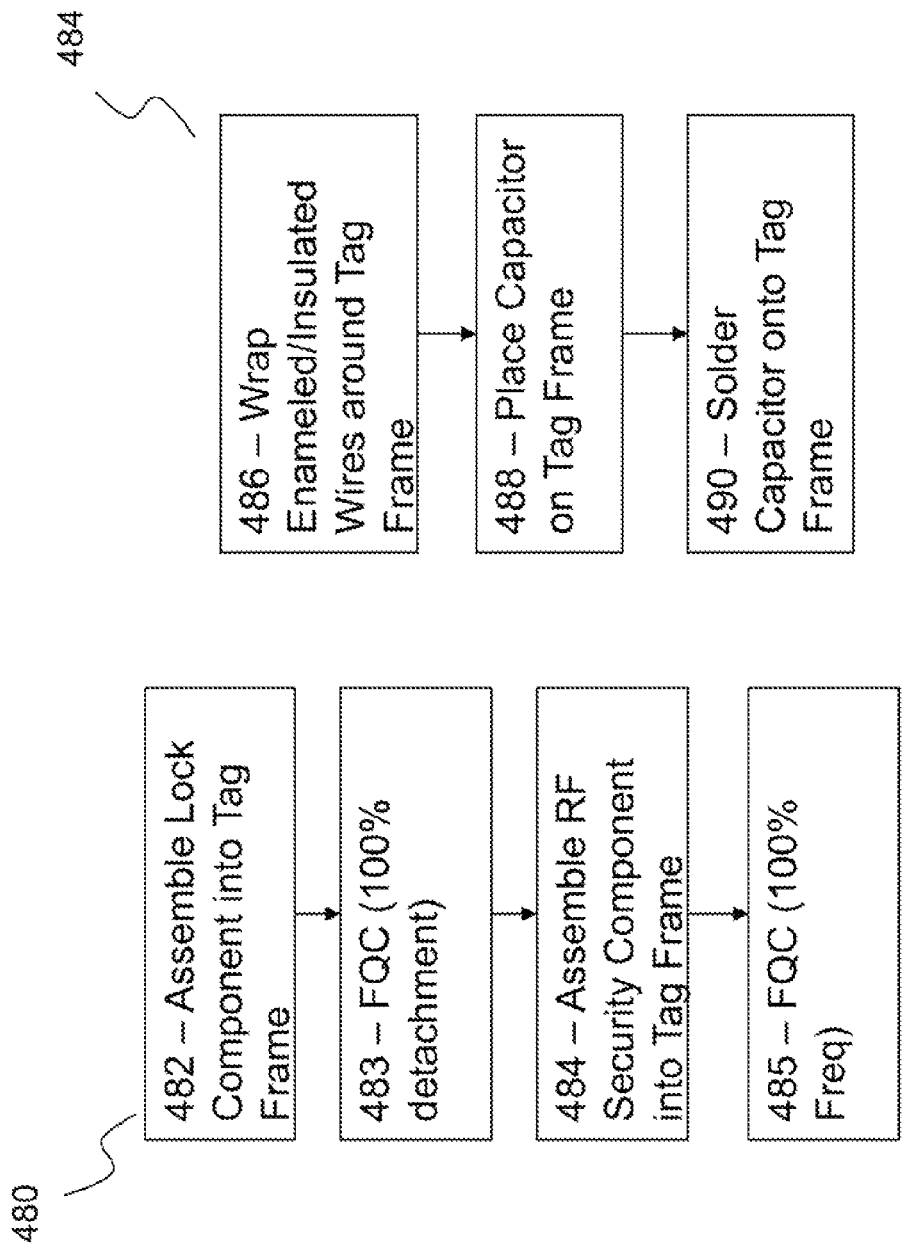
FIG. 31 illustrates an exemplary RF tag core piece assembly process for the RF tag core piece with open air coil element of the RF solid molded housing tag according to another embodiment.

The steps for manufacturing the RF solid molded housing tag 550 is similar to the steps for manufacturing the AM solid molded housing tag 100 as shown in FIG. 4A. It can be made either with a ferrite element or as shown as with an open air coil element. Forming the RF solid molded housing tag 550 begins with RF tag frame 500 manufacturing and quality checking at step 156, followed by RF tag core piece 540 assembly at step 158. Referring to FIG. 31, the lock component 520 is assembled on RF tag frame 500 at step 482. At step 483, the lock component 520 is tested so as to attain a 100% detachment of the pin from the lock component 520 under FQC. The RF security component 530 is assembled on RF tag frame 500 at step 484. A frequency analysis to attain 100% matched frequency of the security component 530, inside the RF tag core piece 540, to a detector for sensing the RF solid molded housing tag 550 is conducted at step 485 under FQC. At step 162, injection molding occurs to form the housing 110 over the RF tag core piece 540. For creation of the housing 512 around the RF tag core piece 540, the housing injection mold process 300 of FIG. 16 may be used as step 162. At step 164, testing to achieve 100% detachment and 100% frequency matching is performed on the RF solid molded housing tag 550.

Figure 36:
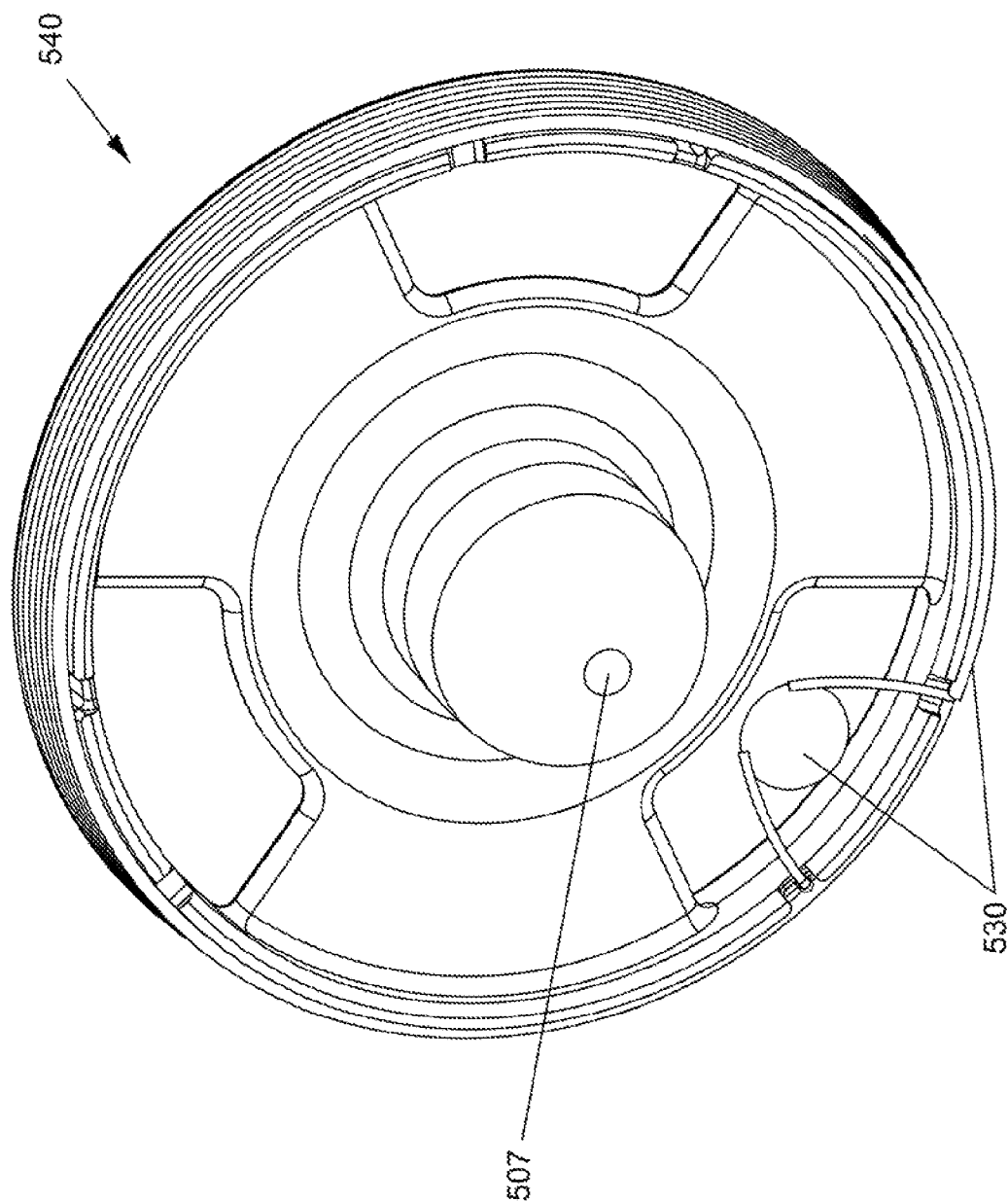
FIG. 36 illustrates a perspective view of the RF tag core piece according to one embodiment.

Prior to implementing the housing injection mold process 300 (see FIG. 16) to form housing 512, the RF security component 530 and lock component 520 are assembled into a RF tag frame 500 (see FIG. 32A) to form a RF tag core piece 540 (see FIG. 36). Assembly of the RF tag core piece 540 is further described in reference to FIG. 31. Once the RF tag core piece 540 is constructed, the same housing injection mold process 300 illustrated in FIG. 16, applied to the AM tag core piece 140 to form the AM solid molded housing tag 100, is applied to the RF tag core piece 140 to form the RF solid housing tag 550.

FIG. 31 illustrates an exemplary RF tag core piece assembly process 480, being step 158 of FIG. 4A, for the RF tag core piece 540 of the RF solid molded housing tag 550. Assembly of the security component is further described under step 484. FIGS. 32A through 36 may be viewed in conjunction with the process illustrated in FIG. 31.

Figure 32A:
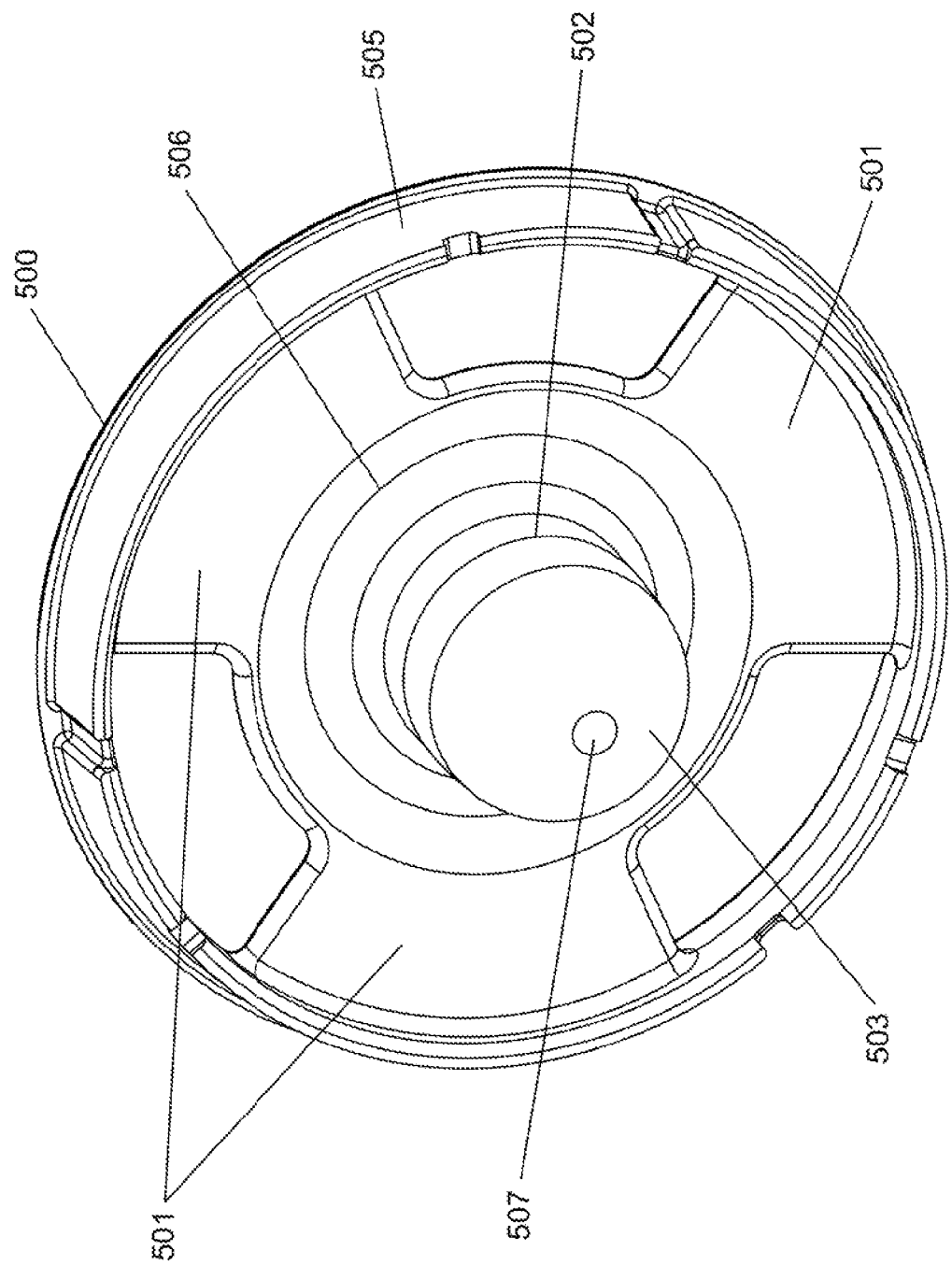
FIG. 32A illustrates top-side perspective view of RF tag frame according to one embodiment.
Figure 32B:
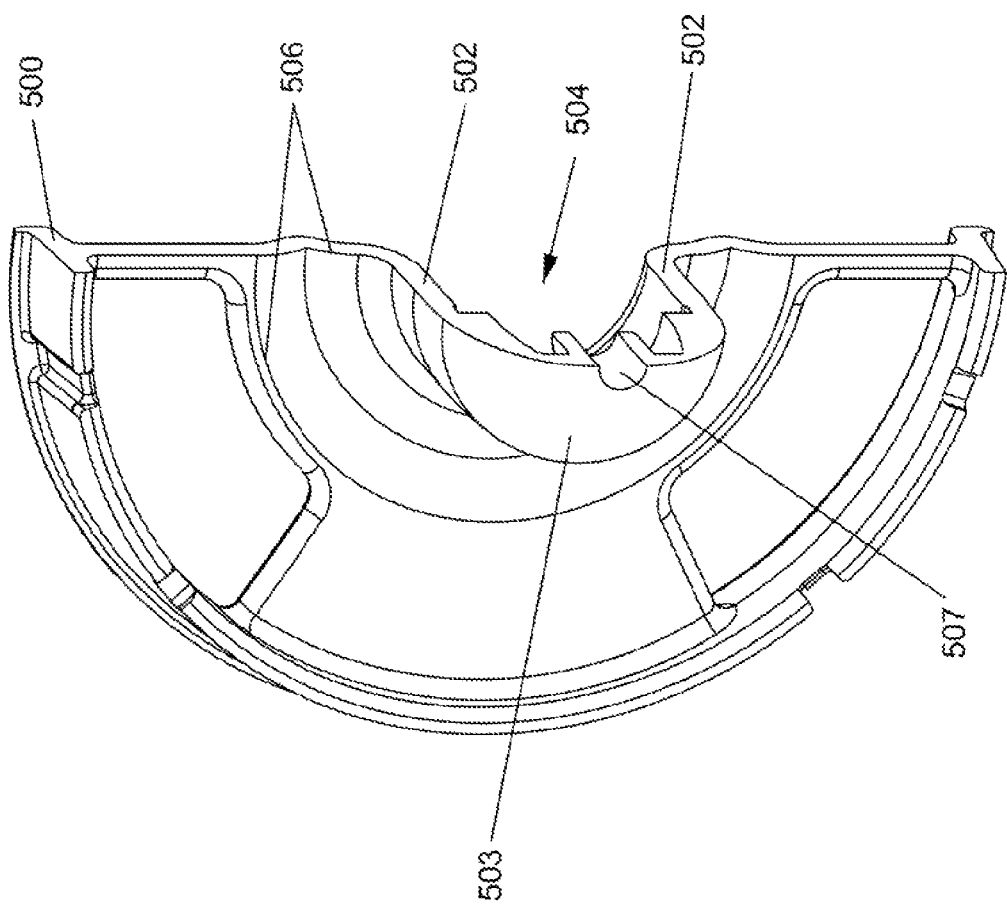
FIG. 32B illustrates a perspective cross-sectional view of the RF tag frame from FIG. 32A according to one embodiment.

FIG. 32A illustrates top-side perspective view of RF tag frame 500. FIG. 3213 illustrates a perspective cross-sectional view of the RF tag frame 500 from FIG. 32A. As shown in FIGS. 32A and 32B. RF tag frame 500 includes a lock component compartment 502 encircled by compartment base perimeter piece 506. Compartment base perimeter piece 506 attaches to tag perimeter piece 505 via tag bridges 501. The RF tag frame 500 is circular in shape, wherein the tag perimeter piece 505 is circular and larger in circumference than the circular shaped compartment base perimeter piece 506 and/or lock component compartment 502. The tag perimeter piece 505, a portion of the RF tag frame 500, encircles the remainder of the RF tag frame 500. The lock component compartment 502 is formed by a wall, extending orthogonal in direction than connection with the compartment base perimeter piece 506 about the circumference of the lock component compartment 502. Lock component compartment 502 is a wall, extending to form a circular piece with the circumference shaped by the wall. The top edge of the circumference wall of the lock component compartment 502 connects to a bottom edge of the wall of lock component compartment dome 503. The wall of the lock component compartment dome 503 extends upwards from connection with the top edge of the lock component compartment 502 and reduces in circumference to form the lock component compartment dome 503. The lock component compartment 502 and lock component compartment dome 503 are partially hollow to form lock component cavity 504, as shown in FIG. 32B.

Three tag bridges 501 extend between connection with the compartment base perimeter piece 506 and tag perimeter piece 505. The tag bridges 501 are evenly spaced apart to create symmetry. In some embodiments, spacing between tag bridges 501 may be uneven or asymmetric. In other embodiments, one or more tag bridges 501 may be used to connect the compartment base perimeter piece 506 to the tag perimeter piece 505. For example, one tag bridge 501 may completely encircle the compartment base perimeter piece 506 so as to connect to inside surface of the tag perimeter piece 505 at every angle.

The RF tag frame 500, as shown in FIGS. 32A and 32B, is a single skeleton piece for containing both the lock component 520 (see FIG. 33) and RF security component 530 (see FIG. 36). 'Skeleton' is defined as above for the AM tag frame 200. The RF tag frame 500 includes a mold connection cavity 507, located about the peak of the component compartment dome 503. The mold connection cavity 507 is further described below in reference to the housing injection mold process 300 (see FIG. 16).

Figure 33:
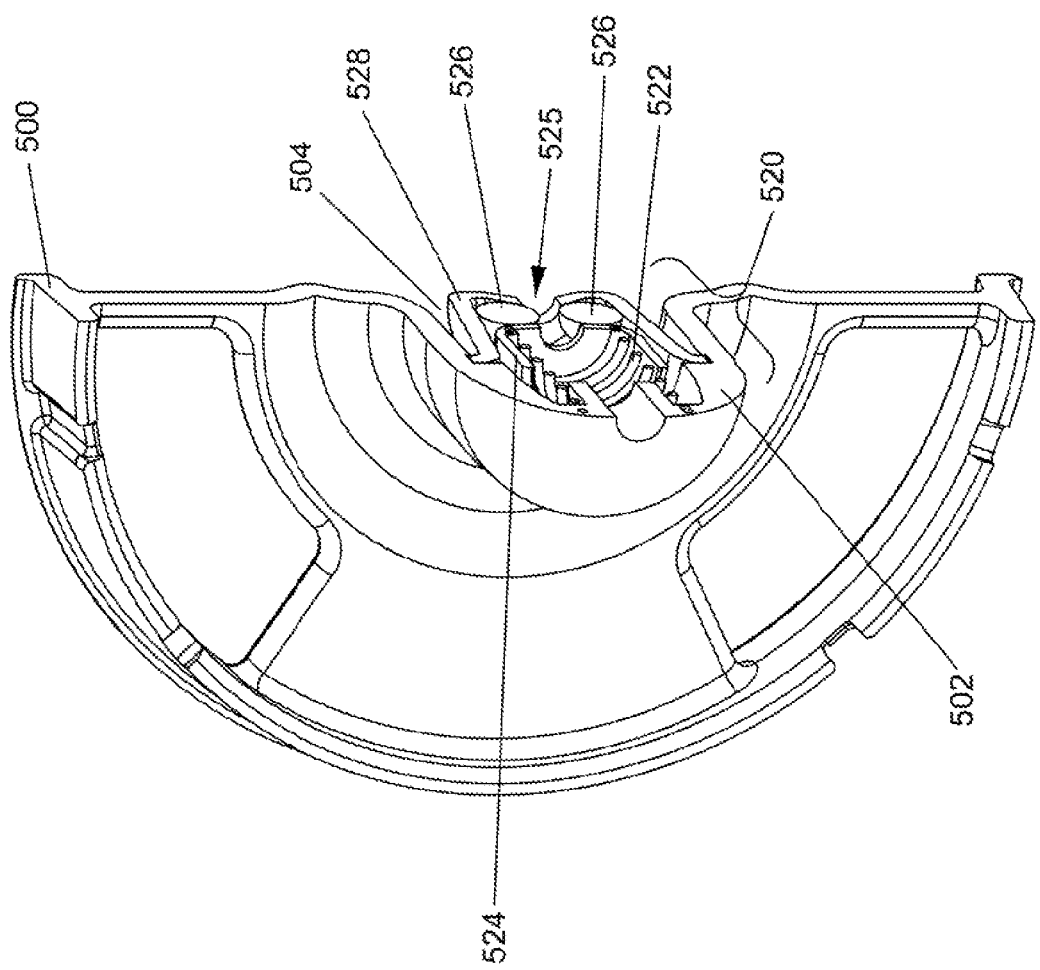
FIG. 33 illustrates the cross-sectional perspective view of the RF tag frame from FIG. 32A with the lock component assembled within according to one embodiment.

Referring again to FIG. 31, at step 482, lock component 520 is assembled into tag frame 500. FIG. 33 illustrates the cross-sectional perspective view of the RF tag frame 500 from FIG. 32A with the lock component 520 assembled within. The lock component 520 of the RF tag frame 500 includes a spring 522, pusher 524, balls 526, and lock component chamber 528, all of which are also shown in lock component 120 attached in AM tag frame 200 of AM solid molded housing tag 100 as shown in FIGS. 9B and 9C. The spring 522, pusher 524, and balls 526 are shown in cross-sectional view in FIG. 33. The spring 522, pusher 524, and balls 526 assemble and work together as described in references to lock component 120 of AM tag frame 200. As shown in FIG. 33, the internal walls of the lock component compartment 502 formed around the lock component cavity 504 are structured to contain lock component 520. The lock component 520 is assembled in the lock component cavity 504 and about the internal walls of the lock component compartment 502, beginning with insertion of spring 522. One end of spring 522 is inserted into the lock component cavity 504 and the other end is covered by pusher 524. Two balls 526, are placed inside the lock component chamber 528 to rest on the floor of the lock component chamber 528. The open end of the lock component chamber 528, opposite the floor end, is placed over the bottom floor side of the pusher 524, opposite the pusher opening side wherein the spring 522 is inserted. The lock component chamber 528 is then pushed into the lock component cavity 504 over the spring 522 inside the walls of the lock component compartment dome 503 and within lock component compartment 502.

A lock pin (not shown) may be properly inserted into the opening centered about the floor of the lock component chamber 528, being the lock pin cavity 525 (see FIG. 33). The working of the lock pin inside the lock component 520 works as previously described in reference to the AM tag frame 200 as shown in FIGS. 9B and 9C.

Referring again to FIG. 31, at step 484, RF security component 530 (see FIG. 36) is assembled about RF tag frame 500. To begin assembly of the security component 530 about RF tag frame 500, enameled/insulated wire 532 is wrapped around RF tag frame in step 486. Wire 532 may be copper.

Figure 34:
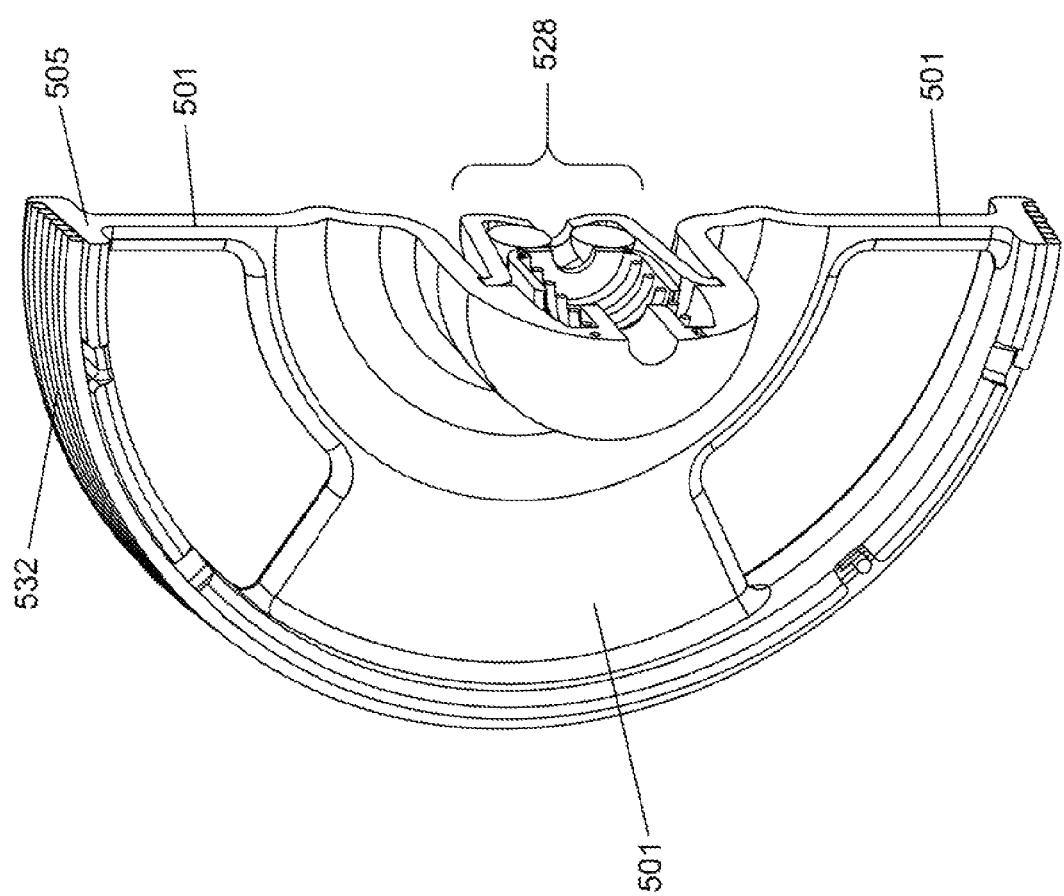
FIG. 34 illustrates a cross-sectional view of RF tag frame of FIG. 32 with enameled/insulated wire wrapped around the RF tag frame according to one embodiment.

FIG. 34 illustrates a cross-sectional view of RF tag frame 500 of FIG. 32 with enameled/insulated wire 532 wrapped around the RF tag frame 500. The enameled/insulated wire 532 is placed about the outer surface of the tag perimeter piece 505, opposite the side surface of the tag perimeter piece 505 connected to the tag bridges 501, at step 486. In the preferred embodiment, the enameled/insulated wire 532 is wrapped seven times, forming seven individual wires aligned across the outside surface of the tag perimeter piece 505. In other embodiments, the wire 532 may be different thickness and wrapped any number of times depending on the desired emitted performance in frequency for the tag. Higher performance may be attributed to more turns of the wrapped wire 532.

Figure 35:
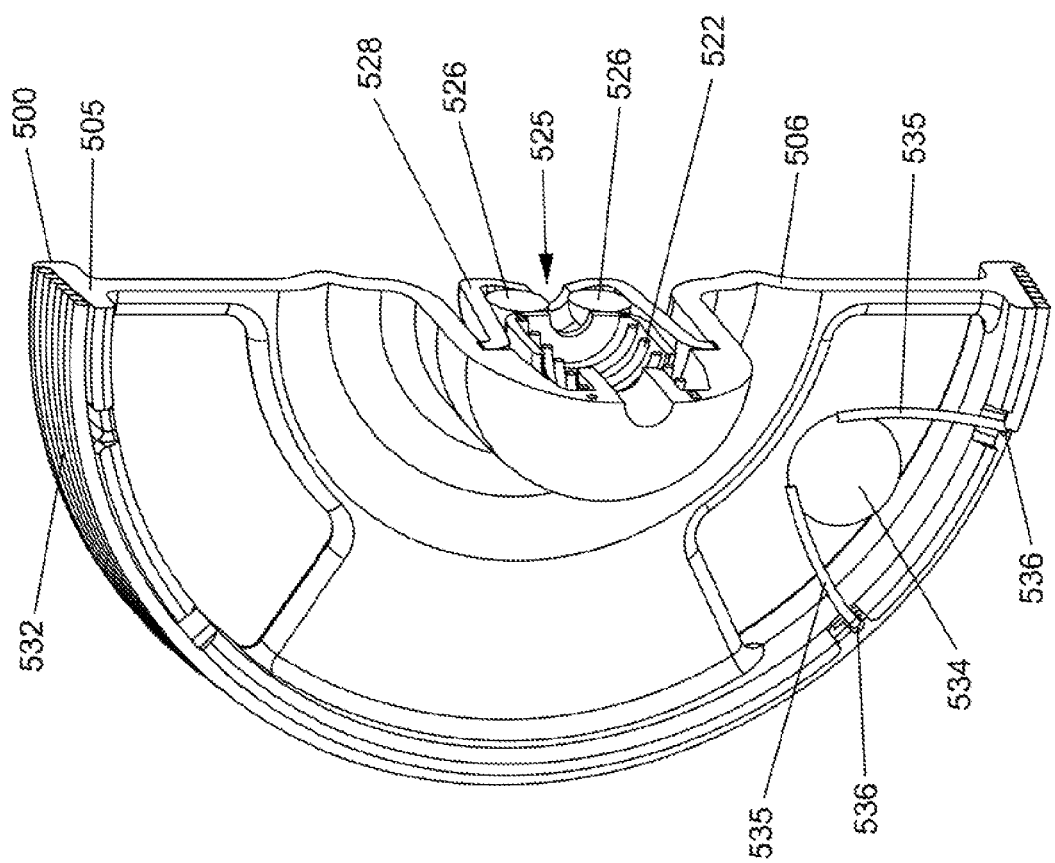
FIG. 35 illustrates a cross-sectional view of RF tag frame of FIG. 32A with capacitor located about RF tag frame according to one embodiment.

Referring again to FIG. 31, capacitor 534 is then placed on the RF tag frame 500 at step 488. FIG. 35 illustrates a cross-sectional view of RF tag frame 500 of FIG. 32 with capacitor 534 located about RF tag frame 500. As shown in FIG. 35, capacitor 534 is attached about RF tag frame 500 and suspended between the compartment base perimeter piece 506 and tag perimeter piece 505. In other embodiments, the capacitor 534 may be located about the tag perimeter piece 505 or directly connected or adhered to the tag perimeter piece 505. The capacitor 534 is oval in shape. In other embodiments, the capacitor 534 may be rectangular or any other shape. In the preferred embodiment, the capacitor 534 is supported by two capacitor feet 535. In other embodiments, the capacitor 534 may be supported any number of capacitor feet 535. An end of each capacitor foot 535 is connected to the capacitor 534. The opposite end of one capacitor foot 535 is connected to an end of the enameled/insulated wire 532 and the opposite end of the other capacitor foot 535 is connected to the other end of the enameled/insulated wire 532. Referring again to FIG. 31, the ends of the capacitor feet 535 are soldered in connection to the ends of the wire 532 at solder pin connections 536, at step 490.

Once the capacitor 534 is soldered in connection to the wrapped insulated wire 532, the RF tag core piece 540 is formed having an open air coil element, being the enameled/insulated wire 532 and capacitor 534. In other embodiments, assembly of the RF security component in step 484 may occur before or simultaneously with assembly of the lock component in step 482. A frequency analysis to attain 100% matched frequency of the FM tag core piece 540 to a detector for sensing the FM solid molded housing tag 550 is conducted at step 485 under FQC. Step 483 occurs after step 482 and step 485 occurs after step 484, but step 483 may occur after or simultaneously with step 485 when both steps occur after step 484. In other embodiments, by changing capacitor 534, the wire's 532 thickness and/or number of wrapped times, different performance of frequency in the tag may be achieved. In other embodiments, ferrite may be introduced into the RF tag core piece 540.

In another embodiment, a RF solid housing tag can match the AM design but with the inductor and capacitor tuned for 8.2 MHz. This requires less turns of the inductor, of the enameled/insulated wires and a higher capacitor value.

FIG. 36 illustrates a perspective view of the RF tag core piece 540. The RF tag core piece 540, including the lock component 520 and security component 530, assembled into RF tag frame 500 is operable as a working EAS tag, an RF tag in this alternative embodiment. In other embodiment, the RF tag core piece 540 may include only the lock component 520, security component 530, or any other components or combinations of components.

With the RF tag core piece 540 completed, the RF tag core piece 540 may then be subjected to the housing injection mold process 300 (see FIG. 16), used for the AM solid molded housing tag 100 assembly. FIG. 16 illustrates the overview of the housing injection mold process 300. The steps applied in the injection mold process for the AM solid molded housing tag 100 are used to create the RF solid molded housing tag 550 including: inserting RF tag core piece 540 into a lower mold at step 302, closing an upper mold and bottom mold together over the RF tag core piece 540 in step 304, injecting housing material to at least partially cover the RF tag core piece 540 in step 306, and then removing the upper and lower molds from the formed RF solid molded housing tag 550 (see FIG. 37A through 37C) in step 308.

As shown in FIG. 36, a mold connection cavity 507 is located about the outside surface and at the peak or the lock component compartment dome 503. As opposed to the upper 340 and lower molds 320 designed to hold the AM tag core piece 140, upper and lower molds for enclosing over the RF tag core piece 540 need only require two ejection bars. One ejection bar may be inserted from the lower mold into the lock pin cavity 525 on the bottom side of the RF tag core piece 540 (see FIG. 33). The other ejection bar from the upper mold may be inserted into the mold connection cavity 507 located on the outside surface and at the peak of the lock component compartment dome 503 (see FIG. 36). The cavity about the surface of the upper and lower molds, wherein the RF tag core piece 540 resides for application of injection molding 352, is shaped so that injection molding 352 may surround and conform around the surface of the RF tag core piece 540. Ejection bars are each removed in sequence, as performed on the AM core tag piece 140, so that injection molding further conforms around the RF tag core piece 540. The ejection bar inserted into the lock pin cavity 525 is removed last. In other embodiments, the ejection bars are left in place until the injection molding is completed, such that when removed gaps about the housing 512 may appear where the ejection bars was in place. In other embodiments, one or more ejection bars may be used as connected to hold the RF tag core piece 540 to any location on the RF tag core piece 540 for injection molding.

Figure 38B:
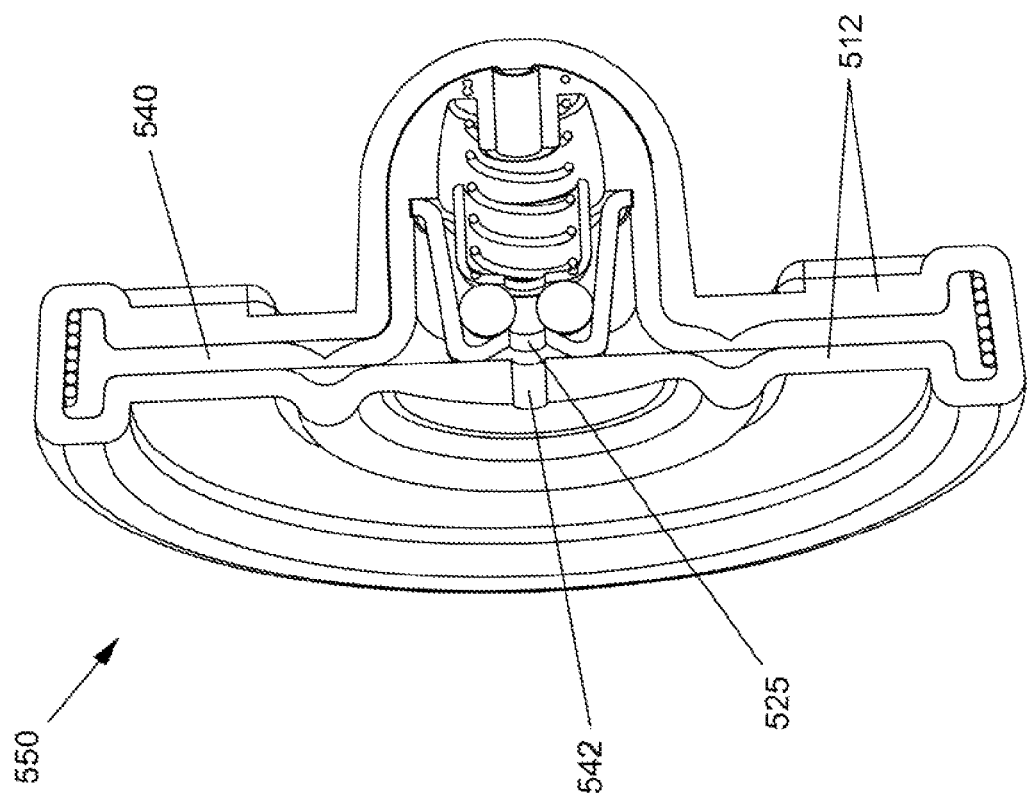
FIG. 38B illustrates a cross-sectional view of the RF solid molded housing tag of FIG. 37A showing the other half of the RF solid molded housing tag according to one embodiment.

Once the housing injection mold process 300 is finalized, the RF solid molded housing tag 550 is produced. FIG. 37A illustrates a top side perspective view of the RF solid molded housing tag 550. FIG. 37B illustrates a bottom side perspective view of the RF solid molded housing tag 550. FIG. 37C illustrates a top side perspective view of the RF solid molded housing tag 550 with the housing 512 shown transparent to view the RF tag core piece 540 within. FIG. 38A illustrates a cross-sectional view of the RF solid molded housing tag 550 of FIG. 37A showing one half of the RF solid molded housing tag 550. FIG. 38B illustrates a cross-sectional view of the RF solid molded housing tag 550 of FIG. 37A showing the other half of the RF solid molded housing tag 550. In FIG. 37A through 38B, the formed RF solid molded housing tag 550 is shown as removed from the upper and lower molds (not shown) used in the housing injection mold process 300. When the ejection bar of the upper mold was removed, housing material 352 filled the gap between the removed ejection bar and the mold connection cavity 507 about the surface of the lock component compartment dome 203, as shown in FIG. 37A. The ejection bar is then removed from the lock pin cavity 525 after completing application of housing material 352 about the RF tag core piece 540. When this ejection bar is removed from the lock pin cavity 525, a housing lock pin accessway 542 is formed such that a lock pin (not shown) can penetrate the housing lock pin accessway 542 to move into the lock pin cavity 525 (see FIGS. 38A and 38B). Other than at the housing lock pin accessway 542, the RF tag core piece is completely enclosed in the housing 512 formed from under the housing injection mold process 300.

FIG. 39 illustrates perspective view of the RF tag core piece 540 compared with the RF solid molded housing tag 550. The RF solid molded housing tag 550 includes the housing 512 formed over the RF tag core piece 540 after the housing injection mold process 300 in this alternative embodiment is completed.

In alternative to the housing injection mold process 300, shown in FIG. 16, other processes may be utilized to form a housing so as to at least partially surround a tag core piece, such as AM tag core piece 140 or RF tag core piece 540 described above. For example, more than one injection may occur at different stages in the housing injection mold process 300. As another alternative, housing material may simply be dripped over the tag core piece as opposed to injected over. As another alternative, the tag core piece may be temporarily connected to a fixture and then dipped into a liquid housing material. The housing may then solidify and the fixture removed. In this embodiment, the fixture may have a non-stick surface so that it may easily be removed from inside the solid molded housing tag. As another alternative, wrap foam may be used on a tag core piece and then heated to form housing around the tag core piece as opposed to any form of injection molding.

FIG. 40 illustrates a two-injection step molding process 600. In this alternative embodiment, a tag frame is first inserted into one mold. As for example, in step 602, the tag frame is inserted into a top mold and housing material is applied, as for example through injection molding, to form around half of the tag frame to create a half housing about half of the tag frame. At step 604, the inserts of the security component and/or lock component are fed into the tag frame to form a tag core piece, partially encased in housing. At step 606, the tag core piece is inserted into another mold so that housing material is applied over the tag core piece where housing does not exist. Once the other half of the housing is finalized, the solid molded housing tag is produced. In other embodiments, the tag core piece may simply be flipped over and reinserted into the first mold, being the top mold in this example, so that housing material may be applied to the surface of the tag core piece, where housing is not present, to form the other half housing. In other embodiments, any number of injections may be applied to the tag frame and/or tag core piece placed into one or more molds so as to form portions of the housing that ultimately encases the tag core piece to form a solid molded housing tag. In other embodiments, a percentage less than or greater than half of the housing may be formed in any injection step.

Figure 41:
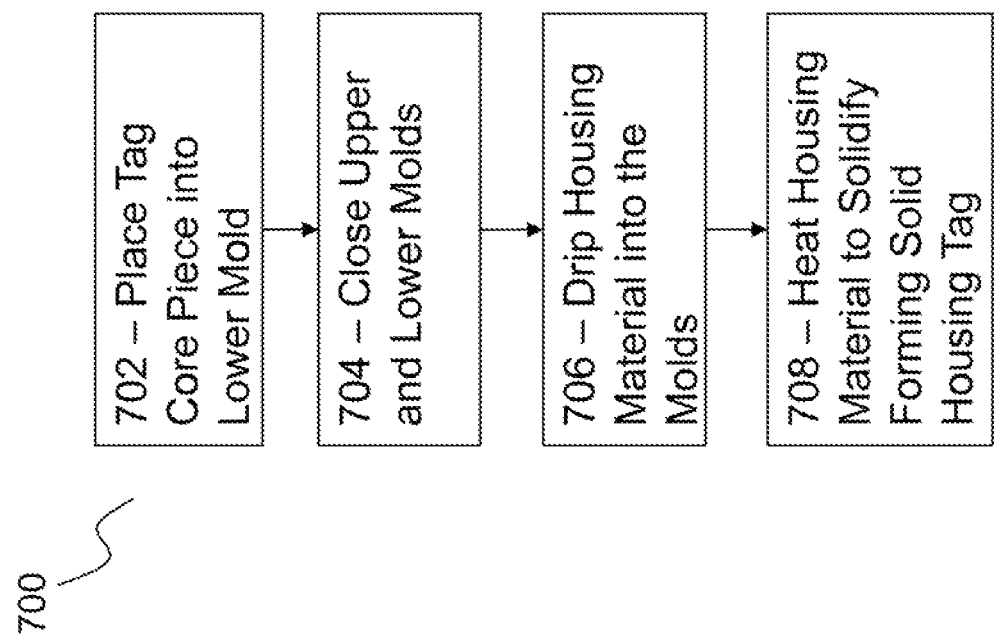
FIG. 41 illustrates a drip molding process according to another embodiment.

FIG. 41 illustrates a drip molding process 700. In this alternative embodiment, the tag core piece containing the lock component and/or security component is placed into a lower mold at step 702. An upper mold is closed over the tag core piece to connect with the lower mold in step 704. Rather that injecting mold around the tag core piece, housing material is dripped into the molds to form around the tag core piece in step 706. The housing formed by dripping the material is solidified around the tag core piece with the application of heat in step 708 to form a solid housing tag. In other embodiments, solidification of the material may occur by waiting over a period of time for the housing material to dry at any temperature, as for example in room temperature. In other embodiments, one or more molds may be used in the drip mold process 700. In other embodiments, additional drip steps may be incorporated into the drip mold process 700.

Figure 42:
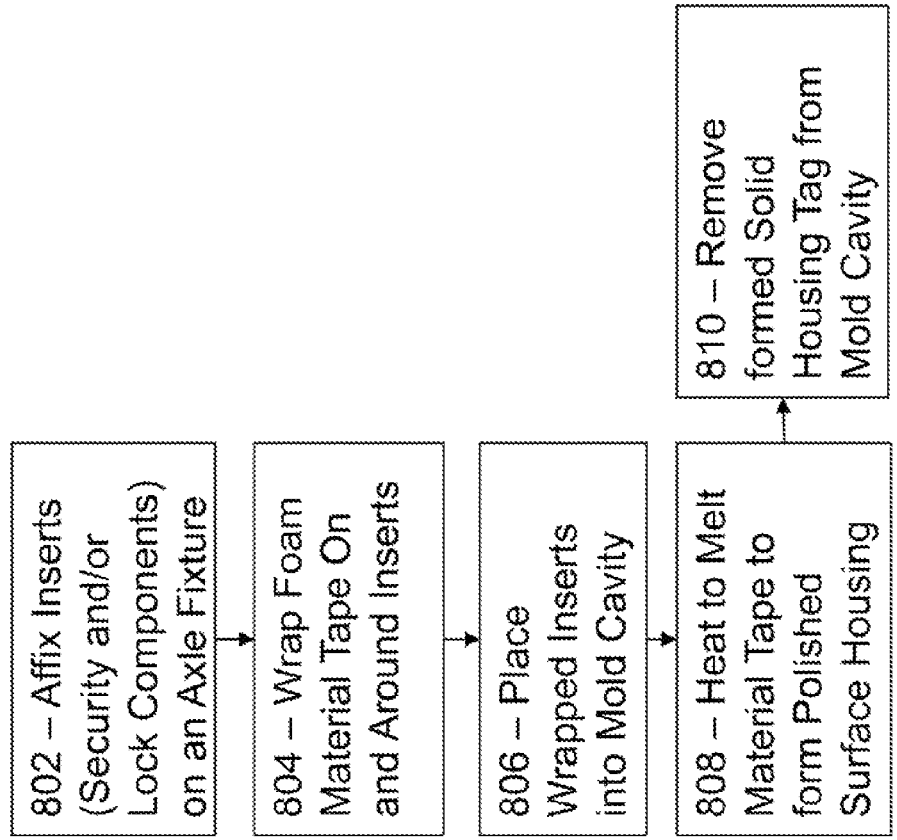
FIG. 42 illustrates a wrap-warm formation process according to another embodiment.

FIG. 42 illustrates a wrap-warm formation process 800. In this alternative embodiment, a tag frame may not be required. Instead, inserts, such as the security and/or lock components are placed separately on an axle fixture in step 802. The axle fixture serves as a location in which to initially place the inserts. A table, floor, or another location may be used to separately place the inserts in alternative to the axle fixture. Foam material tape may then be wrapped on and around the inserts in step 804. The foam material tape serves as the skeleton structure, or tag frame, to hold the inserts, including for example the security and/or lock components. The wrapped inserts may then be placed into a mold cavity in step 806. Heat is applied to the wrapped insets in step 808. After a sufficient amount of time at a particular temperature, the material tape is melted to form a polished surface housing around the inserts, wherein the polished surface housing connects the inserts so as to form a solid housing tag. At step 810, the solid housing tag is removed from the mold cavity.

The housing injection mold process 300 described in the preferred embodiment, or any of the alternative processes described above may be used on various types of hard tags including EAS tags having AM and/or RF technology elements, RFID tags, and/or benefit denial type tags. In these embodiments, a tag frame may be constructed to contain components, including for example security and/or lock components, for the various types of tags. For example, a tag frame may be constructed to hold the glass vials containing ink in a benefit denial type tag. In another example, a tag frame may be constructed to contain not only the RF coil, being the inductive coil looping, but the RFID chip as well.

In other embodiments, either one of the security component or lock component may only be arranged about the tag frame to form the tag core piece. In other embodiments, the security component might include an RFID element or benefit denial element. In other embodiments, the security component in the solid housing tag may include one or more elements, such as RFID), benefit denial, AM, or RF technologies. In other embodiments, the elements may be a combination of the same type of elements or of different elements. For example, the RFID element may be inside the solid housing tag or an RFID element in combination with an RF element may be inside the solid housing tag.

In other embodiments, the housing at least partially surrounding the tag core piece may be formed in the general shape of the tag core piece. In other embodiments, as for example based on the shape of the molds, the housing may be formed in other shapes or sizes which may not match the shape of the tag core piece.

In other embodiments, the lock component may include alternative elements than those shown in the preferred embodiment, as being shown the ball and pin assembly. For example, in another embodiment, the lock component may be the mechanism as referred to in U.S. Pat. No. 8,344,891 issued on Jan. 1, 2013 and entitled "Security Hard Tag with Attachment Clip and Method for Attaching and Detaching" as assigned to the same assignee, of which the entire disclosure is hereby incorporated by reference.

Although the disclosure has been described with reference to exemplary embodiments, it is not limited thereto. Those skilled in the art will appreciate that numerous changes and modifications may be made to the preferred embodiments and that such changes and modifications may be made without departing from the true spirit of the disclosure. It is therefore intended that the appended claims be construed to cover all such equivalent variations as fall within the true spirit and scope of the disclosure.

What is claimed is:
1. A tag comprising:
  a core piece, comprising:
    a security component;
    a lock component, wherein the lock component comprises a lock component opening for receiving a first end of a lock pin, the lock component configured to lock the lock pin to the tag and thereby secure merchandise between a pin head at a second end of the lock pin and the tag; and
    a frame, wherein the security component and lock component are arranged about the frame; and
  a single-piece housing enclosing all sides of the core piece except for an accessway configured to provide the first end of the lock pin access to the lock component opening.

2. The tag of claim 1, wherein the frame is a single skeleton piece.

3. The tag of claim 1, wherein the housing is formed in the general shape of the core piece.

4. The tag of claim 1, wherein the security component is an acousto-magnetic element or a radio frequency element.

5. The tag of claim 4, wherein the acousto-magnetic element as the security component comprises:
- a wire wrapped around a closed encasing portion of the frame;
- a capacitor connected to opposite ends of the wire, wherein the capacitor is located about the closed encasing portion; and
- a ferrite rod located inside the closed encasing portion of the frame, wherein the ferrite rod is positioned in an open end of the closed encasing portion at a particular length inside the closed encasing portion to attain a proper frequency for detection of the acousto-magnetic element by a detector.

6. The tag of claim 4, wherein the radio frequency element as the security component comprises:
- a wire wrapped around a perimeter piece of the frame, wherein the perimeter piece encircles a remainder of the frame and connects to the remainder of the frame by one or more bridge portions of the frame; and
- a capacitor connected to opposite ends of the wire, wherein the capacitor is located about the perimeter piece of the frame.

7. The tag of claim 1, wherein the frame comprises:
- a lock component cavity formed within a lock component compartment and a lock component compartment dome, wherein the lock component compartment is a wall extending around a circumference of the lock component cavity and wherein a bottom edge of a dome wall of the lock component compartment dome connects to a top edge of the lock component compartment and wherein the dome wall extends up from the connection with the top edge of the lock component compartment and reduces in circumference further from the connection with the top edge of the lock component compartment to form the lock component compartment dome,
- wherein the lock component is partially located in the lock component cavity, and wherein the lock component compartment and the lock component compartment dome form a portion of the frame.

8. The tag of claim 7, wherein the lock component comprises:
- a spring;
- a pusher having a closed end and an open end opposite the closed end, wherein a first end of the spring is positioned through the open end of the pusher and against an internal side of the closed end of the pusher;
- two or more balls located against an external side of the closed end of the pusher; and
- a lock component chamber having an open end and a floor end opposite the open end of the lock component chamber, wherein the two or more balls are located internally in the lock component chamber on an internal side of the floor end and wherein the floor end comprises the lock component opening through the floor end,
- wherein a second end of the spring is located against the lock component dome inside the lock component cavity, and
- wherein when the first end of the lock pin is located through the lock component opening in the floor end of the lock component chamber, the lock pin is in engagement with the two or more balls to lock the lock pin to the tag.

9. A method for forming a tag comprising:
- assembling a security component and a lock component about a frame to form a core piece; and
- forming a housing around the core piece by applying a housing material, via an injection molding process, over and about the core piece such that the housing material encloses all sides of the core piece except for an accessway configured to provide the first end of a lock pin access to a lock component opening;
- wherein the lock component opening is configured to receive a first end of the lock pin; and
- wherein the lock component is configured to lock the lock pin to the tag and thereby secure merchandise between a pin head at a second end of the lock pin and the tag.

10. The method of claim 9, wherein assembling the security component about the frame further comprises assembling the security component, wherein the security component is an acousto-magnetic element or a radio frequency element.

11. The method of claim 10, wherein assembling the acousto-magnetic element about the frame comprises:
- wrapping a wire around a closed encasing portion of the frame;
- connecting a capacitor to opposite ends of the wire, wherein the capacitor is located about the closed encasing portion of the frame; and
- positioning a ferrite rod inside the closed encasing portion of the frame at a particular length so as to attain a proper frequency for detection of the acousto-magnetic element at a detector.

12. The method of claim 10, wherein assembling the radio frequency element about the frame comprises:
- wrapping a wire around a perimeter piece of the frame, wherein the perimeter piece encircles the remainder of the frame and connects to the remainder of the frame by one or more bridge portions of the frame; and
- connecting a capacitor to opposite ends of the wire and positioning the capacitor about the perimeter piece.

13. The method of claim 9 further comprising:
- forming a lock component cavity within a lock component compartment and a lock component compartment dome, wherein the lock component compartment is a wall extending around a circumference of the lock component cavity and wherein a bottom edge of a dome wall of the lock component compartment dome connects to a top edge of the lock component compartment and wherein the dome wall extends up from the connection with the top edge of the lock component compartment and reduces in circumference further from the connection with the top edge of the lock component compartment to form the lock component compartment dome; and
- forming the lock component partially inside the lock component cavity,
- wherein the lock component compartment and the lock component compartment dome form a portion of the frame.

14. The method of claim 13, wherein forming the lock component partially inside the lock component cavity comprises:
- positioning a first end of a spring against the lock component dome inside the lock component cavity;
- positioning a second end of the spring through an open end of a pusher and against an internal side of a closed end of the pusher, wherein the pusher comprises the closed end and the open end opposite of the closed end;
- positioning two or more balls against an external side of the closed end of the pusher; and positioning the two or more balls through an open end of a lock component chamber and against an internal side of a chamber floor end of the lock component chamber, wherein the chamber floor end comprises the lock component opening on the chamber floor end and wherein the chamber floor end is opposite the open end of the lock component chamber;

wherein when the lock component opening receives the first end of the lock pin, the lock pin is in engagement with the two or more balls to lock the lock pin to the tag.

15. The method of claim 14, wherein application of housing material further comprises:
    inserting the core piece partially into a cavity of a lower mold and partially into a cavity of an upper mold;
    connecting the core piece to one or more ejection bars located in either mold, wherein at least one ejection bar is connected at the lock component opening in the chamber floor;
    closing the upper mold and lower mold;
    injecting housing material into the cavity of the upper mold and the lower mold; and
    removing the ejection bar connected at the lock component opening in the chamber floor when the injection of housing material is complete.

16. The method of claim 15, wherein the application of housing material further comprises removing the one or more ejection bars connected with the core piece, except for the ejection bar connected to the lock component opening in the chamber floor, prior to completion of injection of housing material to eliminate apertures on the housing at the former ejection bar connection with the core piece.

17. The method of claim 13, wherein applying the housing material comprises:
    applying the housing material over a portion of the frame not including the lock component cavity prior to forming the lock component partially inside the lock component cavity; and
    then applying more housing material over portions of the core piece after forming the lock component partially inside the lock component cavity.

18. A method for forming a tag comprising:
    forming a core piece comprising a frame, a security component, and a lock component, the lock component comprising a lock component opening for receiving a pin, the lock component configured to lock the pin to the tag to thereby secure the tag to merchandise; and
    after forming the core piece, applying a housing material, via an injection molding process, over and about the core piece, the housing material substantially enclosing all sides of the core piece while avoiding the lock component opening.

* * * * *